(12) United States Patent
Dorman

(10) Patent No.: US 11,767,471 B2
(45) Date of Patent: Sep. 26, 2023

(54) ADAPTIVE SOLID-STATE LUMINESCENT PHOSPHORS

(71) Applicant: James Anthony Dorman, Baton Rouge, LA (US)

(72) Inventor: James Anthony Dorman, Baton Rouge, LA (US)

(73) Assignee: BOARD OF SUPERVISORS OF LOUISIANA STATE UNIVERSITY AND AGRICULTURAL AND MECHANICAL COLLEGE, Baton Rouge, LA (US)

( * ) Notice: Subject to any disclaimer, the term of this patent is extended or adjusted under 35 U.S.C. 154(b) by 0 days.

(21) Appl. No.: 17/720,546

(22) Filed: Apr. 14, 2022

(65) Prior Publication Data
US 2022/0330398 A1   Oct. 13, 2022

Related U.S. Application Data

(62) Division of application No. 16/140,600, filed on Sep. 25, 2018, now Pat. No. 11,357,085.

(60) Provisional application No. 62/562,594, filed on Sep. 25, 2017.

(51) Int. Cl.
| | | |
|---|---|---|
| *C09K 11/77* | (2006.01) |
| *B42D 25/378* | (2014.01) |
| *B42D 25/305* | (2014.01) |
| *C09D 11/00* | (2014.01) |
| *B42D 25/29* | (2014.01) |
| *B41M 3/14* | (2006.01) |
| *C09K 11/02* | (2006.01) |

(52) U.S. Cl.
CPC ......... *C09K 11/7773* (2013.01); *B41M 3/144* (2013.01); *B42D 25/29* (2014.10); *B42D 25/305* (2014.10); *B42D 25/378* (2014.10); *C09D 11/00* (2013.01); *C09K 11/025* (2013.01); *C09K 11/77* (2013.01); *Y10S 977/762* (2013.01); *Y10S 977/773* (2013.01); *Y10S 977/834* (2013.01)

(58) Field of Classification Search
CPC ........................... C09K 11/7773; C09K 11/27
See application file for complete search history.

(56) References Cited

U.S. PATENT DOCUMENTS

| | | | |
|---|---|---|---|
| 11,357,085 B2 * | 6/2022 | Dorman | B42D 25/378 |
| 2015/0010476 A1 | 1/2015 | Schoeffel | |
| 2015/0182641 A1 | 7/2015 | Tan | |

* cited by examiner

*Primary Examiner* — C Melissa Koslow
(74) *Attorney, Agent, or Firm* — Riverside Law LLP

(57) ABSTRACT

The absorbance or emission wavelength of composite materials comprising a transition metal doped shell disposed over a rare earth doped core and a functionalizable group on the surface of the transition metal doped shell can change upon subjection to a carboxylic acid. This method of changing the absorbance or emission wavelength of a composite material can be used to identify counterfeit currency using an ink comprising a composite material.

10 Claims, 39 Drawing Sheets
(31 of 39 Drawing Sheet(s) Filed in Color)

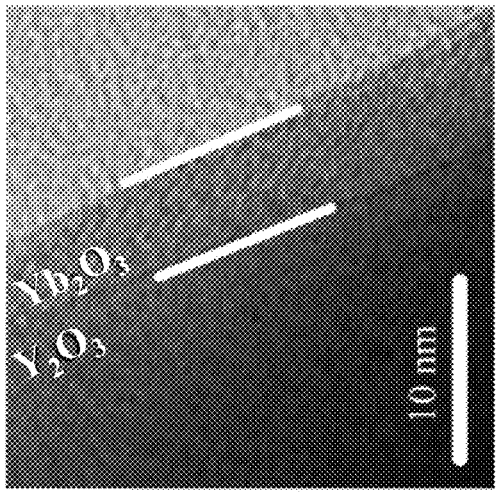
Fig. 3A
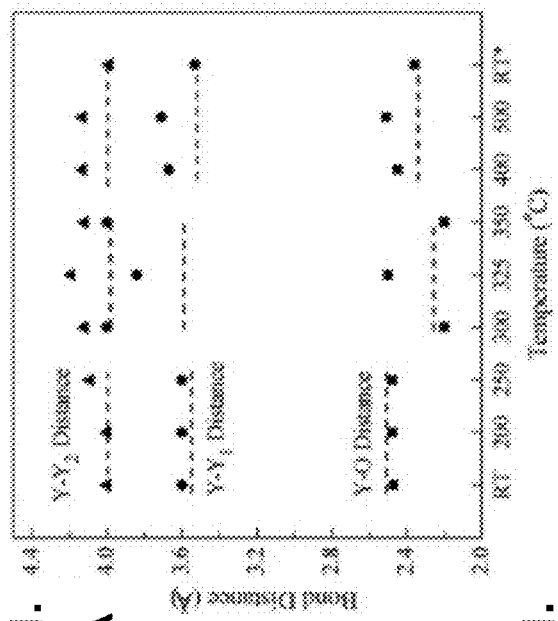
Fig. 3B
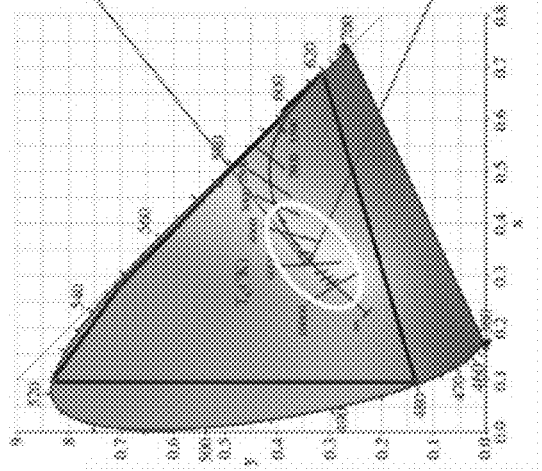
Fig. 3C
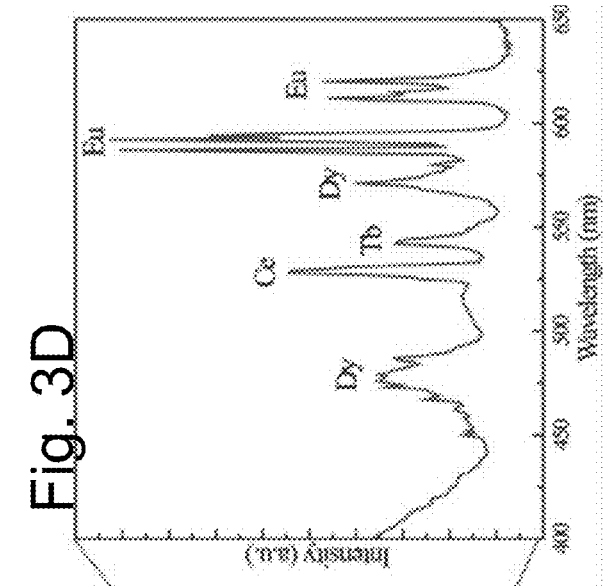
Fig. 3D
Figure 3

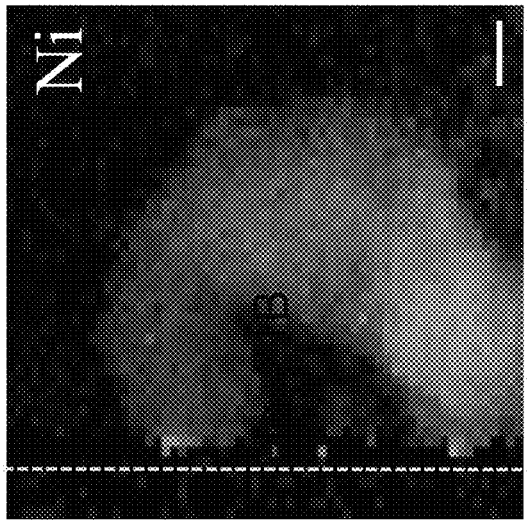
Fig. 24B
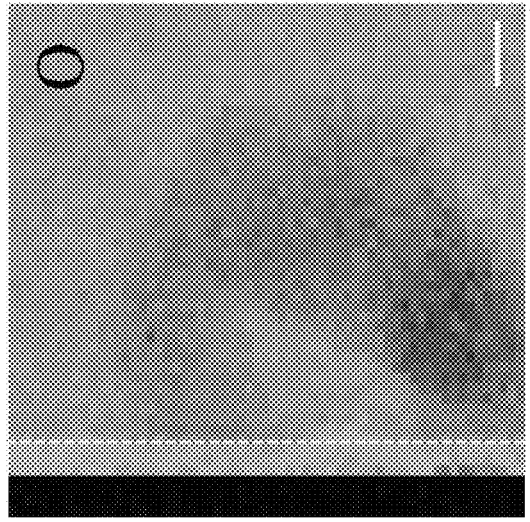
Fig. 24D
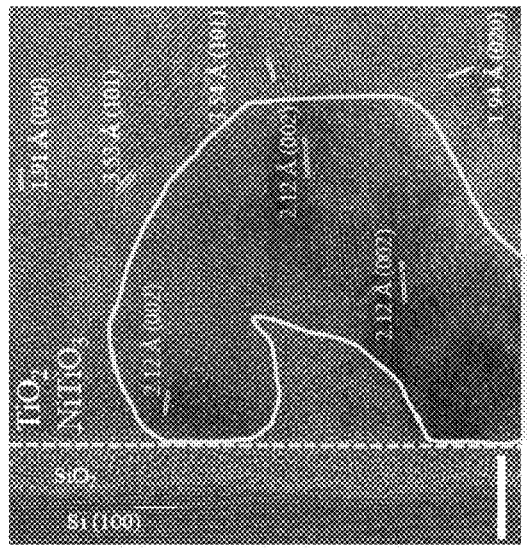
Fig. 24A
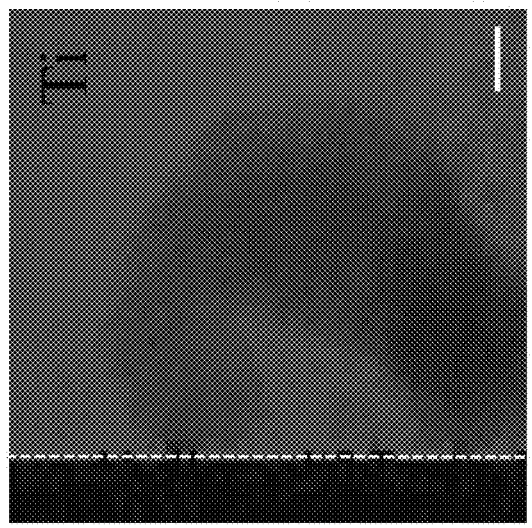
Fig. 24C
Figure 24

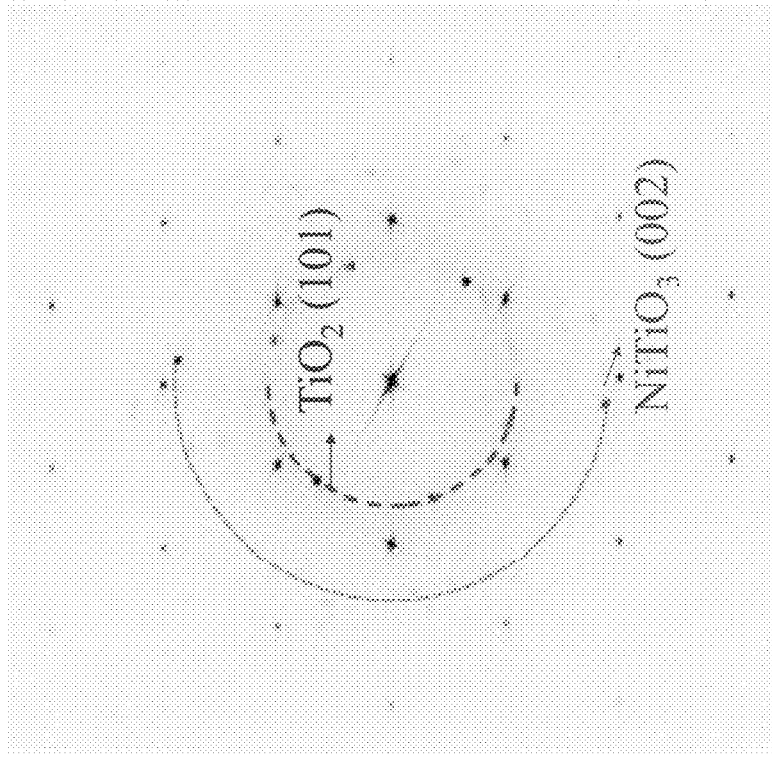
Fig. 25B
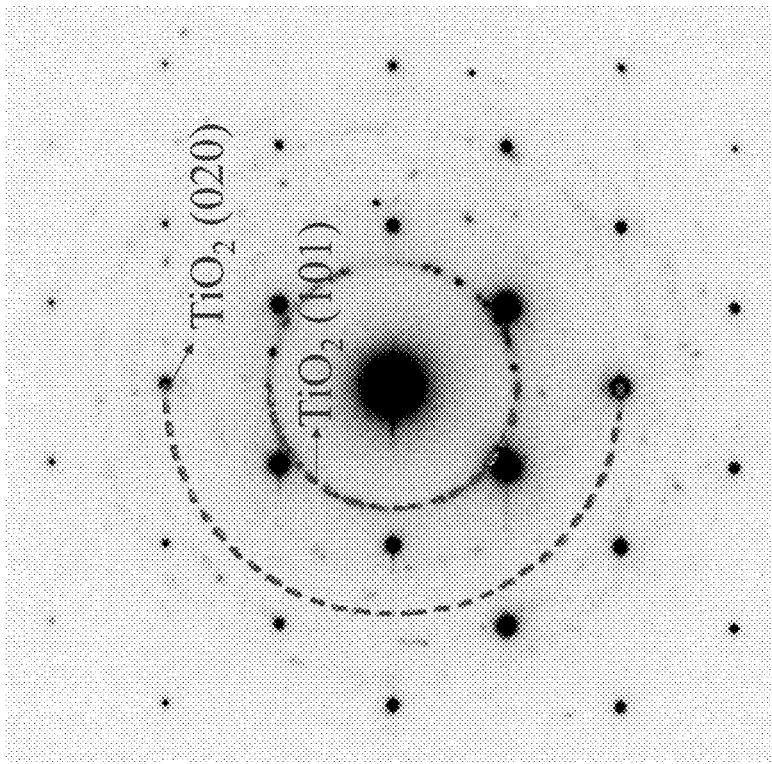
Fig. 25A
Figure 25

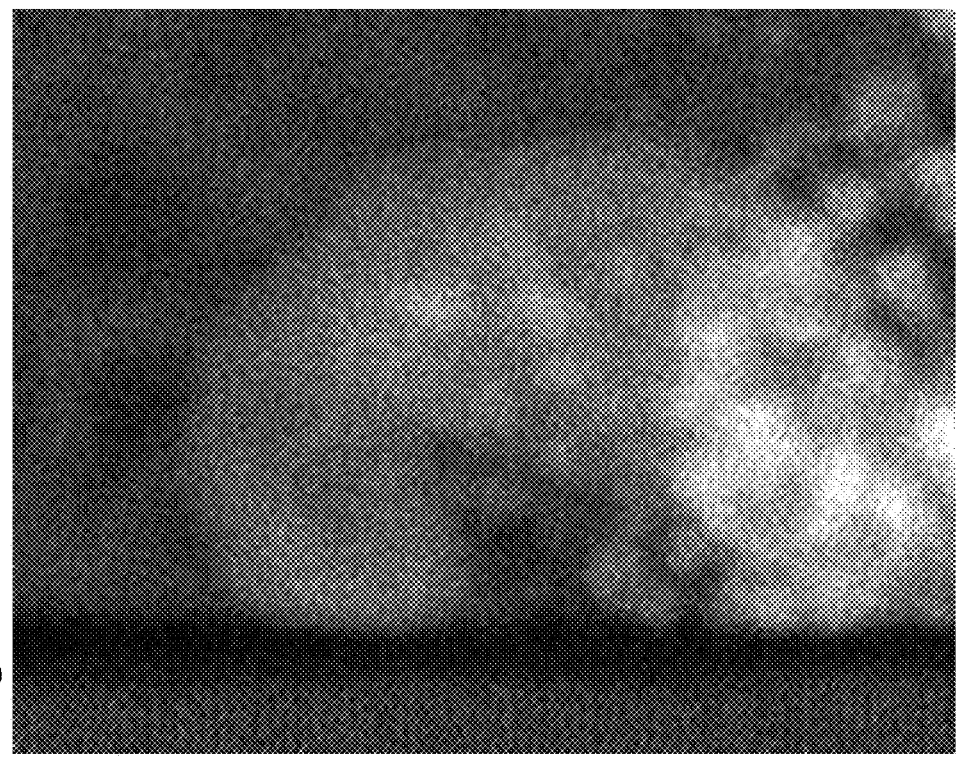
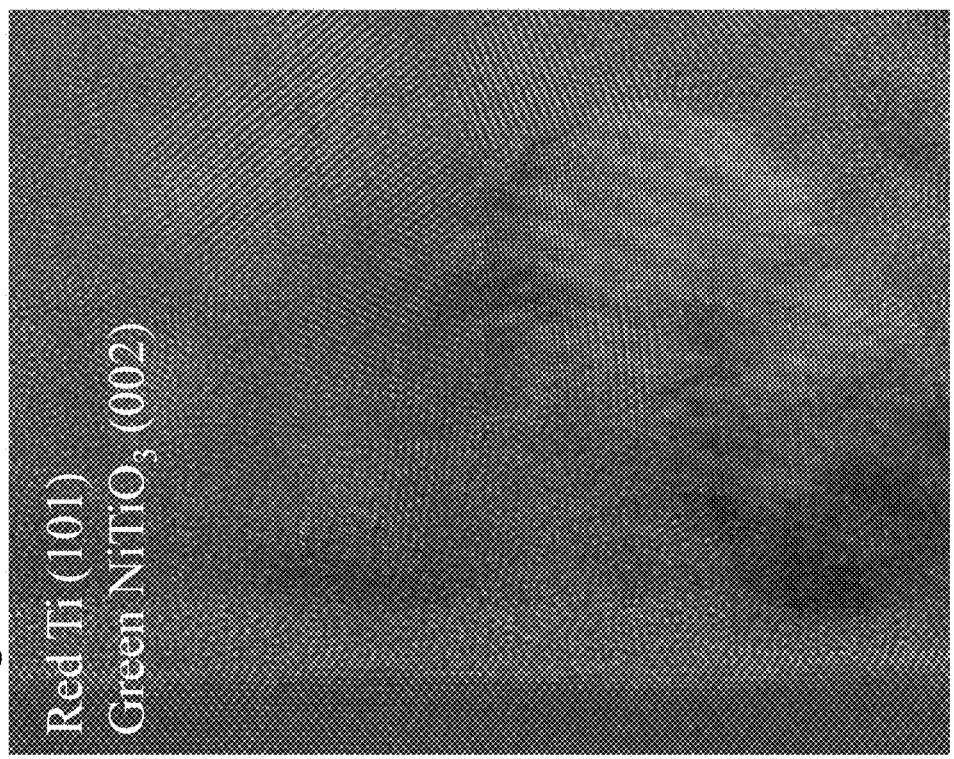
Fig. 26A
Fig. 26B
Red Ti (101)
Green NiTiO$_3$ (002)
Figure 26

ADAPTIVE SOLID-STATE LUMINESCENT PHOSPHORS

CROSS-REFERENCE TO RELATED APPLICATIONS

The present application is a divisional of U.S. patent application Ser. No. 16/140,600 filed on Sep. 25, 2018, now U.S. Pat. No. 11,357,085, which claims priority to U.S. Provisional Application No. 62/562,594, filed Sep. 25, 2017, both of which are incorporated by reference herein in its entirety.

BACKGROUND OF THE INVENTION

As of 2005, the US Department of the Treasury estimated that roughly 60% of all US currency was held abroad, roughly $450 billion (Cameron, et al., The Use and Counterfeiting of United States Currency Abroad, Part 3; Department of the Treasury: 2006). As such, most of this is held in countries with volatile political and economic conditions due to the stability of the dollar over local currencies. Of the currency abroad, it is estimate that 1 in 10,000 bills are counterfeit. The current accepted method of detection is with a commercially available detection pen (Carmeli, Method of Detecting Counterfeit Paper Currency. 1991); however, this can easily be defeated using common household items, such as hairspray.

Since the mid-90s, holograms, among other methods, have played an important role in anti-counterfeit technologies (Hardwick, et al., Adv. Mater. 2001, 13, 980-984). However, these holograms are imbedded into the document and can be lifted from the surface to be reused elsewhere. More recently, anti-counterfeit technologies have focused on downconversion dyes and nanoparticles which emit visible light when excited with <400 nm excitation, concealing images and patterns under standard conditions (Liu, et al., Nanoscale 2011, 3, 4804-4810). These inks can be easily purchased online for the emission of blue, green, red and IR light with a commercially available UV light (Ldp Llc—Maxmax.Com www.maxmax.com).

Alternatively, there are reports of upconversion inks using rare earth (RE) doped nanostructures which convert IR light to visible (Liu, et al., Nanoscale 2011, 3, 4804-4810; You, et al., Nanoscale 2015, 7, 4423-4431). Upconversion phosphors require a detailed knowledge of the system in order to accurately replicate, as the luminescent spectrum is highly dependent on the type and concentration of RE dopants used (Mi, et al., Sci. Rep. 2016, 6, 22545). One of the most common upconversion combinations is $Er^{3+}/Yb^{3+}$ (Dorman, et al., J. Phys. Chem. C 2012, 116, 10333-10340). In this pairing the $Er^{3+}$ is the emitter ion and $Yb^{3+}$ acts as a sensitizer, increasing the amount of light absorb and transferring the energy to the active ions. As the $Yb^{3+}$ concentration is increased, the red-to-green emission ratio increases and results in a "redder" appearance (Mi, et al., Sci. Rep. 2016, 6, 22545). Additionally, it is possible to produce green and blue upconversion luminescence by substituting the $Er^{3+}$ with other RE ions, such as $Tm^{3+}$ (blue) and $Ho^{3+}$ (green). (Yi, et al., J. Mater. Chem. 2005, 15, 4460-4464).

During the incorporation of RE elements into a crystal, the f-orbitals are shielded from external interactions and split into discrete energies (Sun, et al., Annual review of physical chemistry 2015, 66, 619-642). Upon splitting, the parity selection rules begin to break down and to allow for previously forbidden intra-orbital transitions (Judd, Physical Review 1962, 127, 750; Ofelt, The Journal of Chemical Physics 1962, 37, 511-520). This phenomenon allows for distinct transitions which result in a systematic, luminescent "fingerprint" unique to each RE. This fingerprint is nearly identical for all crystal hosts due to the stable 3+ oxidation state (Dieke, et al., Spectra and Energy Levels of Rare Earth Ions in Crystals; Interscience Publishers New York, 1968; Vol. 5). As such, RE luminescence has been the key component in transformative technologies over the past half century, including lasers, optical displays, fiber optic communications, and biological imaging (Zhou, et al., Chemical Reviews 2015, 115, 395-465; Zhou, et al., Nat Nano 2015, 10, 924-936). However, it is also this 3+ oxidation state, and similarity in chemical properties, that make the separation of these materials difficult, requiring environmentally hazardous chemicals. This fact has led to a material dependence on China for the manufacturing of our current technologies (Bauer, et al., Critical Materials Strategy. Energy, D. o., Ed. Washington D.C., 2010; p 166).

Over the past decade there has been a push for the development of alternative luminescent materials to prevent this dependence. One typically avoided class of materials is the first-row transition metal (TM) elements. While this group of elements is known to have an intense range of colors, they are also highly susceptible to the coordination and strength of the bonded ligand (Orgel, J. Chem. Soc. 1952, 4756-4761; Kiang, et al., Quantum Electronics, IEEE Journal of 1965, 1, 295-298). Crystal field theory was developed to describe the d-orbital hybridization and splitting based on metal oxidation state, ligand type, and arrangement of bonds (Van Vleck, Physical Review 1932, 41, 208-215; Griffith, and Orgel, Quarterly Reviews, Chemical Society 1957, 11, 381-393). These parameters can be described with a single term derived by Giulio Racah to define field strengths (Racah's B variable) (Racah, Physical Review 1942, 61, 186; Racah, Physical Review 1942, 62, 438; Racah, Physical Review 1943, 63, 367; Racah, Physical Review 1949, 76, 1352). From crystal field theory, it is possible to predict the optical properties of TM ions in solids and as molecular complexes resulting from the d-orbital splitting, $\Delta$. While the splitting and associated energy level filling is dictated by the number and strength of ligands, the most common structures can be divide into a triply degenerate ($t_{2g}$–$d_{xy}$, $d_{xz}$, $d_{yz}$) and a double degenerate ($e_g$–$d_{x^2-y^2}$, $d_{z^2}$) energy states. To account for the available optical transitions, Tanabe and Sugano created a set energy diagrams for the excited states of a six-fold coordinated (octahedral) molecular complex which are normalized to the crystal field strength ($\Delta$) (Tanabe and Sugano, Journal of the Physical Society of Japan 1954, 9, 753-766; Tanabe and Kamimura, Journal of the Physical Society of Japan 1958, 13, 394-411; Tanabe and Sugano, Journal of the Physical Society of Japan 1954, 9, 766-7791 Tanabe and Sugano, Journal of the Physical Society of Japan 1956, 11, 864-877). These plots can be used to extract crystal field strengths from optical measurements by correlating measured transitions to expected transitions. However, Tanabe-Sugano diagrams have limitations in predicting optical properties of solids due to chemical stabilities and electrostatic interactions required for crystal growth. In order to engineer the electrostatic interactions within a crystal, complex stoichiometries are required.

The challenge with engineering electrostatic interactions lies in the nature and size of the crystal. Specifically, crystal field theory relies on the optical properties of bulk crystals (>100 s of nm) (Orgel, J. Chem. Soc. 1952, 4756-4761; Weakliem, The Journal of Chemical Physics 1962, 36, 2117-2140). However, as the push for smaller, more powerful electronics continues, active material size must decrease. This often results in unwanted energy transfer effects as observed in luminescent materials (Dorman, et al., The Journal of Physical Chemistry C 2012, 116, 10333-10340; Tanaka, et al., Journal of Luminescence 2000, 87, 472-474; Bhargava, et al., Physical Review Letters 1994, 72, 416). Typically, energy transfer is $\propto R^{-6}$, where R is the distance between the excited state and the sink, as defined by Förster and Dexter in the 1960s (Forster, Naturwissenschaften 1946, 33, 166-175; Dexter, The Journal of Chemical Physics 1953, 21, 836-850). Based on this relationship, the energy transfer rapidly decreases within ~10 nm, as seen in experimental results (Dorman, et al., The Journal of Physical Chemistry C 2012, 116, 10333-10340).

In more conventional solid-state physics, extremely high pressures are used to break crystal symmetry and distort electron densities (Li, et al., Inorganic Chemistry 2016, 55, 6770-6775). Similarly, large electric fields can be applied to manipulate electron density. However, application of these external fields is difficult without costly fabrication techniques (Weste and Eshraghian, Principles of Cmos Vlsi Design; Addison-Wesley New York, 1985; Vol. 188). Recently, the ability to control charge injection across a $TiO_2$-organic molecule interface was demonstrated by applying a dipole to the surface (Goh, et al., Journal of Applied Physics 2007, 101, 114503-114503). The surface dipole reorganized the electron density at the interface, acting as a weak diode, and regulated charge transport into the metal oxide. This approach offers an elegant method to reversibly tune interfacial electron density, with dipole field strengths proportional to $R^{-5}$ (Moreno, et al., International journal of quantum chemistry 1994, 52, 829-835). By carefully designing the nanostructures, TM dopants have the potential to play a major role in solid-state luminescence instead of their current application as secondary RE sensitizer (Dan, et al., Materials Letters 2015, 150, 76-80; Tian, G., et al., Advanced Materials 2012, 24, 1226-1231).

There remains a need in the art for nanophosphors that emit specific and tunable wavelengths. This invention addresses this unmet need.

SUMMARY OF THE INVENTION

In one aspect, the present invention relates to a composite material comprising a rare earth doped core; a transition metal doped shell disposed over the core; and a functionalizable group on the surface of the transition metal doped shell. In one embodiment, the composite material forms a shape selected from the group consisting of a core-shell nanoparticle, a nanowire, and a nanorod. The composite material may also comprise a thin film disposed over a substrate. In one embodiment, the composite material is a core-shell nanoparticle. In one embodiment, the rare earth doped core comprises β-$NaYF_4$. In one embodiment, the rare earth doped core comprises at least one rare earth selected from the group consisting of Er, Yb, Tb, Tm, and Ho. In one embodiment, wherein the transition metal doped shell comprises $TiO_2$. In one embodiment, the transition metal doped shell comprises at least one transition metal selected from the group consisting of V, Cr, Mn, Fe, Co, Ni, and Cu, and Bi. In one embodiment, the transition metal doped shell comprises Ni. In one embodiment, the functionalizable group is a hydroxide group. In one embodiment, the transition metal doped shell further comprises Bi. In one embodiment, at least one of the rare earth doped core and the transition metal doped shell comprises $YVO_4$.

In another aspect, the present invention relates to an ink comprising the inventive composite material. In aspect embodiment, the present invention relates to a QR code comprising said ink.

In another aspect, the present invention relates to a method of changing the absorbance or emission spectrum of a nanoparticle, the method comprising: providing a nanoparticle having a rare earth doped core, a transition metal doped shell, and at least one surface functionalizable group; and treating the nanoparticle with at least one carboxylic acid; wherein the absorbance or emission spectrum of the nanoparticle is changed upon treatment with the carboxylic acid. In one embodiment, the step of treating the core-shell nanoparticle with at least one carboxylic acid comprises: treating the nanoparticle with a first carboxylic acid; and treating the nanoparticle with a second carboxylic acid. In one embodiment, the carboxylic acid is selected from the group consisting of para-(fluorosulfonyl)benzoic acid, para-nitrobenzoic acid, para-cyanobenzoic acid, para-bromobenzoic acid, benzoic acid, para-methoxybenzoic acid, and para-aminobenzoic acid.

In another aspect, the present invention relates to a method of identifying counterfeit currency, the method comprising the steps of: providing an ink having a core-shell nanoparticle with surface functionalizable groups; applying the ink during the minting of authentic currency; treating a currency sample with a solution comprising a carboxylic acid; and exposing the currency sample to UV light; wherein the treatment with carboxylic acid changes the emission wavelength of the core-shell nanoparticle. In one embodiment, the core-shell nanoparticle comprises a transition metal doped shell disposed over a rare earth doped core. In one embodiment, the transition metal doped shell comprises at least one transition metal selected from the group consisting of V, Cr, Mn, Fe, Co, Ni, and Cu.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIGS. 1A to 1C, depicts the nanoparticle design and dual luminescence effects. FIG. 1A depicts the core-shell nanophosphor construction. FIG. 1B is an inset depicting the functionalization of the surface of the nanophosphor. FIG. 1C depicts a $100 bill under UV excitation before (top) and after (bottom) application of a chemical agent.

FIGS. 2A and 2B, depicts the effect of crystal structure and chemical treatment on absorption. FIG. 2A plots how the $Cr^{3+}$ absorption changes in a Ruby and an Emerald due to crystal structure. Insets show the respective geometries of the transition metal complexes. FIG. 2B depicts possible $Er^{3+}$ upconversion mechanisms after chemical treatment for red and green emission.

FIG. 3, comprising FIGS. 3A to 3D, depicts yttrium core-shell and core-multishell nanostructure characterization. FIG. 3A is a plot showing Y—Y and Y—O bond lengths as a function of annealing temperature in the conversion of Y(OH)$_4$ to Y$_2$O$_3$. FIG. 3B is a TEM image showing the precise Y$_2$O$_3$|Yb$_2$O$_3$ interface of a core-shell nanoparticle. FIG. 3C depicts the CIE color coordinates of a core-multi shell phosphor with controlled energy transfer between layers. FIG. 3D is an inset showing the emission spectrum and the rare earths responsible for each peak.

FIGS. 4A to 4D, depicts the soft XAS (CAMD), x-ray photoemission spectroscopy (XPS), and UV-Vis absorption of a thin film of Ni$^{2+}$-doped TiO$_2$ with and without surface functionalization. FIG. 4A is a plot of the XAS of the O K edge of an undoped thin film, a doped thin film, and doped thin films functionalized with para-substituted benzoic acids. Inset shows the NiO-like (decreased cation oxidation state) and TiO$_2$-like (increased cation oxidation state) regions. FIG. 4B is a plot of the XAS of the Ni LIII/LII edges of a doped thin film and doped thin films functionalized with para-substituted benzoic acids. FIG. 4C is a plot of the XPS scans of an undoped thin film, a doped thin film, and doped thin films functionalized with para-substituted benzoic acids, indicating a change in electron density between the four thin films. FIG. 4D depicts the shift in Ni$^{2+}$ absorption with functionalization in comparison to the NaYF$_4$:Er$^{3+}$|Y(OH)$_3$ system.

FIGS. 6A and 6B, depicts the TEM and EELS of Fe$_3$O$_4$|MnFe$_2$O$_4$ nanoparticles. FIG. 6A is a TEM of the nanoparticles. FIG. 6B is an EELS of the nanoparticles, showing the location of Fe (green) and Mn (purple) ions.

FIGS. 7A and 7B, depicts a time dependent density functional theory (TD-DFT) model for the study of Ni$^{2+}$-doped TiO$_2$. FIG. 7A depicts the 123 atom model for a "bulk" solid material. FIG. 7B depicts the model functionalized with a para-substituted benzoic acid.

FIG. 9A shows the $t_{2g}$:$e_g$ intensity ratio in Ni L$_{II}$ edge, observed to be a function of the dipole moment of the ligand. This spectral difference with the dipoles indicates the change in the hybridization of the Ni—O bond in TiO$_2$:Ni. FIG. 9B shows that the influence of the ligand on the core-levels of Ni (2p) is not observed in XPS due to the strong atomic multiplet coupling.

FIGS. 10A to 10D, depicts the effect of weak field tuning on the host. FIG. 10A shows the broadening of the peaks in the O (2p)-Ti/Ni (4sp) hybridization region in the O K edge. FIG. 10B shows the dampening of the $e_g$ shoulder peak in the Ti L$_{III}$ edge. These two plots indicate non-cubic structural distortion upon Ni doping in anatase TiO$_2$ crystal. This geometric distortion is attributed to the oxygen vacancies that are formed in the lattice due to charge compensation. FIG. 10C shows The energy difference between the $t_{2g}$ and $e_g$ hybridization peaks ($\Delta E$) in the lower energy region of O K edge. FIG. 10D shows the full width at half-maximum (FWHM) of the $e_{2g}$ peak in the Ti L$_{II}$ edge, which is observed to increase with the adsorbate dipole moment, suggesting that the difference in the crystal field splitting energy (10 Dq) of the TiO$_2$:Ni films is due to the change in the hybridization of the metal-oxygen bond.

FIGS. 11A and 11B, depicts a comparison between the measured and modeled Ni L$_{III/II}$ edge in TiO$_2$:Ni films functionalized with para-benzoic acid (BZA) ligands (R=NO$_2$, 3.8 D and R=NH$_2$, −4.5 D). FIG. 11A depicts the experimental results. FIG. 11B depicts the results from computational modeling experiments.

FIGS. 12A and 12B, show a preliminary model of a Ti anatase cluster. FIG. 12A shows the Ti$_9$O$_{38}$H$_{60}$ anatase cluster prepared by covalently embedded procedure, wherein the boundary O atoms are passivated by pseudo H atoms to replicate the bulk Ti atoms. FIG. 12B shows the simulated XANES spectra of Ti L edge using Real time (RT)-Time Dependent Density Functional Theory (TDDFT) approach. The doublet of the $e_g$ peak in the Ti L$_{III}$ edge is attributed to the lowering of the Ti symmetry from O$_h$ to D$_{2d}$ in anatase crystal structure (insert).

FIG. 13A shows the UV-Vis absorption spectra of NaYF$_4$:Er$^{3+}$|Y(OH)$_3$:Ni$^{2+}$ core-shell nanoparticles (NPs) and demonstrates that the Ni$^{2+}$ absorption spectra can be shifted by ~70 nm with weak chemical dipoles. FIG. 13B shows the Ni$^{2+}$ sensitized Er$^{3+}$ emission in NaYF$_4$:Er|Y(OH)$_3$:Ni core-shell NPs, demonstrating higher luminescence intensities for Er$^{3+}$ emission at 575 nm. FIG. 13C shows the power dependence of luminescence intensity of green and blue emissions in Ni$^{2+}$ sensitized Er$^{3+}$ follows similar trend as that of Yb sensitized Er emission, demonstrating that Ni$^{2+}$ is a suitable replacement for Yb$^{3+}$ sensitizer in upconversion phosphors. All of these optical characterization results point to the ability of Ni$^{2+}$ to sensitize Er$^{3+}$ emission for tunable optical responses via adaptive absorption of the Ni$^{2+}$ ion.

FIGS. 14A and 14B, shows the effect of aging time on segregation. TiO$_2$:Ni (15 mol %) nanoparticles are quantified using XRD and UV-Vis to demonstrate the structure-processing-property relationship. FIG. 14A shows the XRD pattern of TiO$_2$:Ni (15 mol %) NPs that are annealed directly after drying or aged after drying show a clear difference with respect to the formation of NiO. FIG. 14B shows that the absorption peaks are broadened or shifted in Ni doped TiO$_2$ when compared to the NiO segregated TiO$_2$ nanoparticles. These results show that the optoelectronic properties of the highly doped TiO$_2$-based materials can be tuned by varying the processing parameters.

FIGS. 15A and 15B, shows the effect of aging time on segregation due to the hydroxyl cluster formation. The chemical changes during the aging of TiO$_2$:Ni (15 mol %) dried powders is observed from FTIR and time-resolved UV-Vis absorption measurements. FIG. 15A shows the FTIR spectra of TiO$_2$:Ni (15 mol %) dried powders that are aged in air for 48 h, which indicate an increase in the surface hydroxyl concentration (3500 cm$^{-1}$) accompanied by dampening of the C—H alkane stretches around 2900 cm$^{-1}$. FIG. 15B shows that the UV-Vis absorption peaks are systematically shifted to lower wavelengths upon aging in air, indicating an increase in the ligand field strength (10 Dq) due to the bonding of the cation to more electronegative groups (—OH). Both of these results suggest that amorphous metal hydroxide clusters are formed upon aging in air, which further transform into metal oxide clusters after annealing.

FIGS. 16A and 16B, show a similar phenomenon of dopant incorporation and dopant segregation in TiO$_2$:Co (15 mol %) nanoparticles. FIG. 16A is an XRD pattern of TiO$_2$:Co$^{2+}$ (15 mol %) NPs and shows that rapid annealing can lock the dopants in the host lattice without forming a segregated $Co_3O_4$ phase. FIG. 16B depicts the UV-Vis absorption spectra of Co doped $TiO_2$ and $Co_3O_4$ segregated $TiO_2$ nanoparticles. These results further reinforce the structure-processing-property relationship in highly doped $TiO_2$ materials, wherein the crystal structure is controlled by varying the annealing rate to obtain modified optical properties.

FIG. 17A shows the XRD pattern of $TiO_2:Fe^{2+}$ (15 mol %) NPs. FIG. 17B shows the XRD pattern of) $TiO_2:Cr^{3+}$ (15 mol %) NPs.

FIGS. 18A and 18B, show the luminescence properties of $YVO_4:Eu^{3+}$ $YVO_4:Bi^3$ core-shell nanoparticles. FIG. 18A shows the PL excitation spectra of $YVO_4:Eu^{3+}$ (5 mol %), $YVO_4:Eu^{3+}$ (5 mol %), $Bi^{3+}$ (6 mol %), and $YVO_4:Eu^{3+}$ (5 mol %)|$YVO_4:Bi^{3+}$ (6 mol %) core-shell NPs. FIG. 18B shows the shift in the excitation spectra of $YVO_4:Eu^{3+}$ (5 mol %)|$YVO_4:Bi^{3+}$ (6 mol %) core-shell NPs ~30 nm using weak chemical dipoles (para-substituted benzoic acid ligands). This property of tunable excitation can be exploited to selectively tune the emission intensities for select applications.

FIG. 19A shows the phosphorescent lifetime of $YVO_4:Eu^{3+}$ (5 mol %), $YVO_4:Eu^{3+}$ (5 mol %), $Bi^{3+}$ (6 mol %), and $YVO_4:Eu^{3+}$ (5 mol %)|$YVO_4:Bi^{3+}$ (6 mol %) core-shell NPs. FIG. 19B shows the phosphorescent lifetimes of para-substituted $YVO_4:Eu^{3+}$ (5 mol %)|$YVO_4:Bi^{3+}$ (6 mol %) core-shell NPs. There is a slight reduction in the lifetimes of the ligand bonded core-shell NPs.

FIGS. 20A and 20B, depicts AFM images of annealed thin films. FIG. 20A depicts the AFM image of a $TiO_2$ thin film. FIG. 20B depicts the AFM image of a $TiO_2:Ni$ (15 mol %) thin film. AFM scans were performed on Agilent 4500 microscope in contact mode. The scanning area was 2×2 $\mu m^2$ and the images were processed using Gwyddion software for calculating roughness and other parameters. The roughness of pure $TiO_2$ thin film was obtained as 2-3 nm whereas the Ni doped film was about 40-50 nm.

FIGS. 21A and 21B, depict imaging and quantification of $TiO_2:Ni$ (15 mol %) thin films. FIG. 21A shows the UV-Vis absorption spectra, inset shows the $O_h$ coordination of $Ni^{2+}$ and electronic transitions according to theory. FIG. 21B shows the GI-XRD pattern of $TiO_2$ thin film indexed to anatase $TiO_2$ (JCPDS #12-1272).

FIG. 24, comprising FIGS. 24A to 24D, shows Ni-dense regions of a $TiO_2:Ni$ film. FIG. 24A is a bright field HRTEM image of the $TiO_2:Ni$ films showing $TiO_2$ and Ni dense regions (highlighted in yellow). FIG. 24B is an EELS chemical map of Ni. FIG. 24C is an EELS chemical map of Ti. FIG. 24D is an EELS chemical map of O. The EELS chemical maps demonstrate the high and low concentration Ni phases. The scale bars in FIG. 24 correspond to 5 nm.

FIG. 25, comprising FIGS. 25A and 25B, depicts SAED and FFT patterns of $TiO_2:Ni$ (15 mol %) film on Si substrate. The lattice spacings were extracted as 3.54 Å and 1.91 Å for (101) and (020) planes of $TiO_2$ (red), and 2.12 Å for (002) plane of $NiTiO_3$ (green). FIG. 25A depicts the SAED pattern. FIG. 25B depicts the FFT pattern.

FIG. 26, comprising FIGS. 26A and 26B, depicts TEM imaging of $TiO_2:Ni$. FIG. 26A is a dark field TEM image. FIG. 26B is an HRTEM image of $TiO_2:Ni$ (15 mol %) superimposed with $TiO_2$ (red) and $NiTiO_3$ (green) planes.

FIGS. 27A to 27D, depicts EELS imaging and spectra of three regions of Ni: I (Ni poor), II (Ni present), and III (Ni rich) in $TiO_2:Ni$ (15 mol %) films. FIG. 27A is an EELS image indicating the three regions. FIG. 27B is an EELS spectra of Ti $L_{III,II}$ in the three highlighted regions. FIG. 27C is an EELS spectra of O K in the three highlighted regions. FIG. 27D is an EELS spectra of Ni $L_{III,II}$ in the three highlighted regions. The inability to identify Ni L edge in Ni poor region is attributed to the high detection limit of the spectrometer FIG. 28, comprising FIG. 28A depicts the results from survey scans. FIG. 28B depicts the XPS of Ti 2p. FIG. 28C depicts the XPS of O 1s. FIG. 28D depicts the XPS of Ni 2p. A shift in intensities from the $O_1$ (lattice oxygen) to the $O_2$ (sub-lattice oxygen) with Ni doping is observed and attributed to oxygen defects for charge compensation.

FIGS. 29A to 29D, depicts the Ti 2p and O 1s deconvoluted spectra for pure $TiO_2$ and $TiO_2:Ni$ film. FIG. 29A depicts the deconvoluted Ti 2p for pure $TiO_2$. FIG. 29B depicts the deconvoluted Ti 2p for $TiO_2:Ni$ (15 mol %) films. FIG. 29C depicts the deconvoluted O 1s for pure $TiO_2$. FIG. 29D depicts the deconvoluted O 1s for $TiO_2:Ni$ (15 mol %) films.

FIG. 32A to 32C, depicts the deconvoluted Ni 2p XPS spectra of various thin films. FIG. 32A is the deconvoluted Ni 2p XPS spectrum of $TiO_2:Ni$ (15 mol %). FIG. 32B is the deconvoluted Ni 2p XPS spectrum of $TiO_2:Ni|NO_2$—BZA. FIG. 32C is the deconvoluted Ni 2p XPS spectrum of $TiO_2:Ni|NH_2$—BZA.

FIGS. 33A to 33D, depicts deconvoluted XANES spectra. FIG. 33A is a deconvoluted XANES spectrum of the O K edge in ligand bonded $TiO_2:Ni$ films. FIG. 33B is a deconvoluted XANES spectrum of the Ti L edge in a $TiO_2:Ni$ film. FIG. 33C is a deconvoluted XANES spectrum of the Ti L edge in a $TiO_2:Ni|NO_2$—BZA film. FIG. 33D is a deconvoluted XANES spectrum of the Ti L edge in a $TiO_2:Ni|NH_2$—BZA film.

FIGS. 35A to 35C, depicts experimental and modeled Ni $L_{III/II}$ edge spectra of surface-modified $TiO_2$:Ni (15 mol %). FIG. 35A depicts the experimental Ni Lull edge spectra of surface modified $TiO_2$:Ni (15 mol %) films showing a change in the branching ratio ($t_{2g}/e_g$) in $L_{II}$ edge as a function of the ligand. FIG. 35B shows a comparison between calculated and experimental data for the Ni $L_{III/II}$ edge spectra using computer program CTM4XAS for $O_h$/$NH_2$—BZA (top) and $D_{4h}$/$NO_2$—BZA (bottom) $Ni^{2+}$ symmetry. FIG. 35C shows ball-and-stick representations of octahedral ($O_h$) symmetry, square planar symmetry, and distorted octahedral symmetry and are shown to highlight the change in local symmetry. The calculated spectra were shifted by a constant (1 eV) to match the absolute values of the experimental spectra.

FIGS. 36A to 36C, depicts the interplay between the surface dipole, electronic states, p-d hybridization, and the crystal field splitting energy of $Ni^{2+}$ 3d orbitals. FIG. 36A shows the electronic density of states in $TiO_2$:N. FIG. 36B shows the energy of the Ni 3d states. FIG. 36C shows the crystal field splitting energy (10 Dq) of the solid with the ligand.

FIGS. 37A and 37B, depicts TGA and DSC plots of amorphous $TiO_2$:Ni (15 mol %) powders showing differences in weight loss and heat flow with respect to the aging time of the dried powders. FIG. 37A is a TGA plot of an amorphous $TiO_2$:Ni (15 mol %) powder. FIG. 37B is a DSC plot of an amorphous $TiO_2$:Ni (15 mol %) powder.

DETAILED DESCRIPTION

Figure 1:
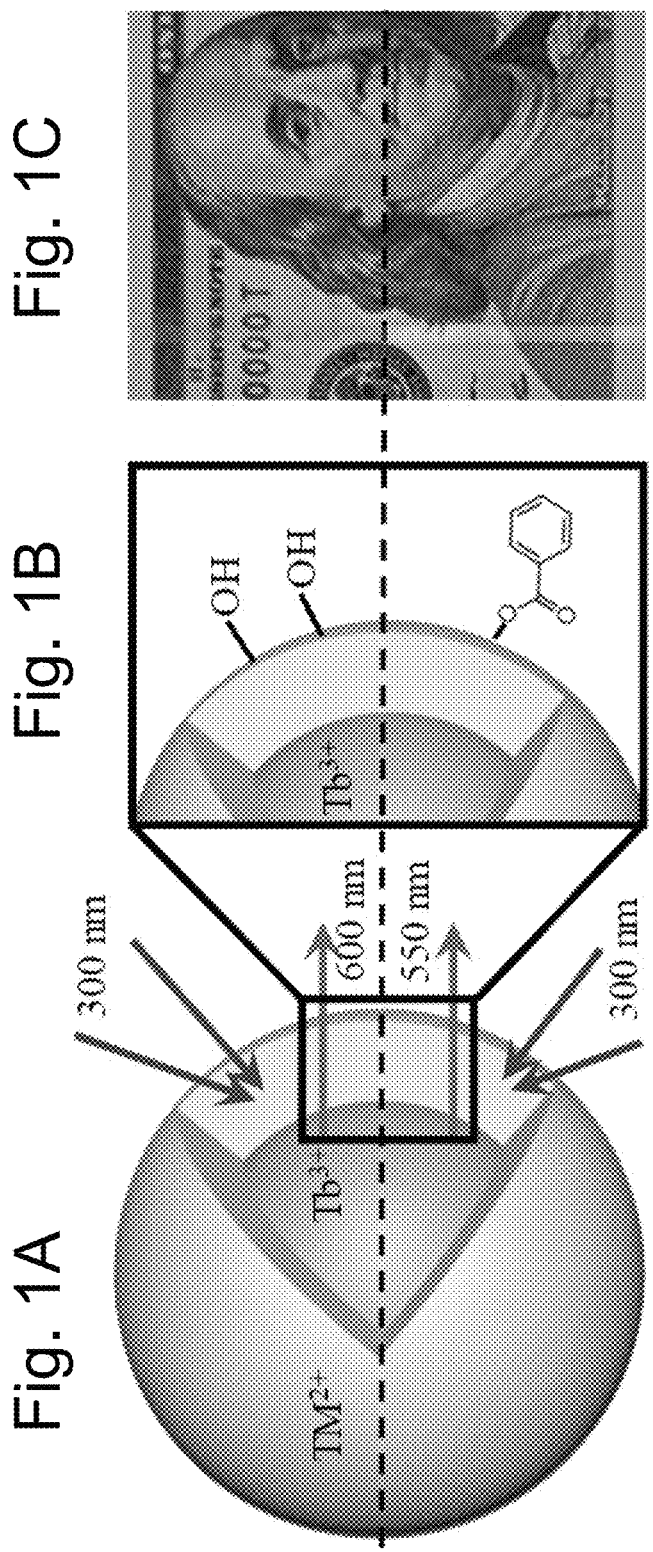
FIG. 1, comprising

The invention relates to adaptive nanophosphors that demonstrate specific wavelengths that are tunable through transition metal doping and surface treatments.

Definitions

It is to be understood that the figures and descriptions of the present invention have been simplified to illustrate elements that are relevant for a clear understanding of the present invention, while eliminating, for the purpose of clarity, many other elements found in the art related to thin film production, nanoparticles, doped materials, and the like. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials and components similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Description

In one aspect, the invention relates to a composite material comprising a transition metal doped shell disposed over a rare earth doped core, wherein the thin film possesses surface functionalizable groups.

The composite material can be of any shape known to those of skill in the art. In one embodiment, the composite material is a nanowire, wherein the transition metal doped shell forms a sheath over the rare earth doped core. In another embodiment, the composite material is a multilayered thin film disposed over a substrate. In another embodiment, the composite material is a core-shell nanoparticle with a rare earth doped core and a transition metal doped shell.

In one embodiment, the rare earth doped core comprises a transparent material which effectively separates rare earth ions. In one embodiment, the rare earth doped core comprises $NaYF_4$, $NaGdF_4$, $LiYF_4$, $Gd_2O_3$, $LaGaO_3$, $Sc_2O_3$, $Y_3Al_5O_{12}$ (YAG), $YVO_4$, $Y(OH)_3$, $YF_3$, $CaF_2$, $HfO_2$, $ZrO_2$, $TiO_2$, or $Lu_2O_3$. In one embodiment, the rare earth doped core comprises $NaYF_4$. In one embodiment, the rare earth doped core comprises β-$NaYF_4$.

In some embodiments, the rare earth doped core comprises at least one rare earth element selected from the group consisting of cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), strontium (Sr), terbium (Tb), thulium (Tm), ytterbium (Yb) and yttrium (Y). In one embodiment, the rare earth doped core comprises Er. In one embodiment, the rare earth doped core comprises Yb. In one embodiment, the rare earth doped core comprises Ho. In one embodiment, the rare earth doped core comprises Tm. In one embodiment, the rare earth doped core comprises Tb. In one embodiment, the rare earth doped core comprises more than one rare earth element.

In one embodiment, the rare earth element content of the rare earth doped core is between 0 mol % and 100 mol %. In one embodiment, the rare earth element content of the rare earth doped core is between 0 mol % and 75 mol %. In one embodiment, the rare earth element content of the rare earth doped core is between 0 mol % and 50 mol %. In one embodiment, the rare earth element content of the rare earth doped core is between 0 mol % and 25 mol %. In one embodiment, the rare earth element content of the rare earth doped core is between 0.1 mol % and 25 mol %. In one embodiment, the rare earth element content of the rare earth doped core is between 0.2 mol % and 25 mol %. In one embodiment, the rare earth element content of the rare earth doped core is between 0.3 mol % and 25 mol %. In one embodiment, the rare earth element content of the rare earth doped core is between 0.4 mol % and 25 mol %. In one embodiment, the rare earth element content of the rare earth doped core is between 0.5 mol % and 25 mol %. In one embodiment, the rare earth element content of the rare earth doped core is between 0.5 mol % and 10 mol %. In one embodiment, the rare earth element content of the rare earth doped core is about 0.5 mol %. In one embodiment, the rare earth element content of the rare earth doped core is about 1.0 mol %. In one embodiment, the rare earth element content of the rare earth doped core is about 2.0 mol %. In one embodiment, the rare earth element content of the rare earth doped core is about 3.0 mol %. In one embodiment, the rare earth element content of the rare earth doped core is about 4.0 mol %. In one embodiment, the rare earth element content of the rare earth doped core is about 5.0 mol %. In one embodiment, the rare earth element content of the rare earth doped core is about 6.0 mol %. In one embodiment, the rare earth element content of the rare earth doped core is about 10 mol %. In one embodiment, the rare earth element content of the rare earth doped core is about 15 mol %. In one embodiment, the rare earth element content of the rare earth doped core is about 20 mol %.

In some embodiments, the rare earth doped core comprises anything that emits light. For example, in some embodiments, the rare earth doped core comprises a first row transition metal such as titanium (Ti), vanadium (V), chromium (Cr), manganese (Mn), iron (Fe), cobalt (Co), nickel (Ni), copper (Cu), and zinc (Zn). In one embodiment, the rare earth doped core comprises more than one material that emits light. In one embodiment, the rare earth doped core comprises a rare earth element and a transition metal.

In one embodiment, the rare earth doped core is less than 100 nm in diameter. In one embodiment, the rare earth doped core is less than 80 nm in diameter. In one embodiment, the rare earth doped core is less than 60 nm in diameter. In one embodiment, the rare earth doped core is less than 50 nm in diameter. In one embodiment, the rare earth doped core is less than 40 nm in diameter. In one embodiment, the rare earth doped core is less than 30 nm in diameter. In one embodiment, the rare earth doped core less than about 20 nm in diameter. In one embodiment, the rare earth doped core is less than about 10 nm in diameter.

The rare earth doped core can be fabricated using any method known to those of skill in the art, including, but not limited to, hydrothermal/solvothermal methods, molten salt methods, sol-gel, co-precipitation, colloidal distribution, and thermal decomposition methods.

In one embodiment, the transition metal doped shell comprises a transparent material known to those in the art. In one embodiment, the transition metal doped shell comprises a metal or metalloid. In one embodiment, the transition metal doped shell comprises an oxide, sulfide, selenide, or fluoride. Exemplary transparent materials include, but are not limited to, $TiO_2$, $Al_2O_3$, $Be_3Al_2SiO_6$, $Y_2O_3$, $Y(OH)_4$, $Y(OH)_3$, $YVO_4$, $Yb_2O_3$, NiO, $SiO_2$, CdSe, $La_2O_3$, $Lu_2O_3$, ZnO, $Sc_2O_3$, $ZrO_2$, and $HfO_2$. In one embodiment, the transition metal doped shell comprises $TiO_2$. In one embodiment, the transition metal doped shell comprises $Y_2O_3$. In one embodiment, the transition metal doped shell comprises $SiO_2$.

In one embodiment, the transition metal doped shell comprises at least one transition metal. Exemplary transition metals include, but are not limited to, titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), and mercury (Hg). In one embodiment, the transition metal doped shell comprises a transition metal selected from the group consisting of Ti, V, Cr, Mn, Fe, Co, Ni, Cu, and Zn. In one embodiment, the transition metal doped shell comprises Ni. In one embodiment, the transition metal doped shell comprises Cr. In one embodiment, the transition metal doped shell comprises Cu. In one embodiment, the transition metal doped shell comprises Fe. In one embodiment, the transition metal doped shell comprises Mn. In one embodiment, the transition metal doped shell comprises Co. In one embodiment, the transition metal doped shell comprises V. In one embodiment, the transition metal doped shell does not include a rare earth. In one embodiment, the transition metal doped shell further comprises Bi.

In one embodiment, the transition metal element content of the transition metal doped shell is between 0 mol % and 100 mol %. In one embodiment, the transition metal element content of the transition metal doped shell is between 0 mol % and 75 mol %. In one embodiment, the transition metal element content of the transition metal doped shell is between 0 mol % and 50 mol %. In one embodiment, the transition metal element content of the transition metal doped shell is between 0 mol % and 25 mol %. In one embodiment, the transition metal element content of the transition metal doped shell is between 0.1 mol % and 25 mol %. In one embodiment, the transition metal element content of the transition metal doped shell is between 0.2 mol % and 25 mol %. In one embodiment, the transition metal element content of the transition metal doped shell is between 0.3 mol % and 25 mol %. In one embodiment, the transition metal element content of the transition metal doped shell is between 0.4 mol % and 25 mol %. In one embodiment, the transition metal element content of the transition metal doped shell is between 0.5 mol % and 25 mol %. In one embodiment, the transition metal element content of the transition metal doped shell is about 0.5 mol %. In one embodiment, the transition metal element content of the transition metal doped shell is about 1.0 mol %. In one embodiment, the transition metal element content of the transition metal doped shell is about 2.0 mol %. In one embodiment, the transition metal element content of the transition metal doped shell is about 3.0 mol %. In one embodiment, the transition metal element content of the transition metal doped shell is about 4.0 mol %. In one embodiment, the transition metal element content of the transition metal doped shell is about 5.0 mol %. In one embodiment, the transition metal element content of the transition metal doped shell is about 6.0 mol %. In one embodiment, the transition metal element content of the transition metal doped shell is about 10 mol %. In one embodiment, the transition metal element content of the transition metal doped shell is about 15 mol %. In one embodiment, the transition metal element content of the transition metal doped shell is about 20 mol %.

In one embodiment, the transition metal doped shell is between 2 nm and 100 nm thick. In one embodiment, the transition metal doped shell is between 2 nm and 80 nm thick. In one embodiment, the transition metal doped shell is between 2 nm and 60 nm thick. In one embodiment, the transition metal doped shell is between 2 nm and 40 nm thick. In one embodiment, the transition metal doped shell is between 2 nm and 20 nm thick. In one embodiment, the transition metal doped shell is between 2 nm and 15 nm thick. In one embodiment, the transition metal doped shell is between 3 nm and 14 nm thick. In one embodiment, the transition metal doped shell is between 4 nm and 13 nm thick. In one embodiment, the transition metal doped shell is between 5 nm and 12 nm thick. In one embodiment, the transition metal doped shell is about 5 nm thick. In one embodiment, the transition metal doped shell is about 10 nm thick.

The transition metal doped shell can be deposited using any method known in the art, including, but not limited to, thin film sol-gel chemistry, atomic layer deposition, chemical vapor deposition, and sputtering.

In one embodiment, the transition metal doped shell comprises at least one layer. In one embodiment, the transition metal doped shell comprises one layer. In one embodiment, the transition metal doped core comprises two layers.

In one embodiment, the surface of the transition metal doped shell comprises a functionalizable group. Exemplary functionalizable groups include hydroxide groups (—OH), amine groups (—NH$_2$), silane groups (—SiH$_3$), siloxane groups (—OSiR$_3$) and thiol groups (—SH). In one embodiment, the surface of the transition metal doped shell comprises free hydroxide groups.

In one embodiment, the surface of the transition metal doped shell exhibits a surface dipole. In one embodiment, the surface dipole interacts with the energy levels of the transition metal in the transition metal doped shell. In one embodiment, tuning the surface dipole can tune the energy levels in the transition metal in the transition metal doped shell. In one embodiment, the surface dipole can be tuned by functionalizing the surface functionalizable groups, such as through chemical reaction or through changes in the chemical environment.

In one embodiment, the transition metal in the transition metal doped shell facilitates upconversion, wherein the light emitted by the composite material is higher in energy than the light absorbed by the composite material. In one embodiment, the transition metal in the transition metal doped core facilitates downconversion, wherein the light emitted by the composite material is lower in energy than the light absorbed by the composite material. In one embodiment, the transition metal in the transition metal doped shell sensitizes the rare earth in the rare earth doped core.

In one embodiment, functionalization of the surface groups on the surface of the transition metal doped shell changes the absorbance and/or emission energies of the resulting composite material. In one embodiment, functionalization of the surface groups on the surface of the transition metal doped shell decreases the emission wavelength of the composite material relative to a non-functionalized composite material. In one embodiment, functionalization of the surface groups on the surface of the transition metal doped shell increases the emission wavelength of the composite material relative to a non-functionalized composite material.

In one embodiment, the functionalizable groups on the surface of the transition metal doped shell are treated with at least one carboxylic acid. In one embodiment, the functionalizable groups on the surface of the transition metal are treated with a mixture of carboxylic acids.

Inks

In one aspect, the present invention relates to inks comprising the composite material of the instant invention. In one embodiment, the ink comprises glycerol. In one embodiment, the ink comprises at least one composite material. In some embodiments, the ink comprises more than one composite material. In one embodiment, the composite material in the ink possesses surface functionalizable groups as described elsewhere herein.

The inks may be used for any purpose known to one of skill in the art. In one embodiment, ink comprising the composite material of the instant invention is used in the printing of currency. In one embodiment, ink comprising the composite material of the instant invention is used in the manufacture of clothing. In one embodiment, ink comprising the composite material of the instant invention is used in the printing of documents.

In one embodiment, ink comprising the composite material of the instant invention is used in the printing of quick response "QR" codes. In one embodiment, the ink comprising the composite material of the instant invention further comprises at least one dye. In one embodiment, ink comprising the composite material of the instant invention presents a different "QR" code upon exposure to a light source such as UV, visible, or infrared light.

Methods

In one aspect, the present invention relates to a method of tuning the absorbance/emission spectrum of a composite material by functionalizing functionalizable groups on the surface of the composite material.

In one embodiment, the surface dipole of the surface of the transition metal doped shell is tuned by chemical modification of the functionalizable groups. In one embodiment, the chemical modification comprises a self-limiting carboxylic reaction. In one embodiment, treating the functionalizable group on the surface of the transition metal doped shell with a carboxylic acid changes the surface dipole of the surface of the transition metal doped shell. In one embodiment, changing the surface dipole of the surface of the transition metal doped shell changes the coordination geometry of the transition metal element. In one embodiment, changing the surface dipole of the surface of the transition metal doped shell changes the absorbance or emission spectrum of the transition metal element. In one embodiment, different carboxylic acids produce different changes in absorbance or emission spectra.

Exemplary carboxylic acids include, but are not limited to, formic acid; alkyl carboxylic acids such as acetic acid, propionic acid, and butyric acid; halo-alkyl acids such as chloroacetic acid, dichloroacetic acid, trichloroacetic acid, and trifluoroacetic acid; aromatic carboxylic acids such as benzoic acid, para-(fluorosulfonyl)benzoic acid, para-nitrobenzoic acid, para-cyanobenzoic acid, para-(trifluoromethyl)benzoic acid, para-methoxybenzoic acid, para-bromobenzoic acid, para-chlorobenzoic acid, para-fluorobenzoic acid, para-aminobenzoic acid, para-mercaptobenzoic acid, benzene-1,4-dicarboxylic acid, benzene-1,3-dicarboxylic acid, and benzene-1,2-dicarboxylic acid; amino acids such as biotin; and diacids such as oxalic acid, malonic acid, succinic acid, maleic acid, fumaric acid, itaconic acid, and tartaric acid; organic dyes such as 5(6)-FAM, 5(6)-TAMRA, 5(6)-carboxyfluorescein, 5(6)-carboxynaphthofluorescein, 5-FAM, 5-ROX, 5-TAMRA, 6-FAM, 6-ROX, 6-TAMRA, 7-diethylaminocoumarin-3- carboxylic acid, 7-hydroxy-4-methylcoumarin-3-acetic acid, 7-hydroxycoumarin-3-carboxylic acid, 7-methoxycoumarin-3-carboxylic acid, BODIPY® FL, BODIPY® FL C5, DMACA, NBD-X, Oregon Green® 488 carboxylic acid (5-isomer), Oregon Green® 514 carboxylic acid, carboxymethylthiobimane, 5-(and-6)-carboxyl-2',7'-dichlorofluorescein diacetate, Cy3 carboxylic acid, monosulfo Cy3 carboxylic acid, disulfo Cy3 carboxylic acid, Cy5 carboxylic acid, monosulfo Cy5 carboxylic acid, disulfo Cy5 carboxylic acid, Cy5.5 carboxylic acid, Cy7 carboxylic acid, and disulfo Cy7 carboxylic acid; solubility enhancers such as polyethylene glycol carboxylic acid (mPEG-COOH), O-(2-carboxyethyl)-O'-methyl-undecaethylene glycol, 2-[2-(2-methoxyethoxy)ethoxy]acetic acid, methoxypolyethylene glycol acetic acid, methoxypolyethylene glycol propionic acid, O-methyl-O'-succinylpolyethylene glycol, and O-[2-(3-succinylamino)ethyl]-O'-methyl-polyethylene glycol. In one embodiment, the carboxylic acid is a para-substituted benzoic acid. In one embodiment, the carboxylic acid is selected from the group consisting of para-(fluorosulfonyl) benzoic acid, para-nitrobenzoic acid, para-cyanobenzoic acid, para-bromobenzoic acid, benzoic acid, para-methoxybenzoic acid, and para-aminobenzoic acid. In one embodiment, the carboxylic acid is para-nitrobenzoic acid. In one embodiment, the carboxylic acid is para-aminobenzoic acid.

In another aspect, the present invention relates to a method of identifying counterfeit currency. In one embodiment, the method includes the steps of providing an ink having a core-shell nanoparticle with surface functionalizable groups; applying the ink during the minting of authentic currency; treating a currency sample with a solution comprising a carboxylic acid; and exposing the currency sample to UV light. In one embodiment, the core-shell nanoparticle comprises a transition metal doped shell disposed over a rare earth doped core.

In one embodiment, the method can be used to identify counterfeit currency. In one embodiment, the currency is a paper currency. In one embodiment, the currency is minted, such as by a governing body. In one embodiment, at least one region of the currency is printed using an ink comprising the inventive composite material. In one embodiment, at least one region of the currency is printed using an ink comprising a core-shell nanoparticle with surface functionalizable groups. In one embodiment, an ink comprising a core-shell nanoparticle with surface functionalizable groups is applied during the minting process.

In one embodiment, a currency sample is provided. The currency is necessarily either authentic currency comprising a core-shell nanoparticle with surface functionalizable groups or counterfeit currency lacking a core-shell nanoparticle with surface functionalizable groups.

In one embodiment, the currency sample is exposed to UV light. In one embodiment, the core-shell nanoparticle with surface functionalizable groups emits a specific wavelength of visible light upon exposure to UV light. In one embodiment, counterfeit currency (currency not comprising a core-shell nanoparticle having surface functionalizable groups) does not emit the same wavelength of light upon exposure to UV light.

In one embodiment, the currency sample is treated with a carboxylic acid solution. In one embodiment, the carboxylic acid solution reacts with the core-shell nanoparticle with surface functionalizable groups and thereby changes the emission wavelength of the core-shell nanoparticle upon exposure to UV light.

In one embodiment, the currency treated with a carboxylic acid solution is exposed to UV light. In one embodiment, upon exposure to UV light, currency comprising a core-shell nanoparticle emits a specific wavelength of visible light that is visibly distinct from the wavelength emitted upon UV light exposure prior to the carboxylic acid treatment. In one embodiment, counterfeit currency (currency not comprising a core-shell nanoparticle having surface functionalizable groups) does not emit the same wavelength of light upon treatment with a carboxylic acid and subsequent exposure to UV light. In one embodiment, the lack of visible light emission distinguishes counterfeit currency from authentic currency.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the composite materials of the present invention and practice the claimed methods. The following working examples therefore, specifically point out the preferred embodiments of the present invention, and are not to be construed as limiting in any way the remainder of the disclosure.

Example 1

Tunable Nanophosphors

Figure 2:
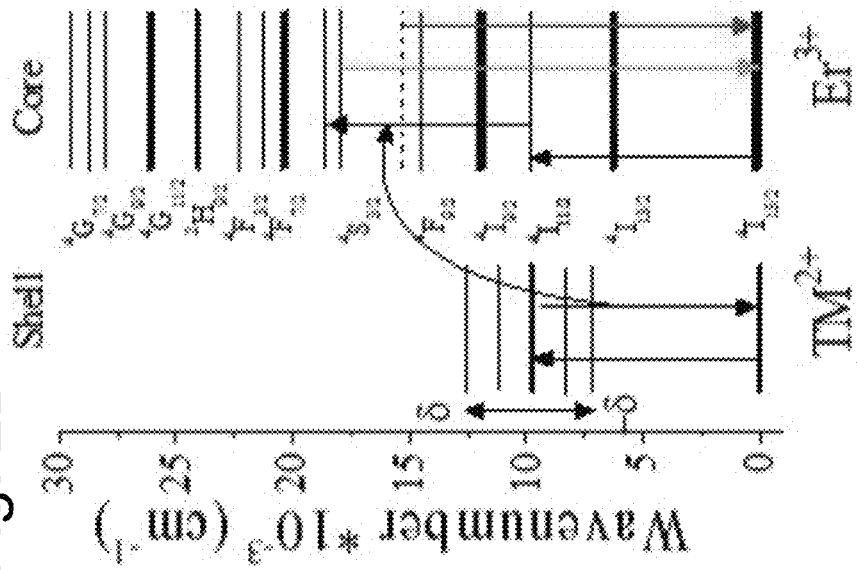
FIG. 2, comprising
Figure 2:
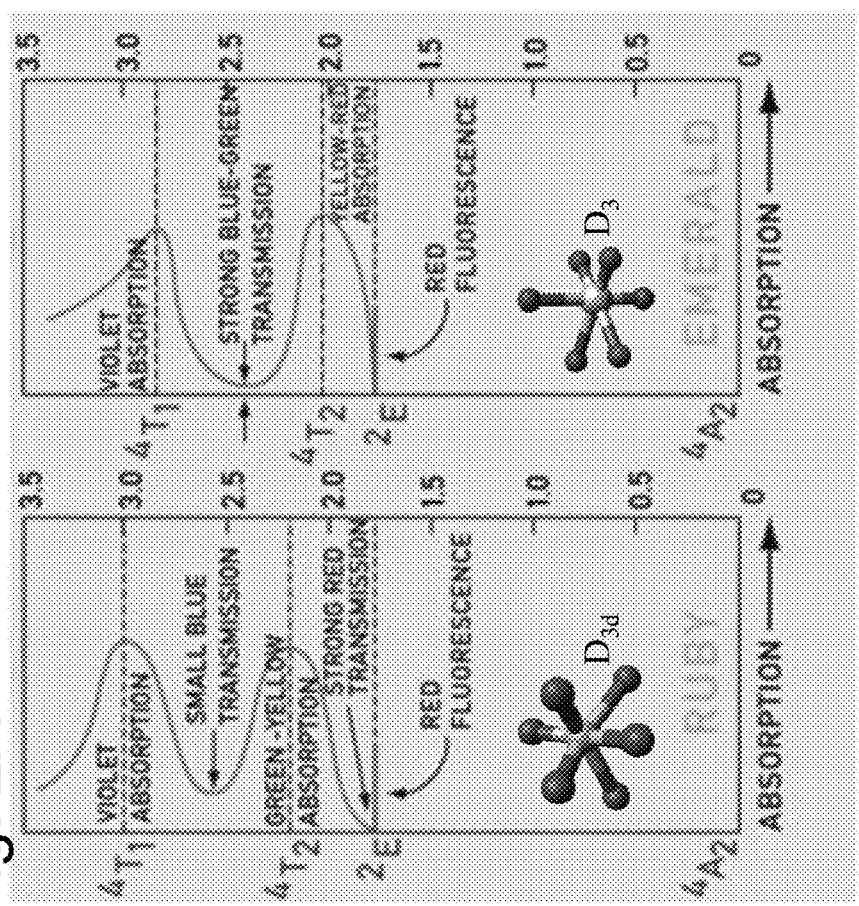

TM ions are doped into a ~10 nm $TiO_2$ shell (Wei Seh, et al., Nat. Commun. 2013, 4, 1331) surrounding a 30 nm RE-doped $\beta$-$NaYF_4$ crystal (Zhengquan and Yong, Nanotechnology 2008, 19, 345606). An exemplary nanoparticle is shown in FIG. 1. These two different host lattices allow for chemical stability while simultaneously protecting the luminescent center for parasitic phonon vibrations (Suyver, et al., J. Lumin. 2006, 117, 1-12; Dorman, et al., J. Phys. Chem. C 2014, 118, 16672-16679). Two different sets of dopant combinations are investigated, one for downconversion and one for upconversion luminescent tuning. The downconversion pair consists of $Tb^{3+}$ and $Cr^{3+}$, in order to take advantage of the strong green emission with a tunable green absorption, respectively, as shown in FIG. 2 (Morosin, Acta Crystallogr. Sect. B: Struct. Crystallogr. Cryst. Chem. 1972, 28, 1899-1903; Dorman, et al., J. Phys. Chem. C 2012, 116, 12854-12860). Upconversion ion pairs consist of $Er^{3+}$ with $Ni^{2+}$ or $Cu^{2+}$. In this case, the TM ion was chosen to amplify the light absorption and energy transfer to $Er^{3+}$, which has been shown to produce a blue, green, or red emission, depending on the dopant concentration. By changing the absorption spectrum of the TM ion, the magnitude of energy transfer, and the number of excitation steps needed for a specific transition, can be controlled (FIG. 2).

Dipole moments are then applied to the surface using a self-limiting carboxylic reaction in which surface hydroxide groups are replaced with various benzoic acid derivatives (Table 1) (Goh, et al., J. Appl. Phys. 2007, 101, 114503-114503). These groups have a difference in dipole moments up to 9 Debye, slightly weaker than the highly ionic KBr salt (10.5 Debye). After the luminescent range is quantified, the nanoparticles are printed using an inkjet printer. This process allows for plenty of optimization in order to maintain desired luminescent properties. Specifically, both aqueous and organic solvents can be used to print these phosphors, but both require the use a glycerol as a stabilizing agent (You, et al., *Nanoscale* 2015, 7, 4423-4431). While the glycerol poses no major issues, the optimization and characterization of this process is performed in-depth in order to quantify the role of this stabilizing agent. Standard characterization is performed to quantify phosphor optical performance including standard and transient absorption, excitation, and emission spectra. The core-shell nanoarchitecture is verified through standard crystal characterization techniques to elucidate crystal structures and compositions at a shared instrument facility, which is employed in the characterization of TM-RE interactions, local binding environment, and energy level landscapes.

TABLE 1

| Functional Group (-R) | Dipole Moment (D) |
|---|---|
| $SO_2F$ | 4.5 |
| $NO_2$ | 3.8 |
| CN | 3.4 |
| Br | 1.4 |
| H | −2.1 |
| $OCH_3$ | −3.9 |
| $NH_2$ | −4.5 |

Data collection and analysis is performed using the standard techniques for luminescent phosphors, including UV-Vis, Photoluminescence, Transient absorption spectroscopy, and luminescent decay kinetics (Dorman, et al., J. Phys. Chem. C 2012, 116, 10333-10340; Dorman, et al., J. Phys. Chem. C 2012, 116, 12854-12860; Dorman, et al., J. Appl. Phys. 2012, 111, 083529), structural characterization (TEM, XRD, SEM), and chemical characterization (XPS, EDX). Nonlinear spectroscopy such as second harmonic generation, upconversion spectroscopy, and two-photon fluorescence spectroscopy is coupled with ultrafast transient absorption spectroscopy to carefully study the photodynamics of the prepared nanomaterials (Karam, et al., J. Chem. Phys. 2016, 144, 124704; Kumal, et al., Langmuir 2015, 31, 9983-9990). The optimization of the inkjet printing process is based on the wettability of the solution on various brands and types of paper for direct application. This process also includes precise control of solution viscosities and particle concentrations such that the doped ink is printed at 2,000 dpi, a spacing of roughly 10 μm between phosphors. This resolution is possible based on currently available inkjet printer's technical specifications (Epson Stylus Photo R3000 Inkjet Printer).

Example 2

Synthesis, Modification, and Optical Properties of Doped Metal Oxides

In order to produce high-efficiency luminescence, the structure and purity of the crystal are important, requiring carefully designed synthetic methods. For RE-based luminescence, yttrium based compounds are typically employed to allow for RE dopant incorporation, reducing the number of defect states due to charge compensation (Zhou, et al., *Chemical Reviews* 2015, 115, 395-465). In order to avoid oxygen defects, high-quality nanostructures are preferred. For example, yttrium nanostructures have been fabricated using the hydrothermal method, resulting in "lossy" $Y(OH)_4$ instead of the preferred $Y_2O_3$ (Dorman, et al., *The Journal of Physical Chemistry C* 2010, 114, 17422-17427). The $Y(OH)_4$ structures were converted using high-temperature annealing. Unfortunately, annealing allows the diffusion of dopant atoms, necessitating a detailed understanding of the conversion steps (FIG. 3A). By probing the bond length transformations via in situ XAS, the required annealing temperature and time was extracted to limit dopant aggregation. However, the overlap in RE energy levels produces unwanted energy transfer between ions.

Core-shell nanostructures, produced through sol-gel modification, facilitate the segregation of ions, with ±2 nm precision (Dorman, et al., *The Journal of Physical Chemistry C* 2012, 116, 10333-10340). This technique produced sharp interfaces as highlighted by the $Y_2O_3|Yb_2O_3$ interface (FIG. 3B). These techniques were employed to develop a core-multi shell structure to promote and hinder energy transfer between RE dopants for high-quality white light (Dorman, et al., *The Journal of Physical Chemistry C* 2012, 116, 12854-12860). The quality of the white light was engineered through dopant position and shell layer thickness to produce a "natural" soft spectrum (FIG. 3C) for commercial LEDs. The combination of the four different RE elements also resulted in a high color rendering index, outlined by the polygon, typically not possible with two and three wavelength LEDs. Finally, similar metal oxide particles were modified using the self-assembly of carboxylic acid molecules to attach to surface hydroxides over 2+ hrs, binding dyes to the surface (not shown) (Dorman, et al., *The Journal of Physical Chemistry C* 2014, 118, 16672-16679; Weickert, et al., *APL Materials* 2013, 1, 042109). This technique is also valid for dipoles (Table 1) and biological groups.

Figure 4:
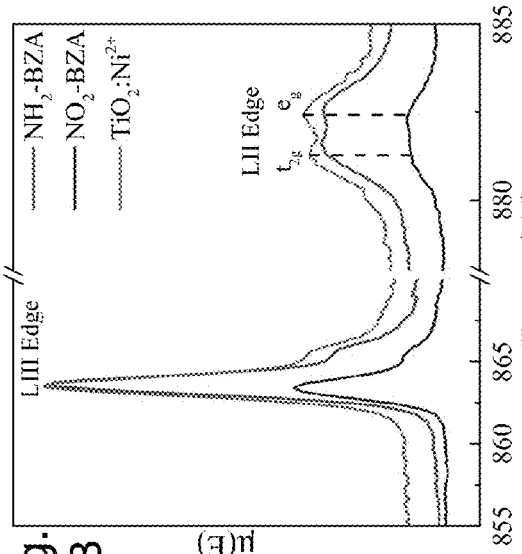
FIG. 4, comprising
Figure 4:
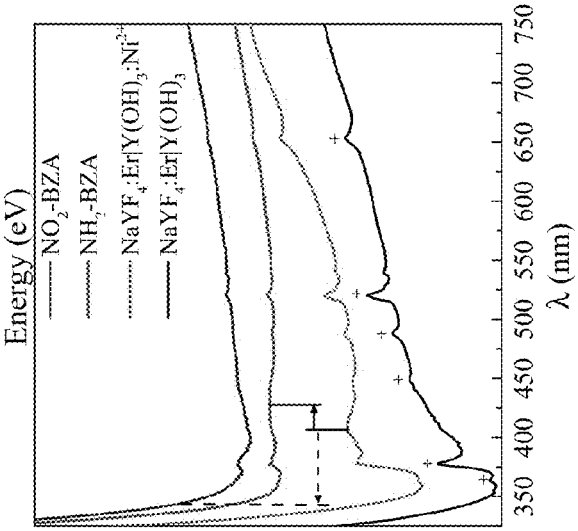
Figure 4:
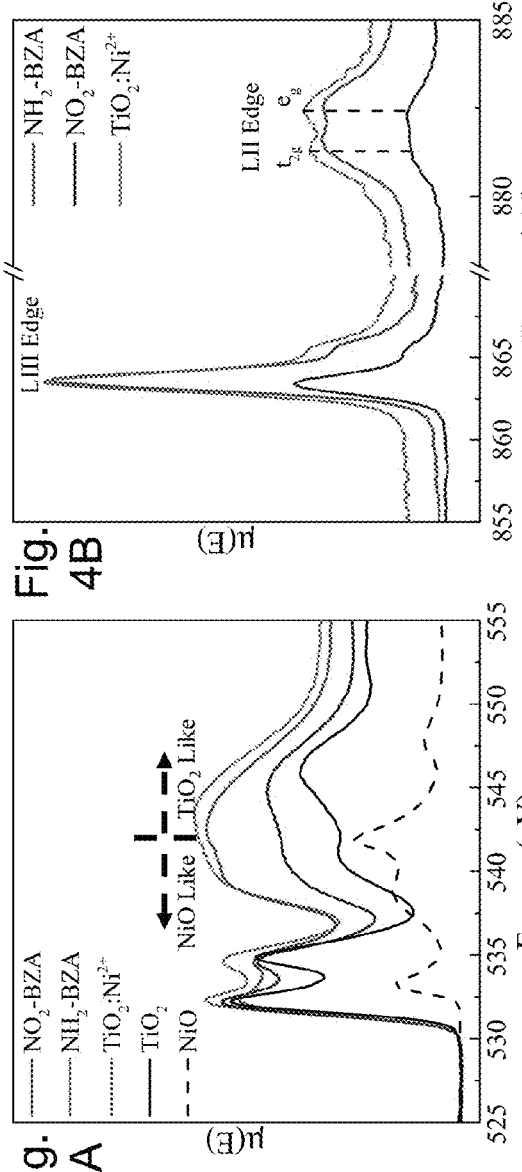
Figure 4:
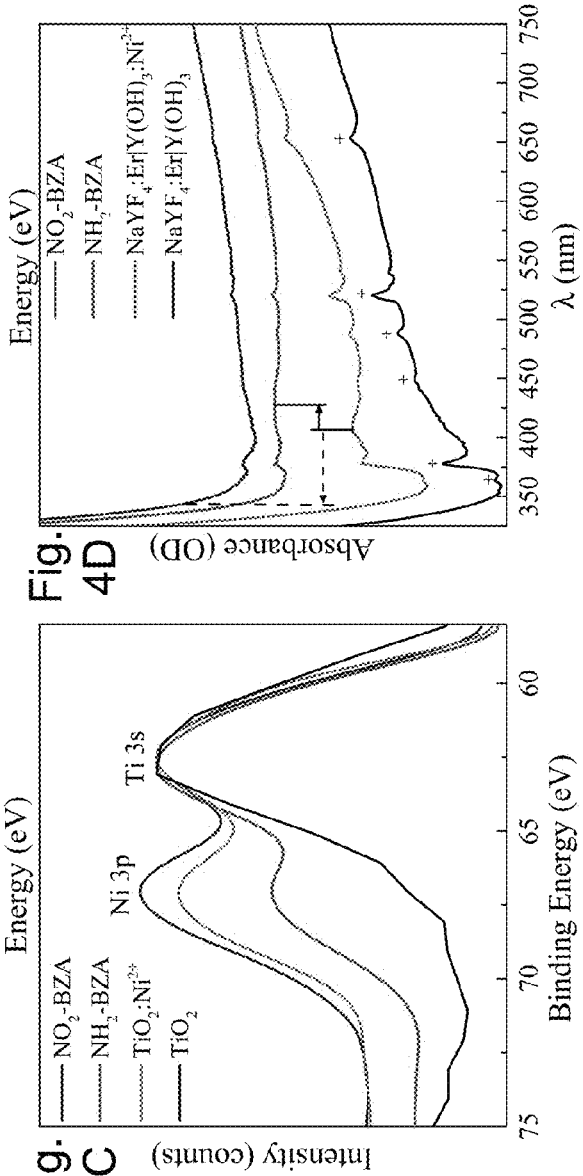

$Ni^{2+}$ doped metal oxide thin films and core-shell structures have been synthesized and characterized. $Ni^{2+}$ was selected as an initial TM dopant due to its strong blue/red absorption (Wenger, et al., *Journal of the American Chemical Society* 2000, 122, 7408-7409). The core and valence levels have been probed using soft XAS (CAMD), x-ray photoemission spectroscopy (XPS), and UV-Vis absorption (FIG. 4). Thin film deposition uses a modified $TiO_2$ sol-gel chemistry where titanium isopropoxide is aged 24 hrs in an acidic ethanol solution and spin coated on glass and Si wafers (Yu, et al., *Scientific Reports* 2015, 5, 9561). Thin films were functionalized with two para-benzoic acid (BZA) ligands, one with an $NO_2$ group (electron withdrawing, 3.8 D, c.f. Table 1) and one with an $NH_2$ group (electron donating, −4.5 D), to control the electron density at the interface.

In order to study both sides of the Ni 3d-O 2p hybridization, O K edge (FIG. 4A) and Ni LIII/LII edges (FIG. 4B) were probed via XAS. Each region was scanned with a 0.1 eV step size and absorption energies calibrated to reference NiO or $TiO_2$ films. The post O K edge (537-550 eV) scans show the effect of the ligand on the Ni—O hybridization with energy shifts proportional to the dipole moment, with peak maxima of the $NH_2$—BZA modified surface 0.5 eV high than NiO and the $NO_2$—BZA modified surface 1 eV lower than $TiO_2$ references. This dipole effect is also seen in the LII edge of the Ni absorption, where the $e_g$ edge increases in energy as $NO_2$—BZA (882.3 eV) is replaced with $NH_2$—BZA (882.5 eV) and the $t_{2g}/e_g$ peak ratio changes from 0.99 to 1.01. These shifts are attributed to modification of the orbital splitting (Δ), electron filling, and spin-orbital coupling (Ogasawara, et al., *Physical Review B* 2001, 64, 115413). Additionally, XPS scans (FIG. 4C) show the ability to affect the intensity of the core Ni 3p level with surface dipoles. Conversion from $NO_2$ to $NH_2$ groups decrease intensity by ~20% in relation to the normalized Ti 3s peak. Furthermore, it was important to demonstrate the effect of these dipoles on the optical transitions. Thin doped and pure $Y(OH)_3$ films (Dorman, et al., The Journal of Physical Chemistry C 2012, 116, 10333-10340) were deposited around ~500 nm hexagonal $\beta$-$NaYF_4$:$Er^{3+}$ nanoparticles to measure Ni absorption (Li, et al., Inorganic Chemistry 2007, 46, 6329-6337). FIG. 4D shows the absorption of the $Er^{3+}$ doped core (+), the $Ni^{2+}$ doped shell, and the functionalized core-shell structures. Upon functionalization with $NH_2$—BZA, the characteristic Ni absorption (~410 nm) red shifts up to 20 nm (broad absorption peak centered at 435 nm). This peak disappears completely with the $NO_2$—BZA group, likely moving into the $Y(OH)_3$/$NaYF_4$ band gap. These results demonstrate the ability to quantify crystal field manipulation with optical and electronic measurements.

Figure 5:
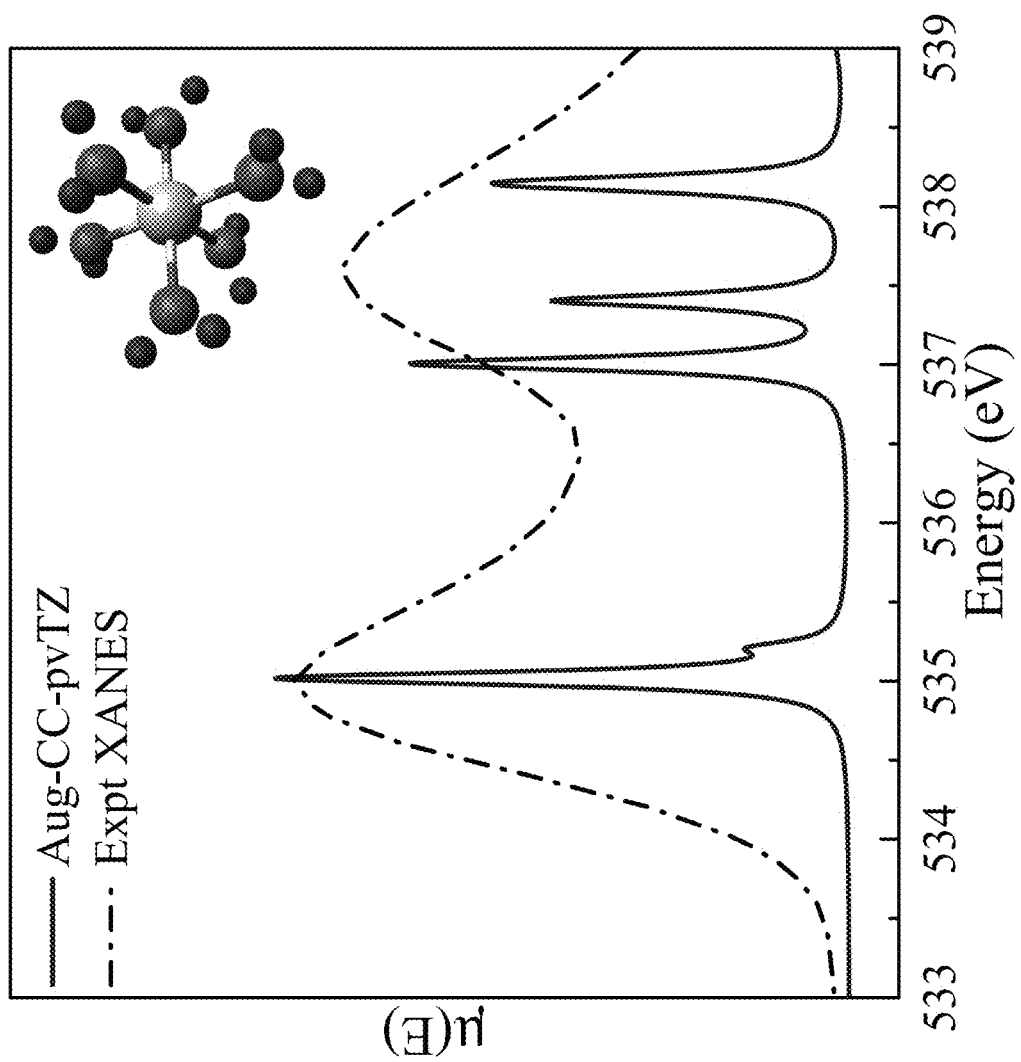
FIG. 5 depicts the simulated and experimental spectrum of an anatase TiO$_2$ crystal O K edge. Insert shows the 7-atom TiO$_2$ cluster.

These materials are modeled to extract the electronic structures using TD-DFT (Govind, et al., The Journal of Physical Chemistry Letters 2011, 2, 2696-2701). Simulations of the $TiO_2$ O K edge were performed using a 7 atom anatase $TiO_2$ cluster, passivated with hydrogen atoms, to find appropriate basis sets. The preliminary basis set and cluster (Aug-CC-pvTZ, FIG. 5 may require further optimization though exact matching is not expected, as this small cluster cannot account for spin-orbital splitting or inhomogeneity in the crystal structure. The high energy peaks, centered around 540 eV, can be attributed to discrete levels in the model extending beyond the vacuum level (Govind, et al., The Journal of Physical Chemistry Letters 2011, 2, 2696-2701).

Example 3

Atomically Controlled Nanostructures for Directed d-orbital Modification

Wet chemical methods have been developed to produce metal oxides and fluorides with a wide range of morphologies and sizes (Dorman, et al., The Journal of Physical Chemistry C 2014, 118, 16672-16679; Dorman, et al., The Journal of Physical Chemistry C 2012, 116, 10333-10340; Dorman, et al., The Journal of Physical Chemistry C 2012, 116, 12854-12860; Dorman, et al., The Journal of Physical Chemistry C 2010, 114, 17422-17427; Li, et al., Inorganic Chemistry 2007, 46, 6329-6337; Wang, et al., Chemistry of Materials 2007, 19, 727-734). The ability to manipulate nanostructures is used to probe uniform and non-uniform ligand fields and their effect on TM optical properties. As such, $NaYF_4$|$TiO_2$:$Ni^{2+}$ core-shell structures are synthesized and characterized and the resulting optical and electronic properties measured with and without surface functionalization. The synthesis concentrates on 0D and 1D morphologies with critical dimensions around 20-30 nm to account for isotropic (0D) and anisotropic (1D) ligand fields. These nanostructures are synthesized using hydrothermal/solvothermal (Orgel, J. Chem. Soc. 1952, 4756-4761; Yuan, et al., Journal of the American Chemical Society 2013, 135, 8842-8845; Wang, et al., Chemistry of Materials 2007, 19, 727-734), molten salt (Dorman, et al., The Journal of Physical Chemistry C 2012, 116, 10333-10340; Dorman, et al., Journal of Applied Physics 2012, 111, 083529), and thermal decomposition methods with controlled dimensionalities. For example, hexagonal $NaYF_4$ nanorods/wires have been synthesized hydrothermally by heating an acidic solution of $Y(NO_3)_3$ and sodium citrate at 180° C. Crystallite diameters, lengths, and aspect ratios can be tuned via the RE:Citrate precursor ratio (Li, et al., Inorganic Chemistry 2007, 46, 6329-6337). Alternatively, 25 nm hexagonal $\beta$-$NaYF_4$ can be synthesized via thermal decomposition of $YCl_3$ salts in a non-aqueous solution containing $NH_4F$ at temperatures up to 350° C. (Ostrowski, et al., ACS Nano 2012, 6, 2686-2692).

Figure 6:
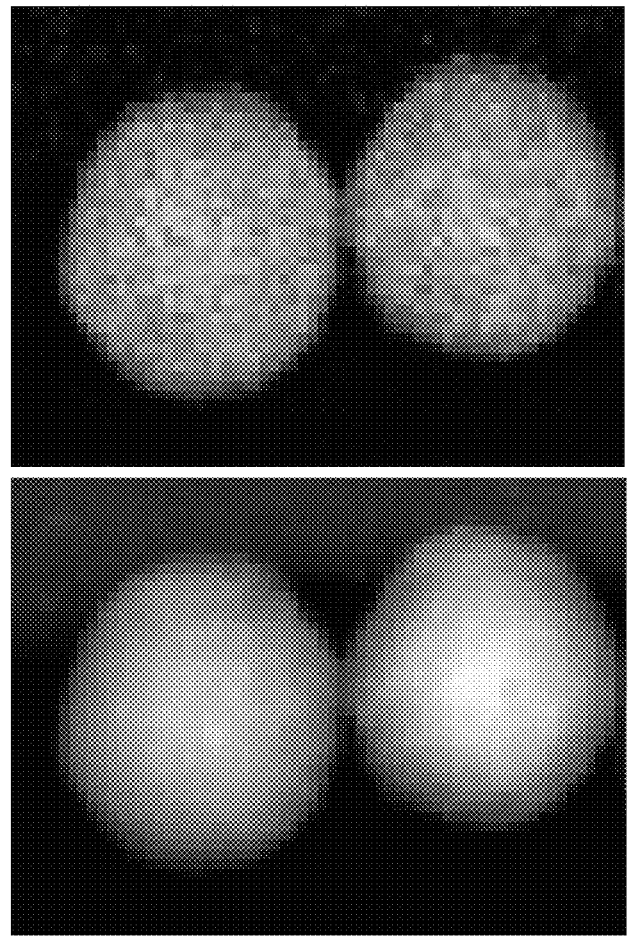
FIG. 6, comprising

Thin shell layers (~5 nm) of $TiO_2$:$Ni^{2+}$ metal oxides are deposited using a similar thin film sol-gel chemistry (Li and Zhao, Advanced Materials 2013, 25, 142-149; Lu, et al., Catalysis Science & Technology 2016, 6, 6845-6852; Tang, et al., ACS Catalysis 2013, 3, 405-412), to act as the scaffolding layer for further functionalization. Additionally, $Y_2O_3$ (Dorman, et al., The Journal of Physical Chemistry C 2012, 116, 10333-10340) and $SiO_2$ layer depositions serve as alternatives. Finally, the particle surface ware functionalized with multiple dipole groups (Table 1). These experiments focus on established $NO_2$—BZA and $NH_2$—BZA ligands, spanning 8.3 D, to measure the full $Ni^{2+}$ response. In addition to these two groups, the table includes other benzoic acid derivatives, biomolecules, and linking groups which can be employed in the future for higher sensitivities and inter/intra-particle energy transfer experiments. Atomic location (STEM/EELS) and the electronic effects of ligands (FIG. 4c) are quantified and coupled with UV-Vis. STEM/EELS analysis has been performed on core-shell $Fe_3O_4$|$MnFe_2O_4$ nanoparticles, as seen in FIG. 6, and shows the location of Fe (green) and Mn (purple) ions. These methods demonstrate control of synthetic methods and ability to modify electronic and optical properties. Finally, surface coverage is exploited to further modify ligand field strengths.

During functionalization, the movement of electrons has both electronic and structural consequences which are not seen under standard methods. As previously discussed, there is evidence of evolving Ni—O and Ti—O bond structures with surface functionalization. In order to investigate these effects, high-resolution, in situ characterization on the optimized 0D/1D particles is performed during surface functionalization. Additionally, surface adsorption measurements are coupled with optical characterization equipment to calibrate the surface functionalization kinetics and absorption/luminescence shifts.

Prior to synchrotron measurements, adsorption kinetics are investigated via light absorption (Lambda 950) and photoluminescence (Edinburgh FLS 980 Spectrofluorometer with time correlated single photon counting (TCSPC)). The two systems allow for independent but related measurements of the shifting electronic landscape during ligand bonding. The structural and electronic properties of these materials are investigated using two complementary methods, XAS and UPS, to probe the shift in valence and unoccupied energy levels, and structural modifications. Near edge XAS (VLSPGM beamline, 200-1200 eV) is used to extract the valence state, coordination chemistry, and electronic structure of the unoccupied states. When applicable (>1 keV between absorption edges) the extended region (EXAFS) is collected to further elucidate the dopant coordination chemistry. Additionally, the electronic state of the valence and outer core levels, up to 75 eV binding energies, is probed via UPS (5 m-TGM beamline, 25-240 eV). Due to the low energies being employed, the chamber (s) require low pressures to avoid x-ray absorption. Dipole surface coverage was increased incrementally between scans by controlling the partial pressure, via heating of the powders, and exposure times (Lu, et al., Catalysis Science & Technology 2016, 6, 6845-6852).

Localized external fields can be used to manipulate d-orbital hybridization, i.e., internal crystal fields. The measure-model aspect of this work is achieved by comparing crystal field parameters of measured and simulated 0D/1D core-shell structures. Crystal field strengths can be extracted from optical measurements in the form of the Racah crystal field parameter (B) using Tanabe-Sugano diagrams as ideal systems. Both the crystal field splitting ($\Delta$) and Racah parameters have been linked to M-O bond distance (Bocquet, et al., Physical Review B 1992, 46, 3771-3784; Hauser, In: Spin Crossover in Transition Metal Compounds I, Gütlich, P.; Goodwin, H. A., Eds. Springer Berlin Heidelberg: Berlin, Heidelberg, 2004; pp 49-58). Under an octahedral site symmetry assumption, the crystal field strength is equal in all directions (0D structure). As field anisotropy increases, the octahedral assumption is no longer valid, as the absorption spectrum no longer matches the octahedral model. One example of this process is tetragonal elongation (i.e., expansion along the z-axis) which causes a contraction of the $d_{xy}$ and $d_{z^2}$ orbitals (Burdett, Inorganic Chemistry 1981, 20, 1959-1962). While experimental data offers a solid base for the prediction of crystal field and expected physical properties, correlating these results with simulation can provide further justification for the observed effects.

Figure 7:
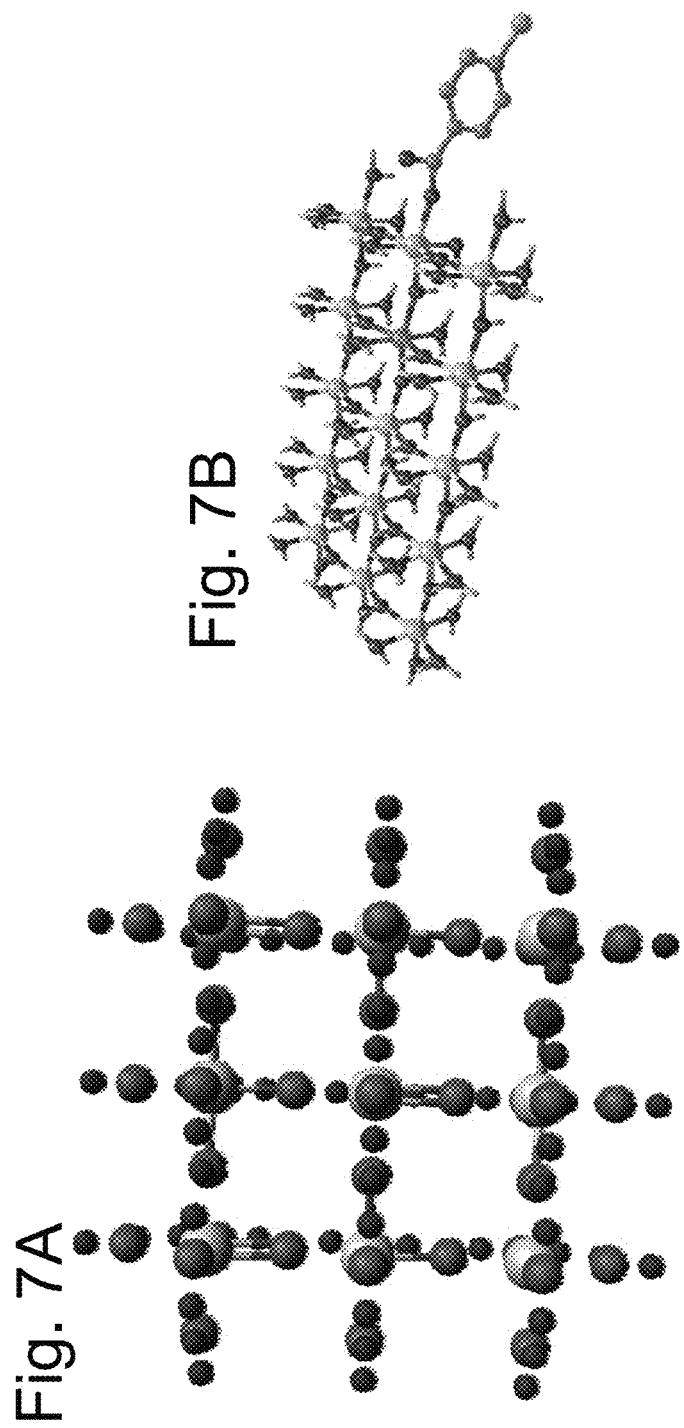
FIG. 7, comprising

Simulations have been performed using TD-DFT. While this technique is commonly used to model optical and electronic properties of molecular compounds, it can also be applied to solid structures (De Angelis, et al., *Nanotechnology* 2008, 19, 424002). In order to increase the accuracy of the model, a 2×5×2 bulk-mimicking cluster is employed to model $TiO_2$:$Ni^{3+}$ for TD-DFT simulations (FIG. 7A). The simulation enables the attachment of ligands to multiple surface facets by cleaving the structure after optimization (FIG. 7B). The simulations are used to validate the experimental data via substitution of hydrated surfaces with functionalities possessing various dipole moments. The TD-DFT results can then be treated similarly to the measured data for determination of B. Additionally, this process is used to produce anisotropic and isotropic fields to model d-orbital contraction/elongation. The effect of field anisotropy is hypothesized to be an important factor in d-orbital hybridization.

Figure 8:
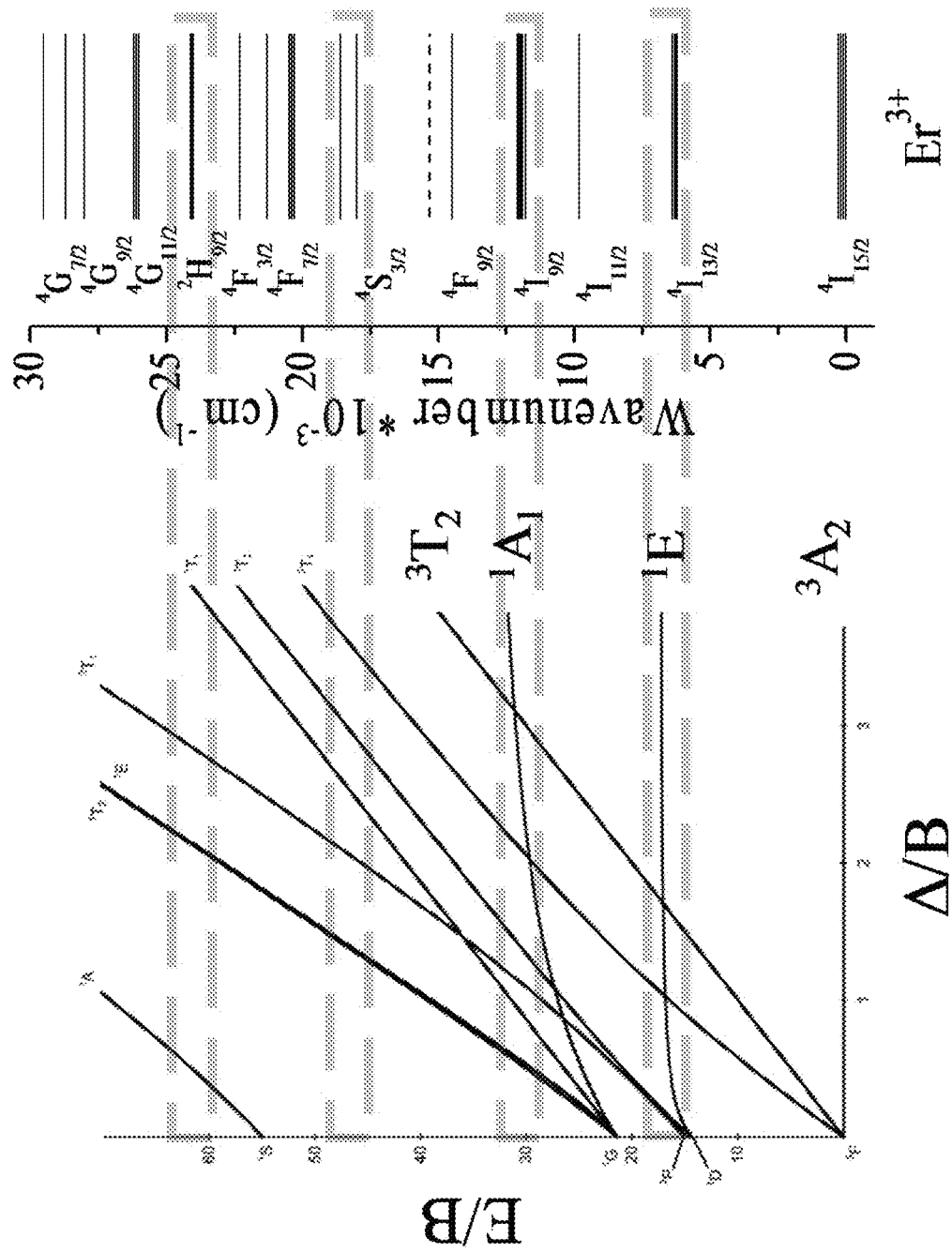
FIG. 8 depicts a comparison between the predicted Ni$^{2+}$ and Er$^{3+}$ energy levels. The dashed boxes highlight overlap between Er$^{3+}$ emission levels and possible Ni$^{2+}$ transitions for energy transfer.

Despite their susceptible nature, TM dopants are attractive alternatives to RE dopants due to their high absorption cross-section. This has led to the incorporation of $Mn^{2+}$ (Dan, et al., Materials Letters 2015, 150, 76-80; Tian, et al., Advanced Materials 2012, 24, 1226-1231) or $Ni^{2+}$ (Takeda, et al., Journal of Applied Physics 2016, 120, 073102) as sensitizers to increase phosphorescence or upconversion yield. However, these studies are restricted to specific wavelengths where there was little variability in the dopant absorption, such as the $^3A_2 \rightarrow ^1E$ transition in octahedral $Ni^{2+}$, which absorbs solely at 1100 nm (Takeda, et al., *Journal of Applied Physics* 2016, 120, 073102) (FIG. 8). While the ultimate goal in luminescence is to replace RE dopants, this can be viewed as a two-step process, first replacing the high concentration sensitizer ions ($Yb^{3+}/Ce^{3+}$, up to 20 mol %) then the emitter ion. In addition to energy level matching, RE dopants demonstrate both downconversion (UV→visible) and upconversion (IR→visible) luminescence. Therefore, the TM energy levels can be tuned to enhance or quench specific emission processes.

The ability to direct energy transfer between various layers within core-shell structures for enhanced luminescent properties has been previously demonstrated. One such RE ion pair that demonstrates energy transfer in both luminescence mechanisms is the $Er^{3+}$—$Yb^{3+}$ system (Dorman, et al., The Journal of Physical Chemistry C 2012, 116, 10333-10340; Rodriguez, et al., Solar Energy Materials and Solar Cells 2010, 94, 1612-1617). This system is widely used, with applications in fiber optics, prompting this investigation to remove the high concentration Yb sensitizer (20 mol %) (Agrawal, G. P., Nonlinear Fiber Optics; Academic press, 2007). Accordingly, the focus is on dictating the $Ni^{2+}$—$Er^{3+}$ coupling, and energy transfer, by tuning the TM excited state energies to match those of the RE ions. The $Ni^{2+}$—$Er^{3+}$ system is shown in FIG. 8 with expected coupling regions shown in the dashed lines. Incorporation of $Er^{3+}$ into the core can be readily performed via substitution of yttrium precursors with the Er analog (Dorman, et al., The Journal of Physical Chemistry C 2012, 116, 12854-12860; Li, et al., Inorganic Chemistry 2007, 46, 6329-6337). Initial coupling experiments are performed on downconversion processes to turn emission on/off (energy sink) or vary excitation/emission pathways (coupling mechanism). This process is preferred due to the higher RE emission efficiencies, their ability to excite without a laser source, and the wide range of available energies for the TM dopants (FIG. 8).

The $Ni^{2+}$—$Er^{3+}$ coupling is probed using an Edinburgh FLS 980 spectrofluorometer. This system is equipped with dual monochromators to allow for the simultaneous screening of excitation and emission wavelengths. The equipment facilitates dynamic studies which are used to extract surface functionalization dependent luminescence and excited state $Ni^{2+}$—$Er^{3+}$ energy transfer processes. Additionally, time-resolved luminescence mechanisms are extracted using TCSPC to quantify efficiencies (Dorman, et al., The Journal of Physical Chemistry C 2012, 116, 10333-10340). Low-temperature luminescence removes thermal quenching caused by the host materials and can result in discrete TM excitation energies. These methods have been employed to extract excited state kinetic processes for RE-RE transitions; here, this analysis is extended to the RE-TM system in order to understand and optimize the coupling between the dopant types (Broholm, C.; Fisher, I.; Moore, J.; Murnane, M., Basic Research Needs Workshop on Quantum Materials for Energy Relevant Technology. Energy, D. o., Ed. 2017).

The culmination of this work is the establishment of a set of design rules to describe the electro-optical coupling effects at reduced dimensions. As dimensionality decreases, a new method of predicting orbital energies and expected physical properties is needed. By developing a fundamental understanding of the effects of localized fields on symmetry breaking (hybridized d-orbitals), new optical, magnetic, and catalytic materials can be designed. Theoretical models have been employed to help optimize the coupling between crystal structures/bonds and optical properties and to improve luminescent efficiencies (Dorman, et al., Journal of Applied Physics 2012, 111, 083529). Using the electronic, structural, optical, and theoretical results from the previous objectives, design rules are formulated. These rules are then tested on alternative RE-TM systems to determine their accuracy as a universal prediction tool. The developed model is applied to upconversion luminescence in an effort to increase luminescent efficiencies while simultaneously reducing the concentration of RE dopants. The criteria revolve around the propensity for orbital manipulation, a range of possible crystal field strengths, and observed/allowed optical transitions. Data are collected in a database and distributed for broader integration into existing communities (e.g., LBNL's Materials Project).

Figure 9:
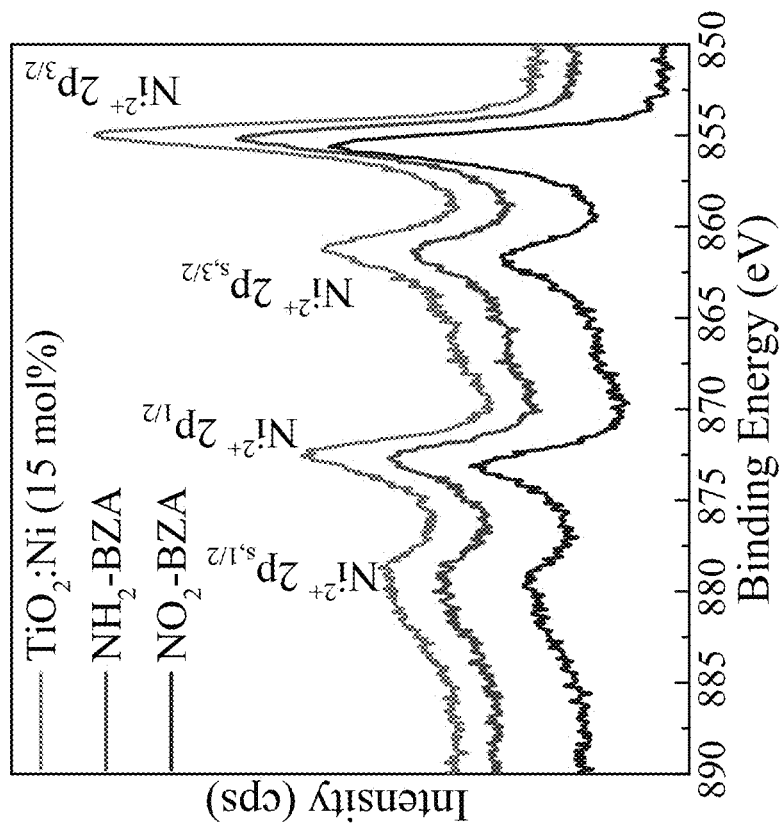
FIG. 9, comprising FIGS. 9A and 9B, demonstrates the weak field tuning of the optoelectronic properties of transition metal doped solid hosts.
Figure 9:
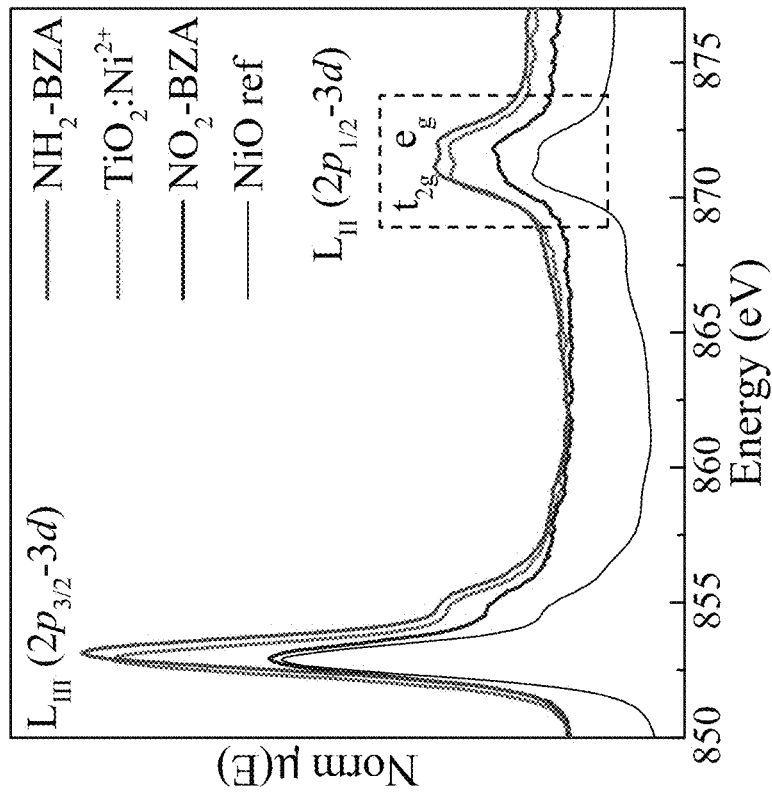
Figure 10:
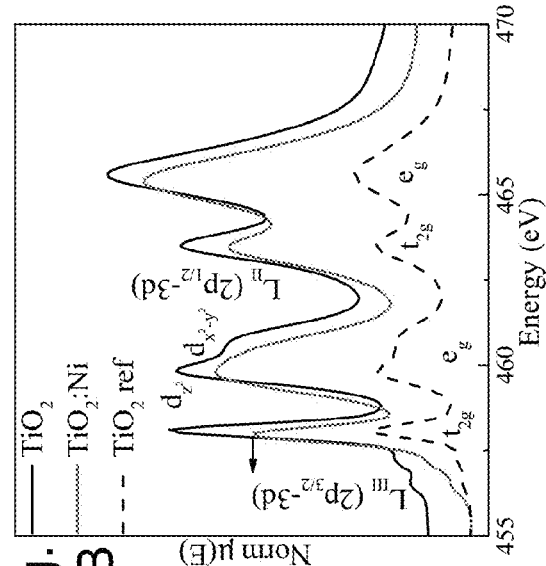
FIG. 10, comprising
Figure 10:
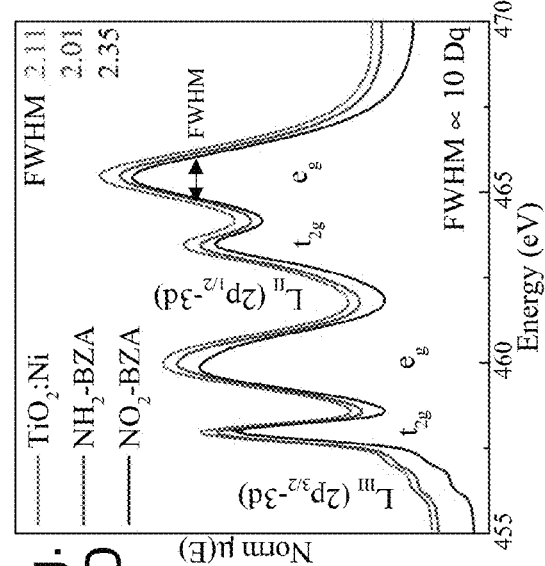
Figure 10:
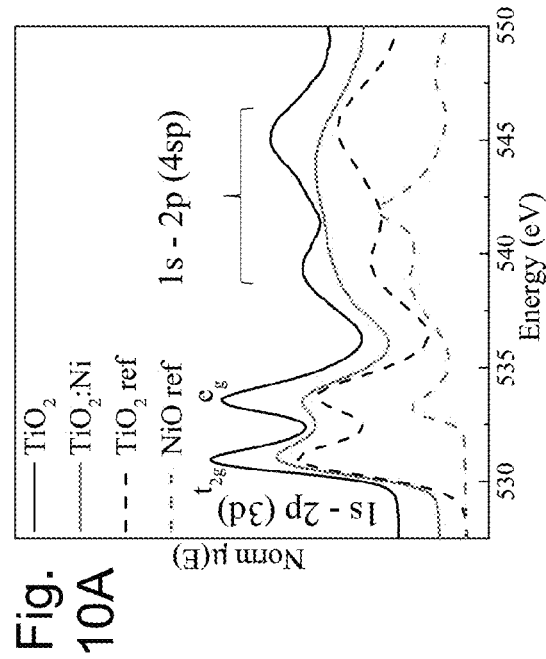
Figure 10:
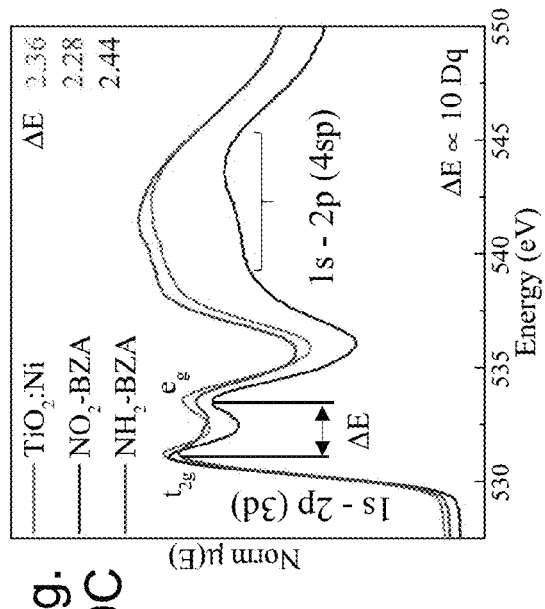
Figure 11:
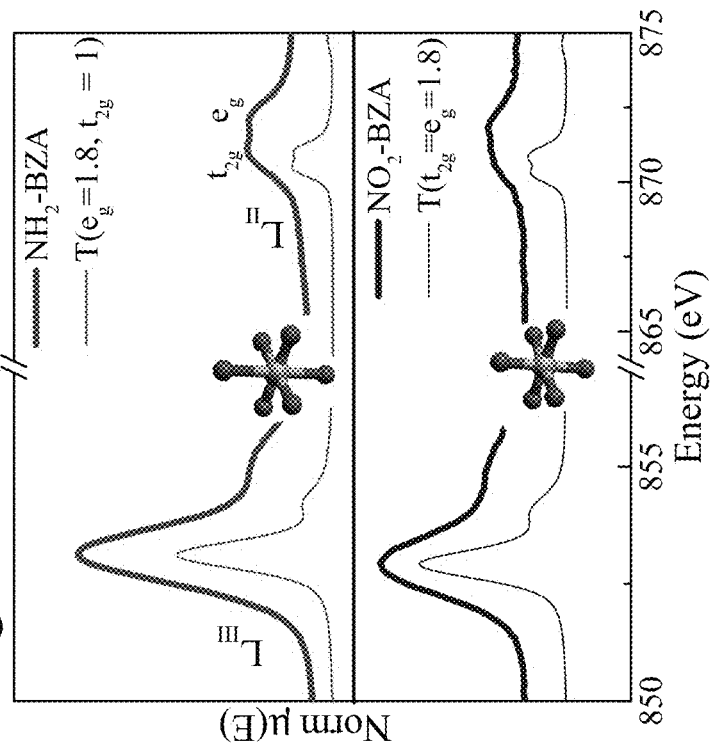
FIG. 11, comprising
Figure 11:
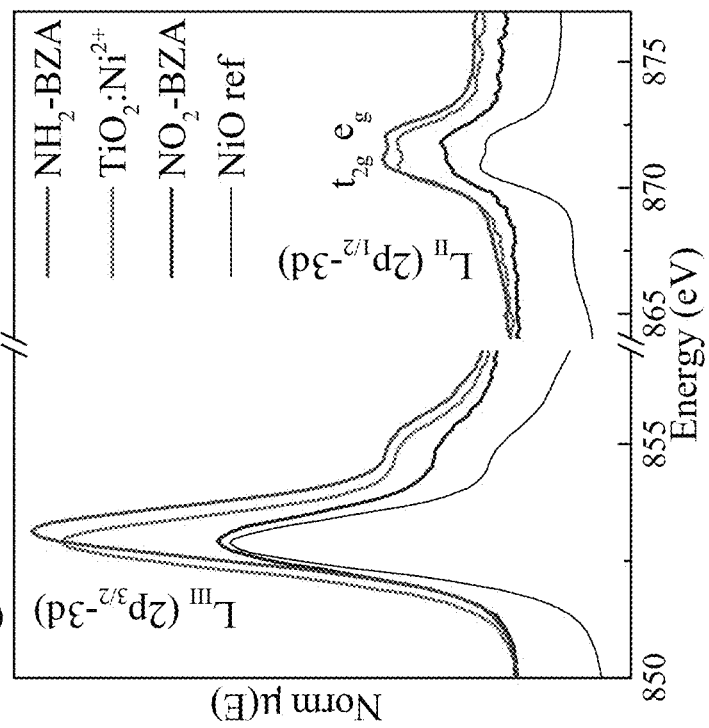
Figure 12:
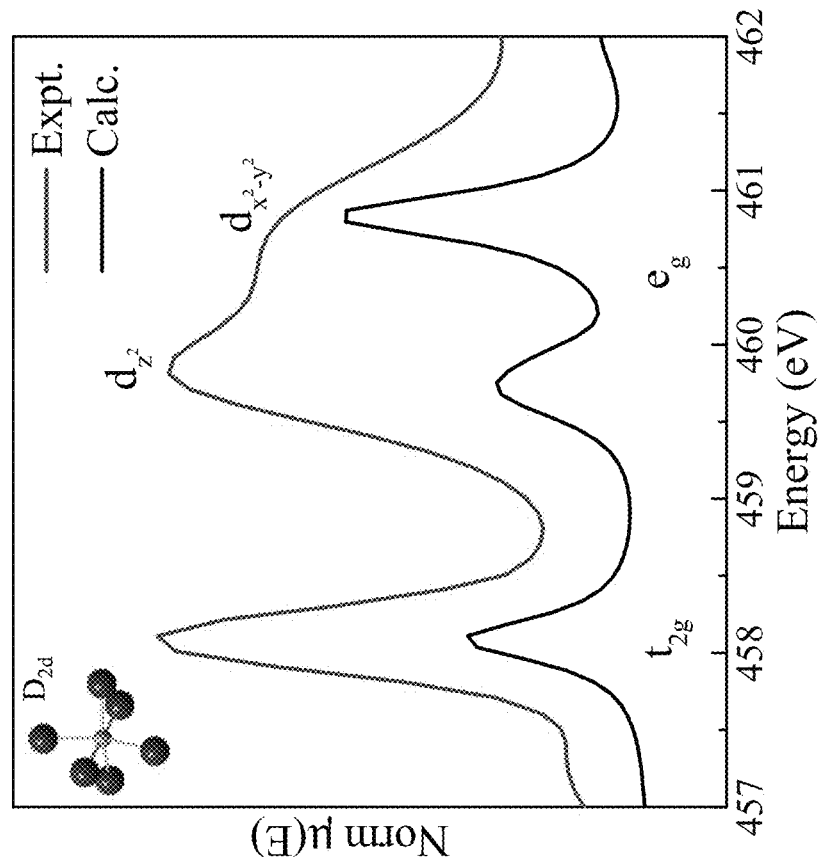
FIG. 12, comprising
Figure 12:
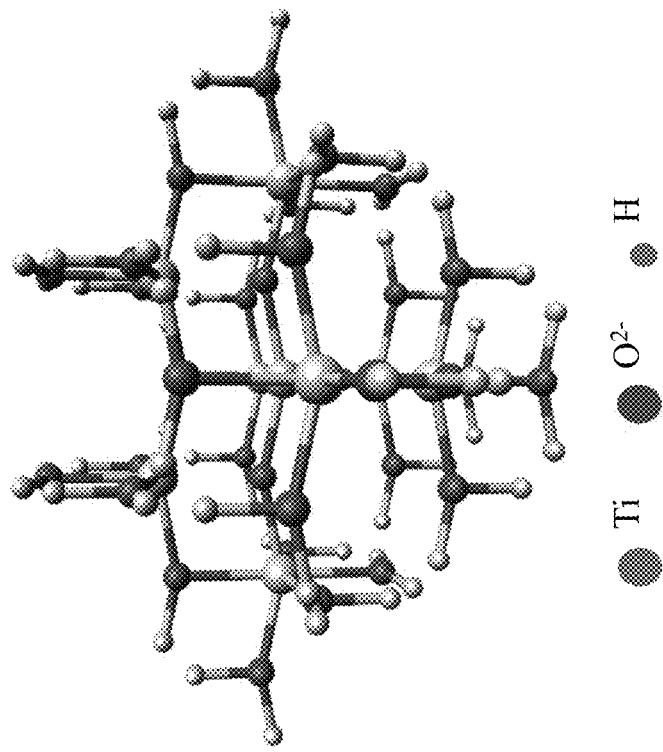

Highlighting the ability to control the different energy levels of the Ni in the $TiO_2$ phosphor allows the control of optical properties and how energy is transferred to rare earths (FIG. 9A and FIG. 9B). There are slight changes in the electronic structure of the host which can be employed in solar cells and other optoelectronic applications where the electronic structure plays a role in device performance (FIG. 10). The separated Ni L edge experimental and modeling results are shown in FIG. 11A and FIG. 11B, respectively, and suggest that the Ni atoms adopt an elongated octahedron geometry when the surface is functionalized with para-benzoic acid ligands. The $t_{2g}$:$e_g$ intensity ratio inversion for $NO_2$—BZA bonded films can only be modeled by an elongated octahedron (FIG. 11B, insert), which is done by setting the same orbital hoping parameters as 1.8. Preliminary results suggest that it may be possible to model the electronic state of the $TiO_2$ and Ni doped $TiO_2$ structures so that expected results can be coupled to experimental results (FIG. 12).

Figure 13:
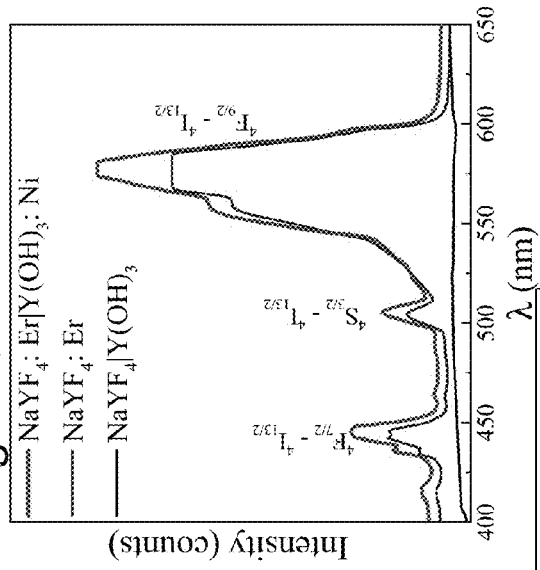
FIG. 13, comprising FIGS. 13A to 13C, demonstrates the ability to tune absorbance by manipulation of dopant and host materials.
Figure 13:
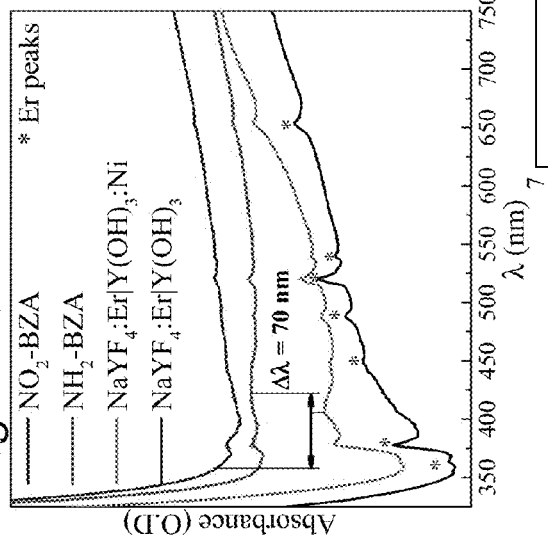
Figure 13:
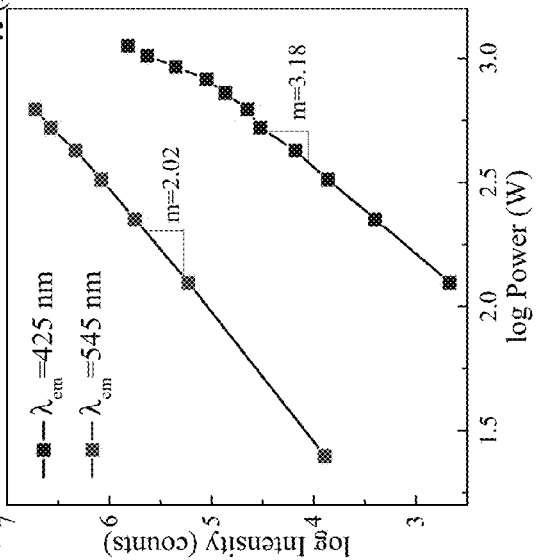

Importantly, the absorption can be tuned to the degree of up to 70 nm using the same host material; this structure can be used to sensitize blue and green upconversion emission (FIG. 13). This is necessary for counterfeit technologies to tune the appearance. Er and Ni are coupled in a core-shell structure to enhance energy transfer. Ni has been shown to enhance luminescent efficiency of Er based phosphors.

Figure 15:
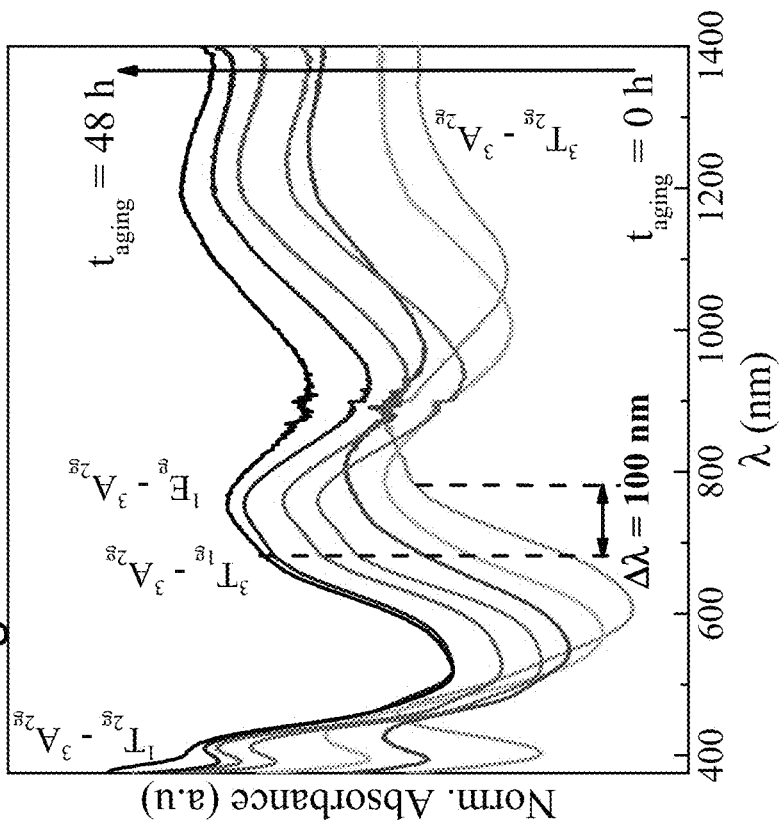
FIG. 15, comprising
Figure 15:
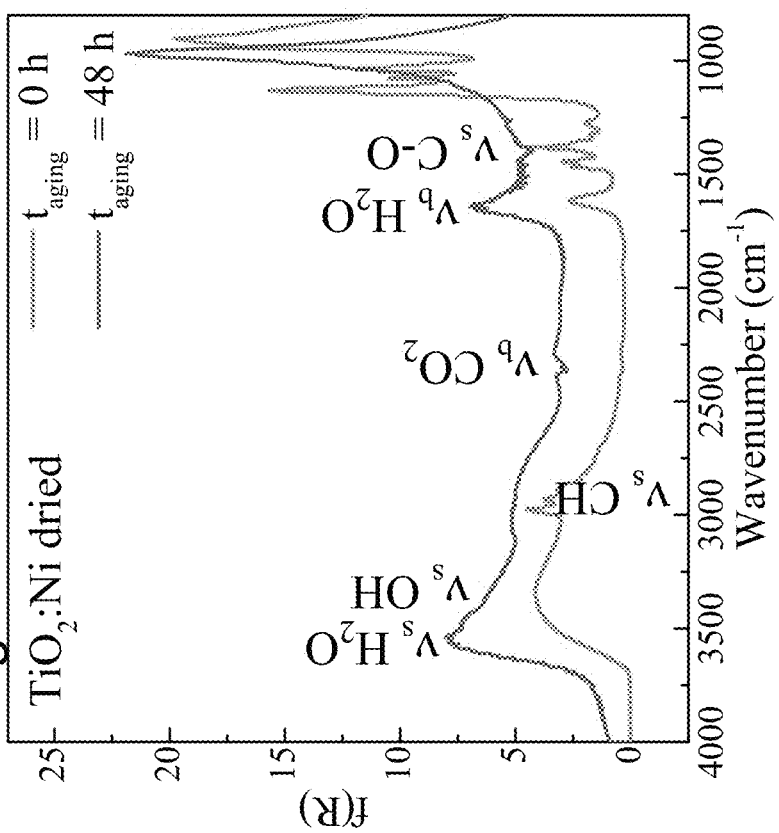
Figure 16:
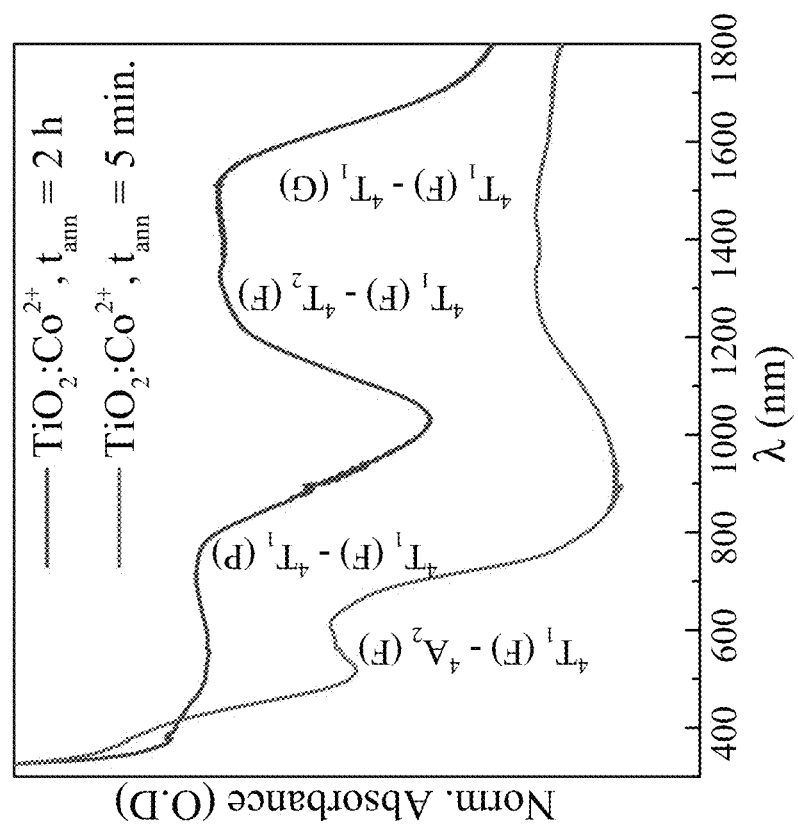
FIG. 16, comprising
Figure 16:
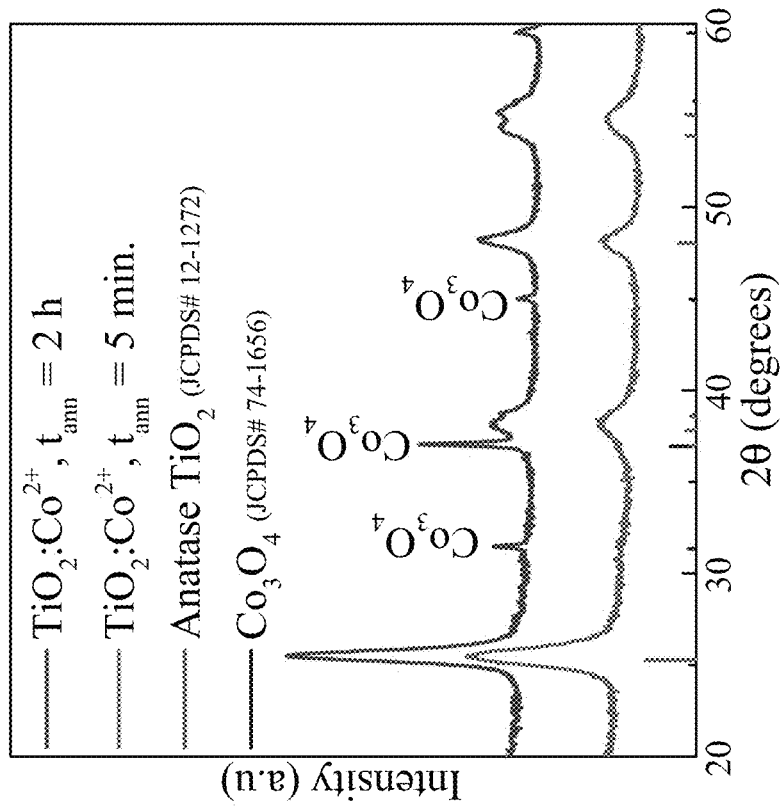

Careful selection of processing conditions prevents the segregation of dopants (here, Ni) within the final phosphor (FIG. 14A). Success in preventing segregation can be assessed by comparing optical properties to an NiO reference (FIG. 14B). Initial results suggest that the Ni segregates out based on the amount of moisture it has been exposed to. The amount of moisture can be tracked using infrared spectroscopy (FIG. 15A) and the light absorption or color (FIG. 15B) of the pre-annealed samples. If annealed at the correct point, the Ni does not leave the $TiO_2$ lattice and the optical and electronic properties of the particles are fixed for solar/photocatalytic applications. Undesired dopant segregation is not unique to Ni. The same segregation was observed in other first row transition metals, such as Co as seen in crystal structure (FIG. 16A) and optical properties (FIG. 16B). The results suggest that annealing parameters represent a further variable that can be manipulated to tune the light absorption for adaptive luminescence applications.

Figure 17:
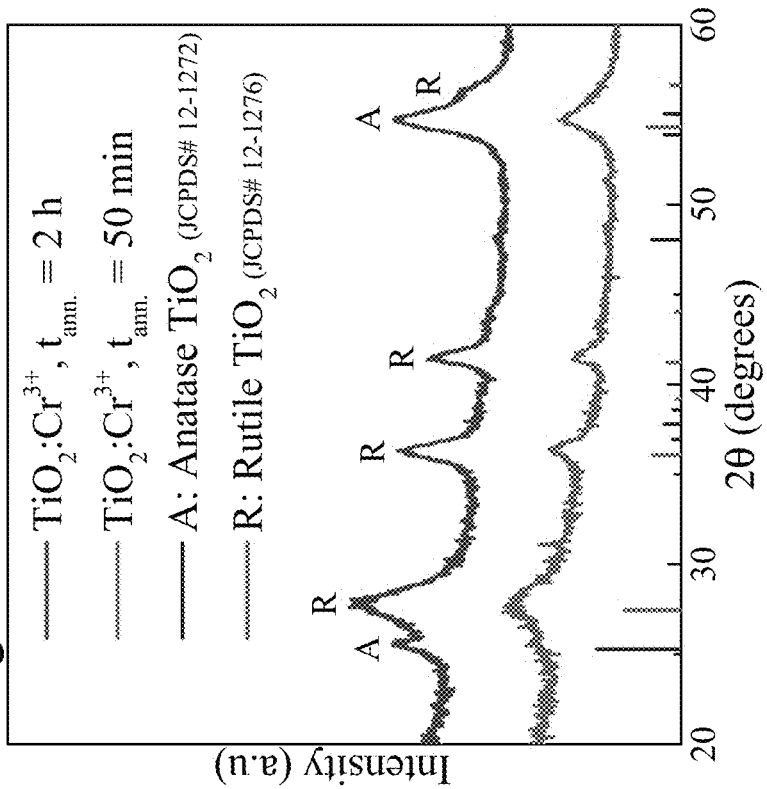
FIG. 17, comprising FIGS. 17A and 17B, demonstrate the minimal segregation propensity in Fe and Cr dopants.
Figure 17:
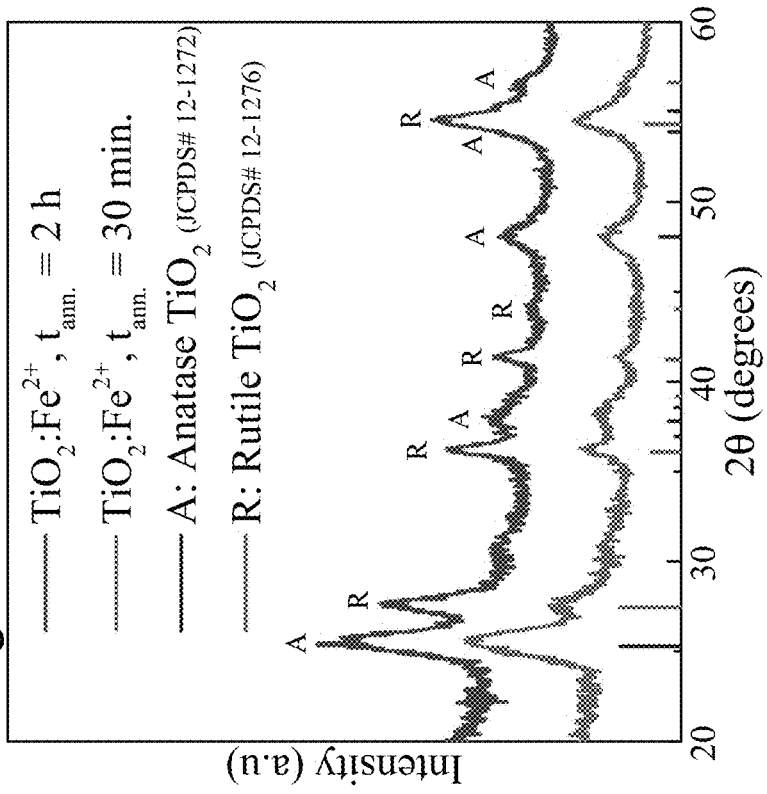

Some dopants, such as iron (FIG. 17A) or chromium (FIG. 17B), change the structure of the $TiO_2$ to rutile upon annealing, but segregation is less likely. These doped species still have very prominent light absorption and colors. The differing behavior of transition metal dopants with regard to segregation may be due in part to differences in ionic radii. The previously observed phenomenon of dopant segregation with $Ni^{2+}$ and $Co^{2+}$ is likely due to their larger ionic radii compared to that of host cation ($Ti^{4+}$). In the case of $Fe^{2+}$ and $Cr^{3+}$, the annealing rate has no effect on segregation of dopant metal oxide clusters. This difference may be attributed in part to the incorporation of smaller sized dopant ions in the host lattice of $TiO_2$.

Figure 18:
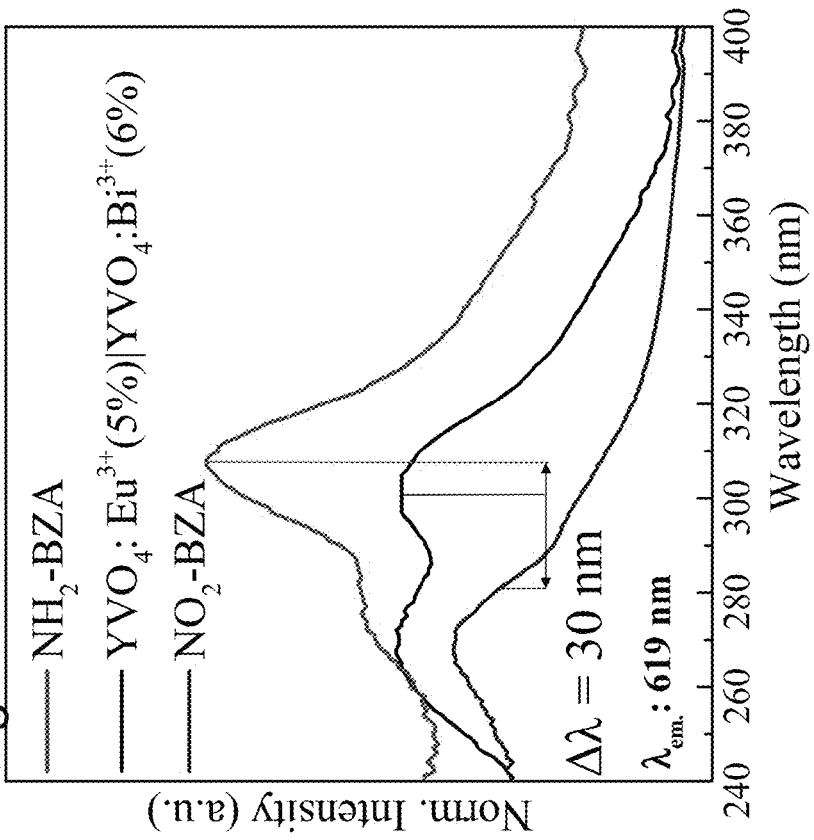
FIG. 18, comprising
Figure 18:
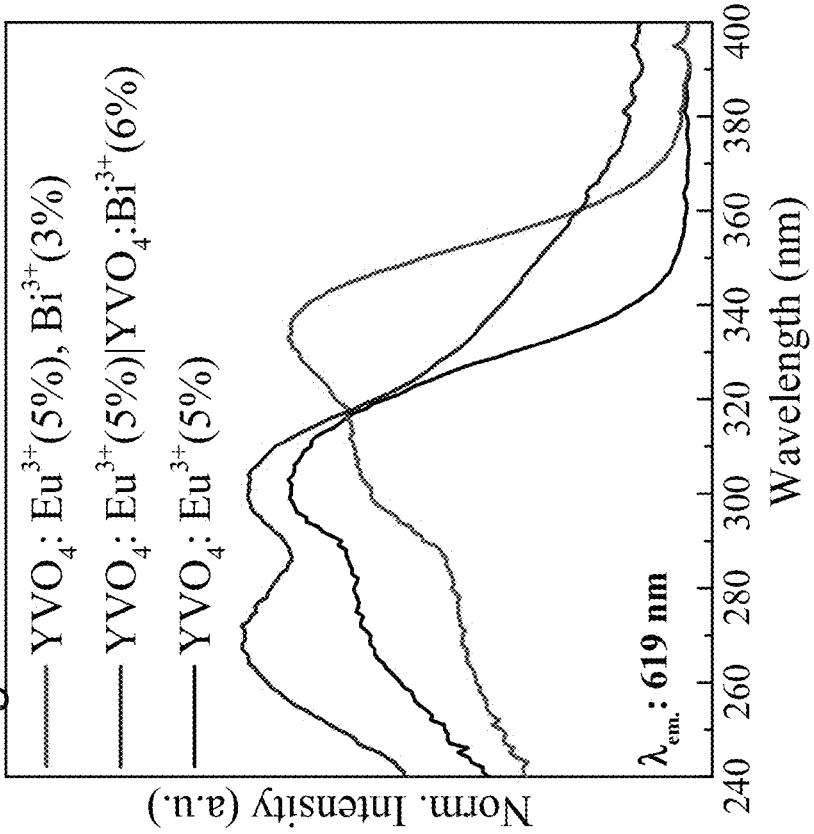
Figure 19:
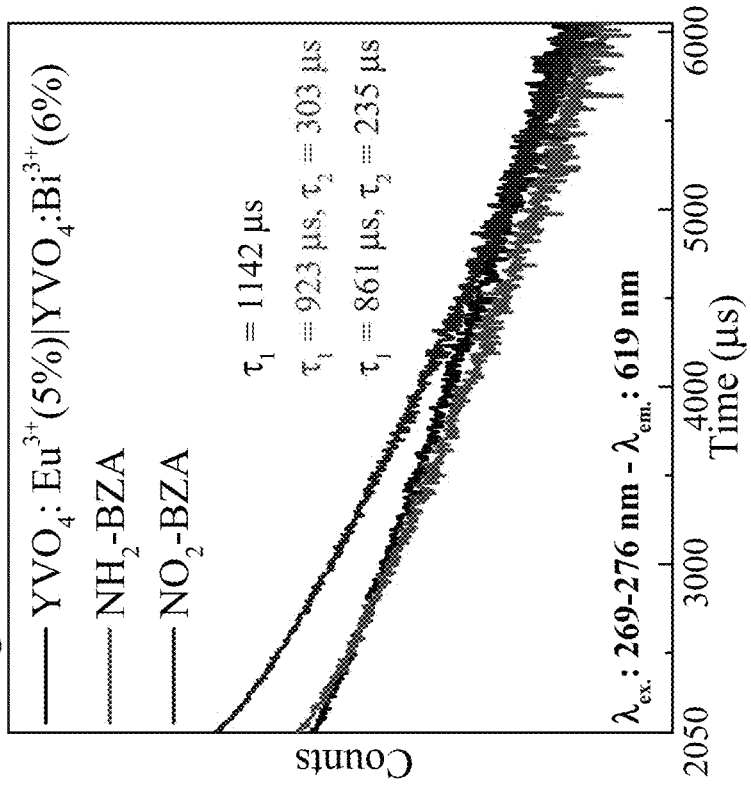
FIG. 19, comprising FIGS. 19A and 19B, compares the phosphorescent lifetimes of core-shell NPs and surface-modified core-shell NPs.
Figure 19:
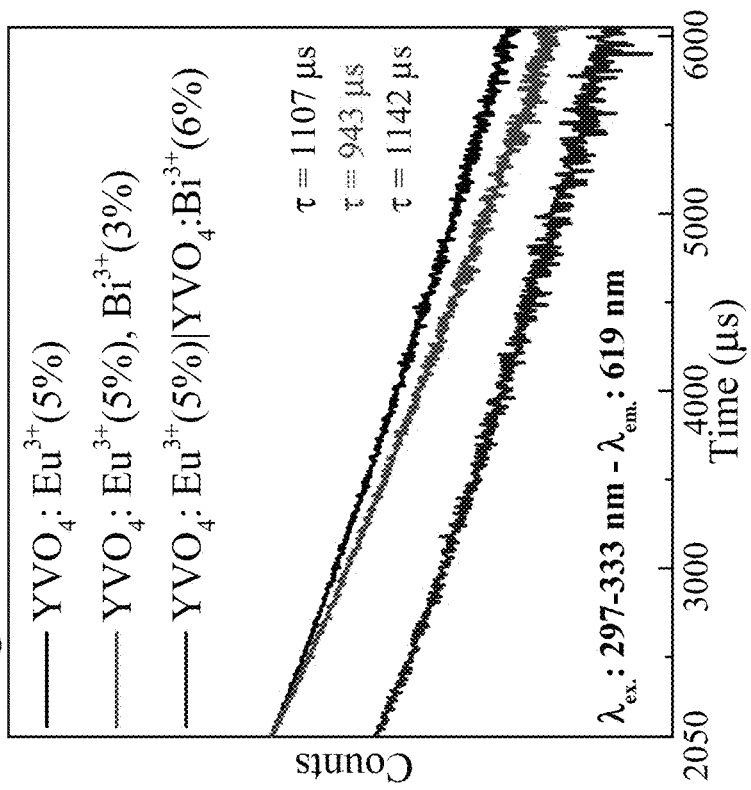

Weak fields can be used to tune the excitation wavelengths in $YVO_4$:$Eu^{3+}$ (5 mol %)|$YVO_4$:$Bi^{3+}$ (6 mol %) core-shell NPs similar to the adaptive absorption observed in the $NaYF_4$:Er|Y(OH)$_3$:Ni core-shell NPs. Bi is a common rare earth sensitizer but specifically works in $YVO_4$. The core-shell structure facilitates the tuning of emission intensity and excitation wavelengths so that light appearance may be directly controlled. Traditionally, these compounds are used in biological imaging. FIGS. 18A and 18B show how a ligand/biomolecule can be attached to the surface to enhance or quench the luminescence. The resulting nanoparticle represents a novel low-cost biological sensor which can bind to specific biological species for rapid detection. A slight decrease in luminescent lifetime is observed upon with ligand attachment (FIG. 19A and FIG. 19B). This decrease is expected and is proportional to luminescent efficiency. Typically, these structures would result in more prominent reduction in lifetimes and decreases in efficiency.

Example 4

Weak Field Tuning of Transition-Metal Dopant Hybridization in Solid Hosts

Previous reports focusing on tailoring the hybridization in a crystal are based on the application of strong electric/magnetic fields (Shanavas, et al., Phys. Rev. Lett. 2014, 112, 086802; Asamitsu, et al., Nature 1995, 373, 407), mechanical stress (Chen, et al., Appl. Phys. Lett. 2011, 98, 241916), or crystal composition (Dai, et al., J. Mater. Chem. C 2013, 1, 4570-4576; Bailey, et al., J. Am. Chem. Soc. 2003, 125, 7100-7106) to distort local symmetries or crystal field splitting. Strain engineering has been commonly implemented to indirectly control the metal-oxygen hybridization by changing the Ni—O bond distance in Ni-doped $SrTiO_3$ thin films (Bai, et al., Sci. Rep. 2014, 4, 5724) and organometallic complexes (Byrne, et al., Chem.-Eur. J. 2012, 18, 7738-7748). However, these methods are limited due to the constant application of strong fields or the irreversible modification of the composition, which can limit device performance via space charges accumulation or unwanted geometric distortion (Skobel'tsyn, D. V., Surface Properties of Semiconductors and Dynamics of Ionic Crystals; Plenum Press: New York, U.S., 1971; Vol. 48). Therefore, it remains a challenge for the scientific community to modify the hybridization of atomic orbitals in a stable but reversible manner.

Reversible tuning of crystal field splitting energy for controlling the TM 3d-O 2p hybridization in a TM-doped solid is possible using weak external fields (surface dipoles) (Goh, et al., Appl. Phys. 2007, 101, 114503). While the overall effect of these external fields is limited primarily at the surface ($\Delta_o \propto R^{-5}$, where R is the metal-ligand distance in octahedral TM complexes) (Moreno, et al., Int. J. Quantum Chem. 1994, 52, 829-835) they can be reversibly manipulated (Lopez-Sanchez, J. A., et al., Nat. Chem. 2011, 3, 551). It is possible to manipulate the interfacial electron density with polarized molecules, potentially modifying the TM dopant 3d orbitals/p-d hybridization to control the electronic properties of a film. This response has been previously used to tune the open circuit voltage/short circuit current in photovoltaic devices by systematically controlling the recombination kinetics and charge injection (Goh, et al., Appl. Phys. 2007, 101, 114503).

To study the relationship between TM-O hybridization in the presence of surface dipoles, Ni-doped $TiO_2$ films were chosen for their chemical stability and strong optical response. Ni was incorporated into a $TiO_2$ thin film by spin coating a dilute sol-gel solution and annealing. The thin films were characterized using high-resolution transmission electron microscope (HRTEM), with elemental electron loss spectroscopy (EELS) chemical mapping, X-ray Diffraction (XRD), and UV-Vis spectroscopy to determine the surface composition, bulk crystal structure, and crystal field splitting energy of the solid. The surface of the $TiO_2$:Ni films was functionalized with para-substituted benzoic acid ligands which can modify the dipole moment over 8 D. The influence of these external chemical fields on the electronic structure of the interfacial dopants is probed via surface sensitive electronic characterizations such as X-ray Photoelectron Spectroscopy (XPS) and soft X-ray Absorption Spectroscopy (XAS). The relationship between the dopant electron density in the valence 3d orbitals and the electronegativity of the benzoic acid substituent has been studied. The characterization results suggest that the covalency/hybridization of the dopant (Ni)-oxygen (O) bond increases for electronegative substituents and vice versa for electropositive substituents.

Materials and Methods

Titanium (IV) Isopropoxide (TTIP, Acros Organics, >98%), nickel (II) chloride hexahydrate ($NiCl_2 \cdot 6H_2O$, BTC, >99%), hydrochloric acid (HCl, 36-38.5% purity, ACS grade), p-nitrobenzoic acid ($NO_2$—BZA, Alfa Aesar, 99%), p-aminobenzoic acid ($NH_2$—BZA, VWR Chemicals), reagent alcohol (<0.075% VWR Analytical), acetonitrile (HPLC grade, >99.8%) were obtained commercially. All the materials were used without further purification.

The sol required for coating $TiO_2$:Ni film was synthesized by employing sol-gel chemistry (Yu, et al., Sci. Rep. 2015, 5, 9561). $NiCl_2 \cdot 6H_2O$ was dissolved in 5 mL of ethanol and then 1.5 mL of TTIP was added dropwise to form homogeneous $TiO_2$:Ni sol after 3-4 h of continuous stirring. 125 µL of HCl was used as a catalyst in this process to control the rapid hydrolysis of TTIP precursor. The concentration of Ni precursor to TTIP was varied from 0 to 15 mol %. The prepared sol was aged for 24 h before spin coating. The sol was diluted (1:2, v/v) with ethanol prior to spin coating onto Si(100) substrates at 3000 rpm for 60 s. The spin-coated samples were dried at 100° C. for 5 min with subsequent annealing at 450° C. for 2.5 h under low vacuum (~100 mtorr).

The surface of the inorganic film was modified with benzoic acid (BZA) ligands via carboxylic acid chemistry (Goh, et al., Appl. Phys. 2007, 101, 114503), wherein the carboxylic groups chemisorb onto the hydrophilic surface. Two para-substituted BZA groups were chosen to act as an electron withdrawing group ($NO_2$, µ=3.8 D) and an electron donating group ($NH_2$, µ=−4.5 D). The $TiO_2$ films were immersed in 1 mM acid solution in acetonitrile. After 2-3 h, the samples were rinsed with ethanol and isopropanol before drying in air.

The thickness of the film was measured using a Filmetrics (F3-UV) reflectometer tool. A standard Si(100) wafer was used as a reference to account for the native oxide layer. HRTEM images were obtained (sensitive to light elements) using the 200 kV JEOL-ARM electron microscope equipped with double aberration correctors, a dual-energy-loss spectrometer, and a cold FEG source. Scanning EELS spectra were obtained with a convergence semi-angle of 20 mrad, and a collection semi-angle of 88 mrad. Dual EELS mode was used to remove the intrinsic energy shifts of the electron beam introduced in the EELS scanning process. The EELS spectra were background subtracted with a power-law function, and multiple scattering was removed by a Fourier deconvolution method. The elemental maps were determined from Ni-$L_{II,III}$, Ti $L_{II,III}$, O K, and Si L edges. The crystal structure was identified by performing Gracing Incidence (GI)-XRD using PANalytical X-ray diffractometer operating at 45 kV and 40 mA. The θ-2θ radial scan was performed over the range 15-70° with a step size of 0.04° and dwell time of 60 s, using Cu $K_{α1}$ (λ=1.54 Å) as radiation source.

The absorption spectra of $TiO_2$:Ni was recorded using a Perkin-Elmer Lambda 900 UV/Vis/NIR spectrometer equipped with an integrating sphere and a center-mounted sample holder. The absorption scans ranging from 300-1300 nm with a scan rate of 0.5 nm/s were obtained on the thin films deposited on glass substrates before annealing. The change in monochromators was set to occur at 900 nm. Fourier-transform infrared (FTIR) spectroscopy was performed on the surface functionalized $TiO_2$ thin films using an ATR Germanium crystal in a Thermo Scientific Nicolet 6700 FTIR equipped with an MCT detector cooled to liquid $N_2$ temperatures. The data was collected in absorbance (log (1/R)) mode, with air as background, and resolution being 4 $cm^{-1}$ in the region going from 400-1400 $cm^{-1}$. The incident angle of the laser was kept at 50° to collect the total internally reflected light.

The oxidation states of the $TiO_2$:Ni film were determined from XPS measurements performed using Scienta Omicron ESCA 2SR XPS system. A monochromatic Al $K_{α1}$ X-ray source and a hemispherical analyzer with a 128 channel detector were used for all samples. The pressure inside the chamber was maintained at $1.5 \times 10^{-9}$ torr. The XPS spectra were calibrated to adventitious C is peak at 284.6 eV. The step size of these measurements was 0.05 eV and the inherent Gaussian width of the source was 0.167 eV. All peaks were fit (using CasaXPS software) to symmetric Voigt line shapes that were 70% Gaussian and 30% Lorentzian product functions.

X-ray Absorption Near Edge Spectroscopy (XANES) measurements were taken at two beamlines: High Energy X-ray Absorption Spectroscopy (HEXAS: 5-30 keV) beamline on a 11-pole, 7.5 T multi-pole wiggler and Vacuum Line Spacing-Plane Grating Monochromatic (VLSPGM: 0.2-1 keV) at the Center for Advanced Microstructures and Devices (CAMD). Ni K edge in $TiO_2$:Ni (15 mol %) thin film was measured in the HEXAS beam line in fluorescence mode of detection. The L edges of Ti, Ni and K edge of O were measured in the VLSPGM beam line with photon energy resolution of about 0.1 eV. The data was collected in total electron yield (TEY) mode with the sampling depth being less than 10 nm (Abbate, et al., Surf. Interface Anal. 1992, 18, 65-69). The samples are loaded onto a stage before transferring them to the vacuum chamber via load lock. The pressure inside the sample chamber was maintained around $2 \times 10^{-9}$ torr. The vertical slit width used for these low energy XAS measurements was 100 µm for Ti and O; and 50 µm for Ni L edge to enhance the resolution. The spectra reported is obtained after averaging the data from multiple scans. $TiO_2$ and NiO powders were used as reference for calibration purposes. XANES data is normalized and analyzed using Athena software.

Gracing incidence XRD scans were performed on $TiO_2$:Ni (15 mol %) film deposited on Si(100) substrate. The crystal structure was observed to be destroyed probably because of the formation of new $NiTiO_3$ phase and non-uniformity of the film.

Figure 20:
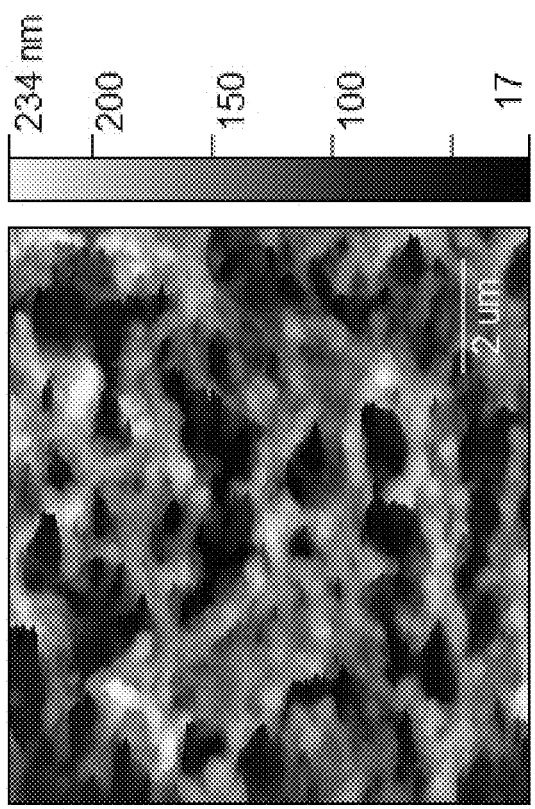
FIG. 20, comprising
Figure 20:
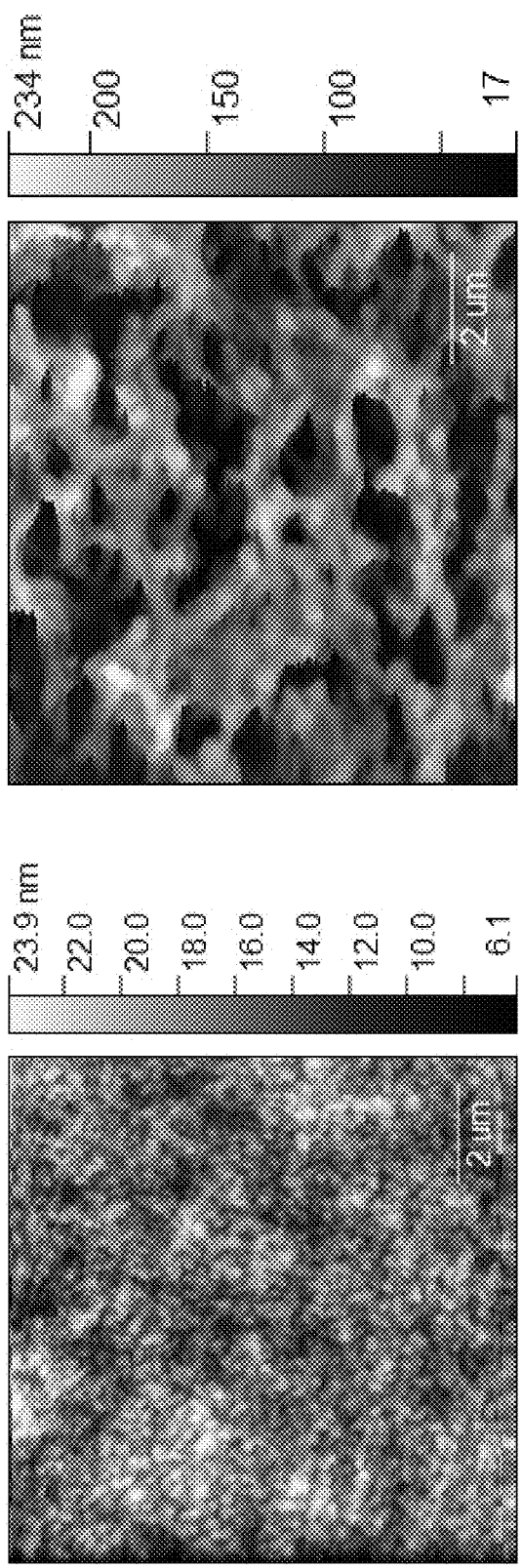

The Results of the Experiments Will Now be Discussed $TiO_2$ films were spin coated onto Si substrates from an aged solution produced via sol-gel chemistry. The thickness was controlled based on spin speeds and number of coatings with the minimum thickness of a pure $TiO_2$ film measured to be 40±5 nm (Table 2). Film thickness with Ni dopants was expected to be similar based on the processing but could not be quantified due to the formation of a non-conformal film as observed via AFM (FIG. 20).

TABLE 2

Thickness of the TiO$_2$ thin film measured using Filmetrics Tool

| Thin Film | Dilution Ratio | Spin Speed | Thickness |
|---|---|---|---|
| TiO$_2$ | — | 3000 rpm | 89.53 nm |
| TiO$_2$ | 1:1 | 3000 rpm | 51.09 nm |
| TiO$_2$ | 1:2 | 3000 rpm | 37.74 nm |

Figure 21:
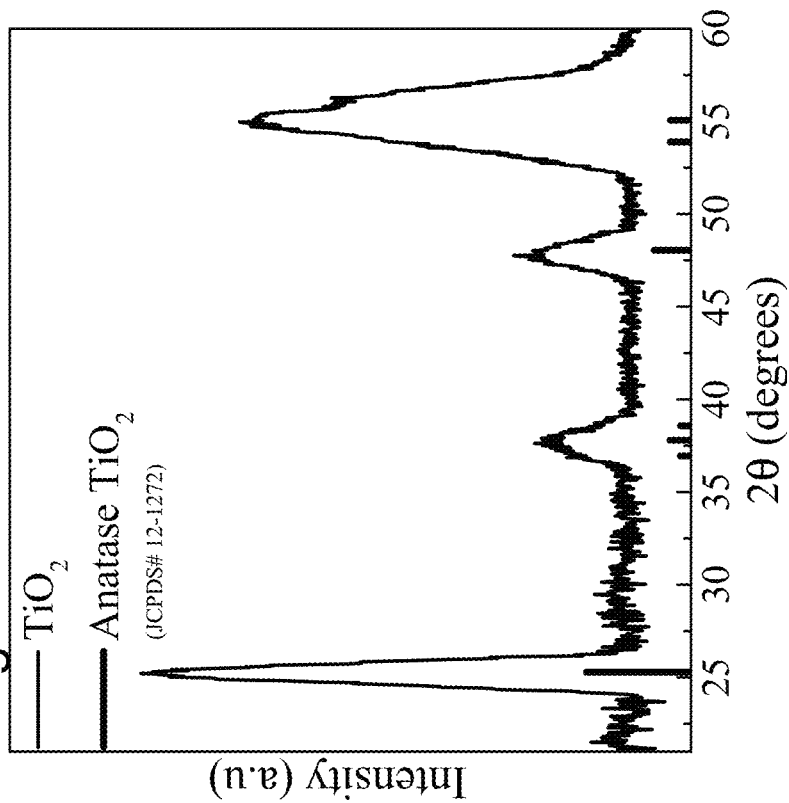
FIG. 21, comprising
Figure 21:
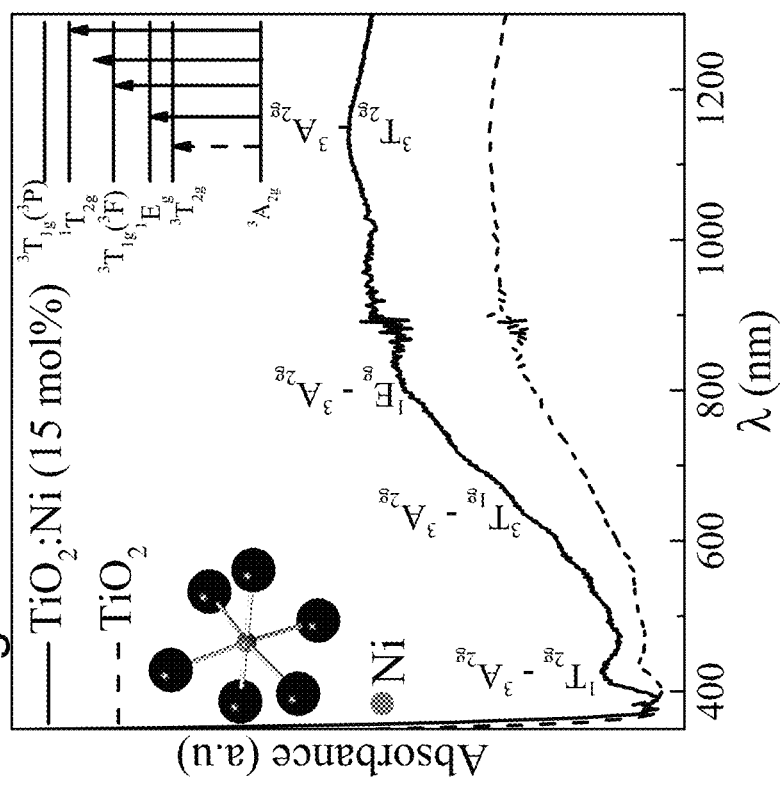
Figure 22:
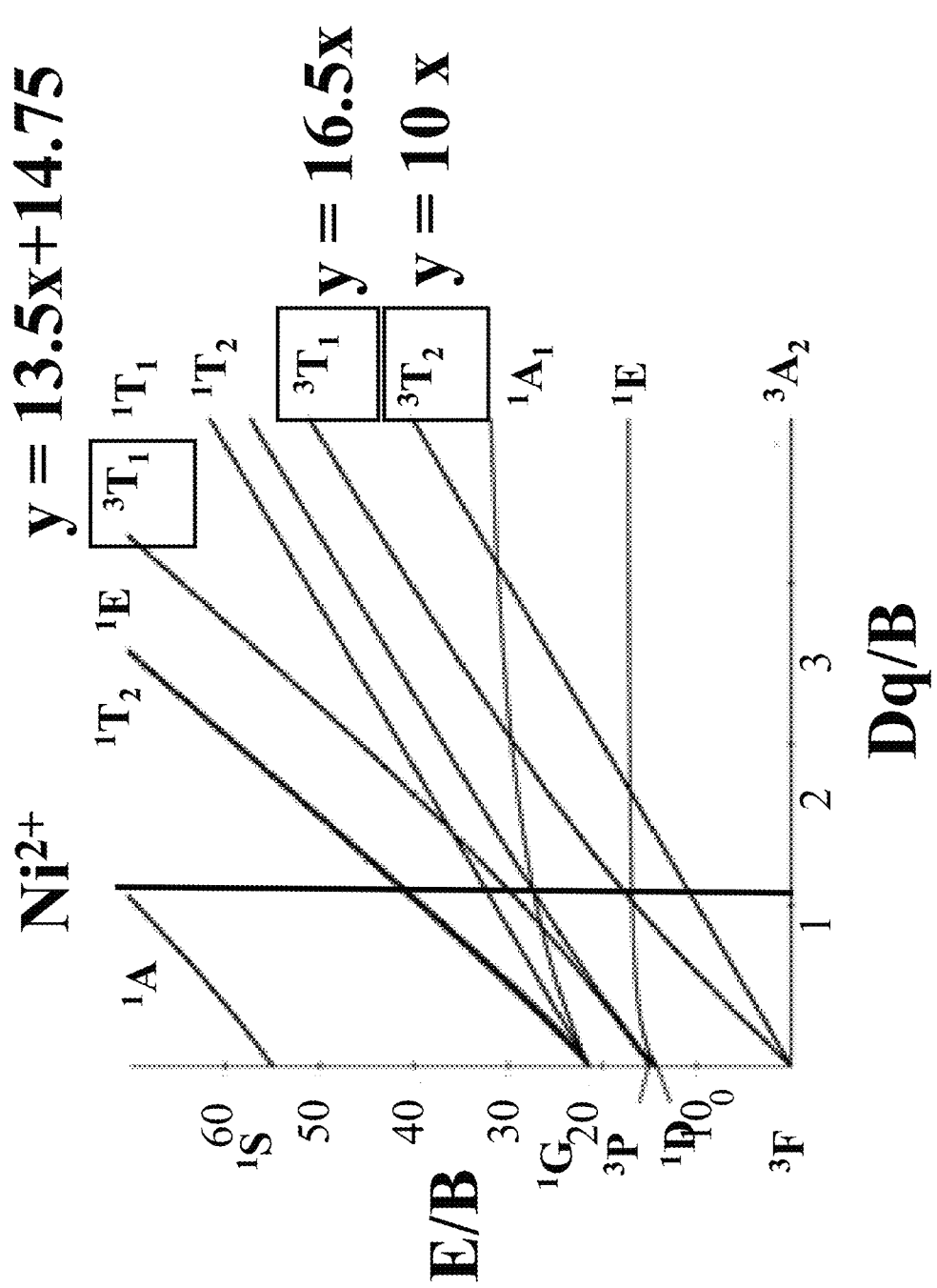
FIG. 22 is a Tanabe-Sugano diagram of $Ni^{2+}$ ($3d^8$) in $O_h$ symmetry. The boxed electronic transitions are spin allowed transitions as the spin multiplicity remains same both in the ground and excited states. Slopes of all the spin allowed transitions are calculated as shown in the adjacent Tanabe-Sugano diagram. With the observed experimental values of E, the crystal field parameters Dq=890.4 $cm^{-1}$ and B=780.27 $cm^{-1}$ are obtained by solving the $^3A_2$-$^3T_2$ ($^3F$) and $^3A_2$-$^3Ti$ ($^3P$) two simultaneous equations. To check the accuracy of the calculated parameters (Dq/B=1.14), the $\lambda$ of other two transitions $^3A_2$-$^1E$ and $^3A_2$-$^3T_1$ ($^3F$) are theoretically computed. The curvy pattern in the absorption spectra from 600-800 nm is attributed to the deviation from perfect octahedral environment, which results in the splitting of the $^3T_1$ ($^3F$) excited state.
Figure 23:
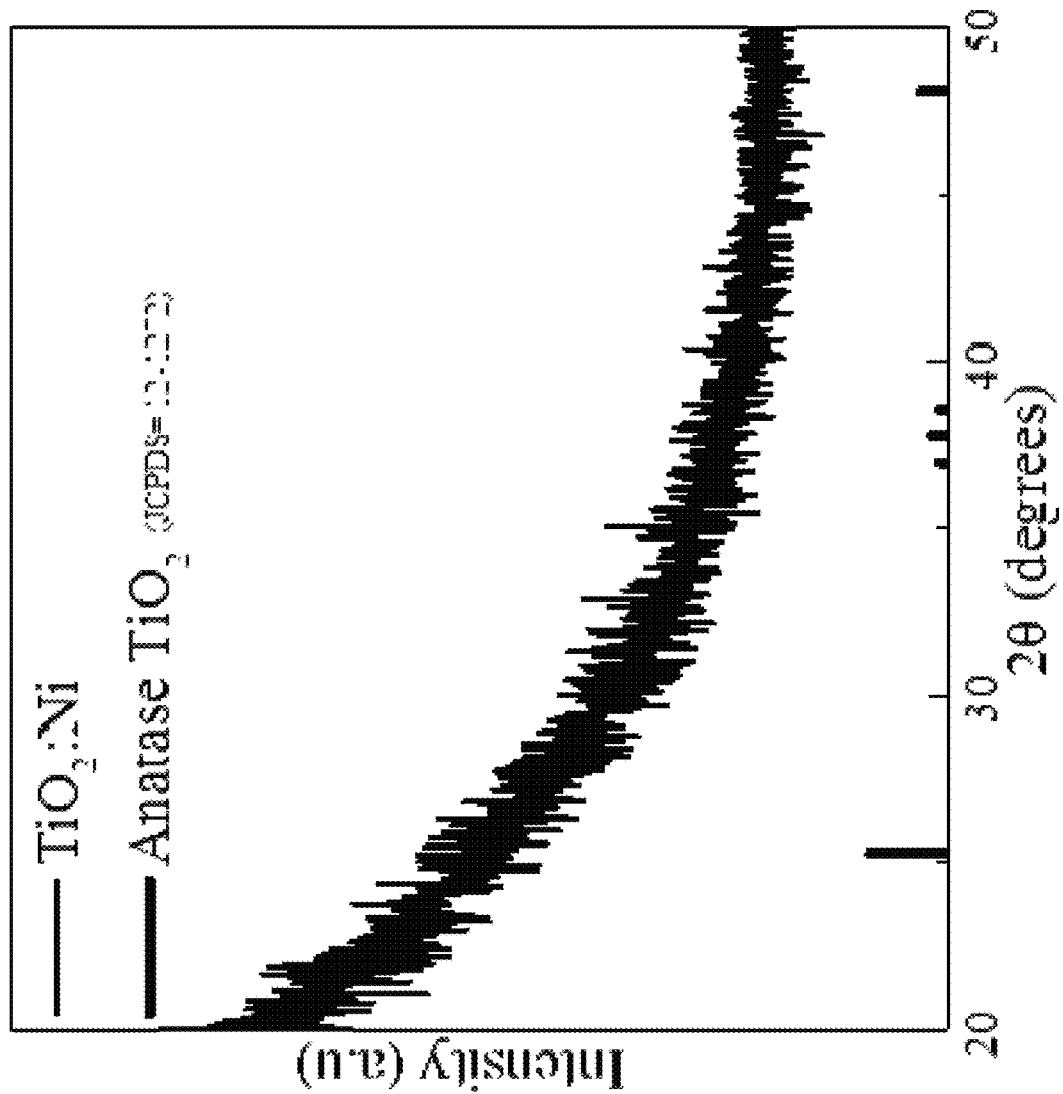
FIG. 23 is a plot showing the GI-XRD pattern of $TiO_2:Ni$ (15 mol %) film deposited on an Si(100) substrate and annealed at 450° C. for 2 h. The crystal structure was observed to be destroyed probably because of the formation of new $NiTiO_3$ phase and non-uniformity of the film.
Figure 27:
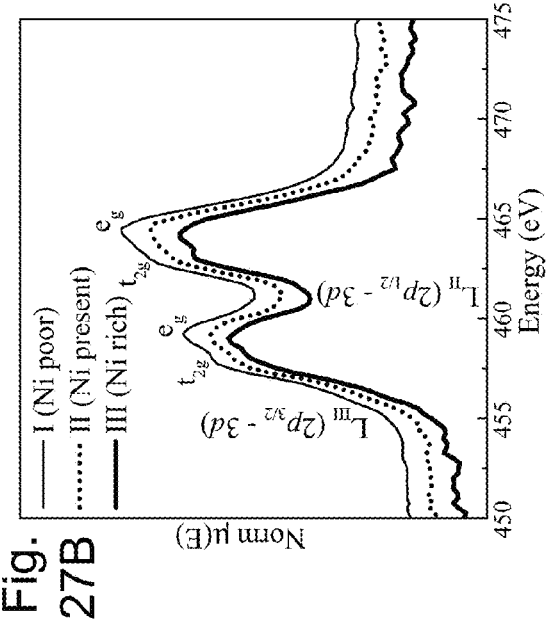
FIG. 27, comprising
Figure 27:
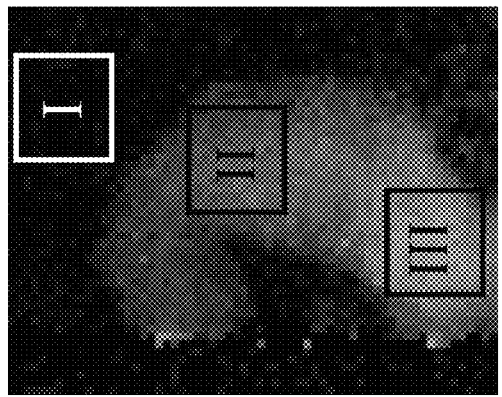
Figure 27:
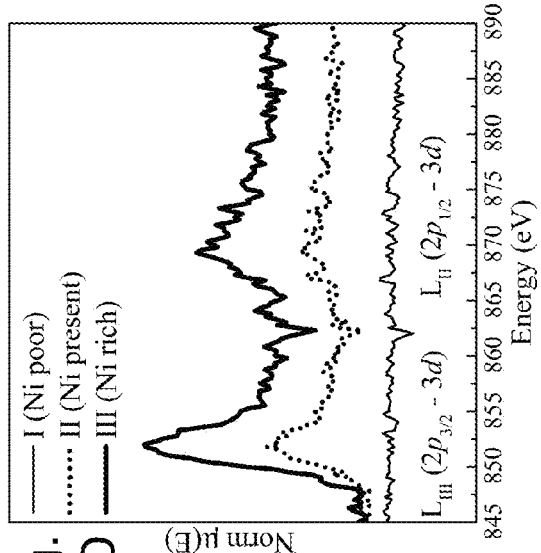
Figure 27:
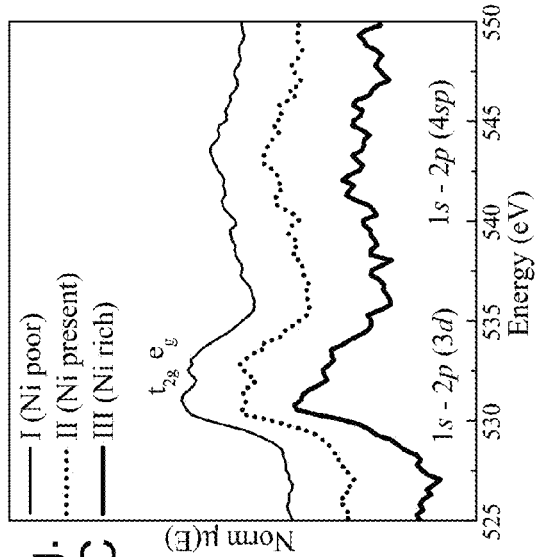

To verify the Ni incorporation, UV-Vis absorption spectra was collected for pure TiO$_2$ and TiO$_2$:Ni sol deposited on glass substrates (Thickness ~500 nm) before annealing. Characteristic Ni$^{2+}$ absorption peaks were identified, as shown in FIG. 21A (Donegan, et al., J. Lumin. 1986, 35, 57-63), and assigned to their respective electronic transitions between the t$_{2g}$ and e$_g$ levels according to theory for d$^8$ electronic configuration in octahedral symmetry (Tanabe, et al., J. Phys. Soc. Jpn. 1954, 9, 753-766; Tanabe, et al., J. Phys. Soc. Jpn. 1954, 9, 766-779; Tanabe, et al., J. Phys. Soc. Jpn. 1956, 11, 864-877; Sugano, et al., J. Phys. Soc. Jpn. 1958, 13, 880-899) (FIG. 22, and inset of FIG. 21A). An extracted 10 Dq value of 1.10 eV was obtained from the UV-Vis spectrum (Table 3), which is less than pure TiO$_2$ (10 Dq=1.8 eV) (Finkelstein, et al., X-Ray Spectrom. 2002, 31, 414-418) and is attributed to the amorphous nature of the film. FIG. 21B shows the GI-XRD pattern of the pure TiO$_2$ film annealed at 450° C. with all peaks indexed to anatase TiO$_2$ (JCPDS #12-1272). In TiO$_2$:Ni film (FIG. 23), the crystal structure was observed to be amorphous, which was attributed to the inability to measure the non-conformal film, instead probing the native SiO$_2$ layer. Therefore, in order to probe the local crystal structure and the distribution of Ni dopants in the TiO$_2$:Ni film after annealing, aberration-corrected HRTEM imaging was performed in conjunction with EELS chemical mapping. Bright field HRTEM images (FIG. 24A) indicate the presence of two phases which were identified as TiO$_2$ and an oxide phase formed by Ni and Ti (yellow outline). Lattice spacings of 3.54 Å and 1.91 Å A were identified for (101) and (020) planes of anatase TiO$_2$ (FIG. 25) (Ding, et al., J. Mater. Chem. 2011, 21, 1677-1680). Furthermore, the slight expansion observed in the lattice of TiO$_2$ is attributed to the larger Ni ion incorporated as a substitutional dopant (Karthik, et al., J. Alloys Compd. 2011, 509, 5173-5176). The yellow outlined region is the Ni dense phase in the TiO$_2$ film. The lattice fringe spacing in this region was extracted as 2.12 Å, which matches to the (002) plane of NiTiO$_3$ (Posnjak, et al., Z. Kristallogr.-Cryst. Mater. 1934, 88, 271-280). Although, the formation of NiTiO$_3$ phase is not favored at temperatures below 600° C. Karimipour, et al., Phys. Scr. 2011, 84, 035702; Bellam, et al., RSC Adv. 2015, 5, 10551-10559; Qu, et al., J. Mater. Chem. 2012, 22, 16471-16476), the lower solubility of the dopant (Ni) and higher annealing temperatures (450° C.) resulted in the agglomeration and growth of the NiTiO$_3$ clusters in the TiO$_2$ network (Karimipour, et al., Phys. Scr. 2011, 84, 035702). The EELS compositional mapping (FIG. 24B, FIG. 24C, and FIG. 24D) show the chemical maps for Ni, Ti, and O elements in the highlighted region (Ni dense) of FIG. 24A. The elemental maps also indicate the formation of a mixed phase of Ni, Ti, and O and sparsely distributed Ni in TiO$_2$ film. Furthermore, the electronic characterizations such as XPS and XAS (discussed below) suggest the presence of NiTiO$_3$ clusters. In either case of TiO$_2$:Ni or NiTiO$_3$, the local symmetry of Ni remains unchanged, i.e., Ni dopant ions are bonded to six O ions in an octahedral (O$_h$) symmetry (FIGS. 26 and 27).

TABLE 3

Energy of Electronic transitions in Ni$^{2+}$

| Transition | Expt | Calc |
|---|---|---|
| $^3A_2$-$^1E$ | 798 nm | 776 nm |
| $^3A_2$-$^3T_1(^3F)$ | 647 nm | 680 nm |

Figure 28:
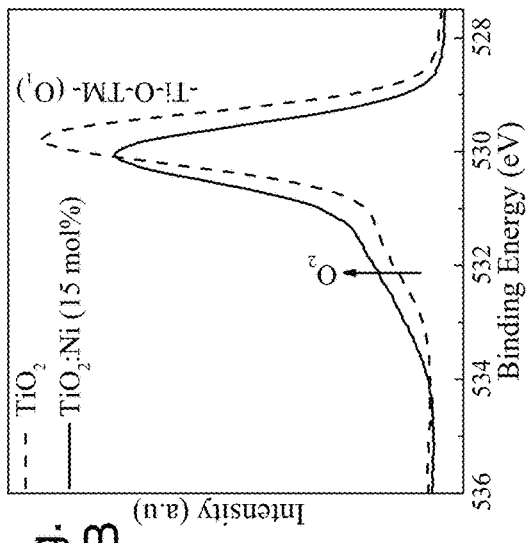
FIGS. 28A to 28D, depicts X-ray photoelectron spectra for pure $TiO_2$ and $TiO_2:Ni$ (15 mol %) thin films.
Figure 28:
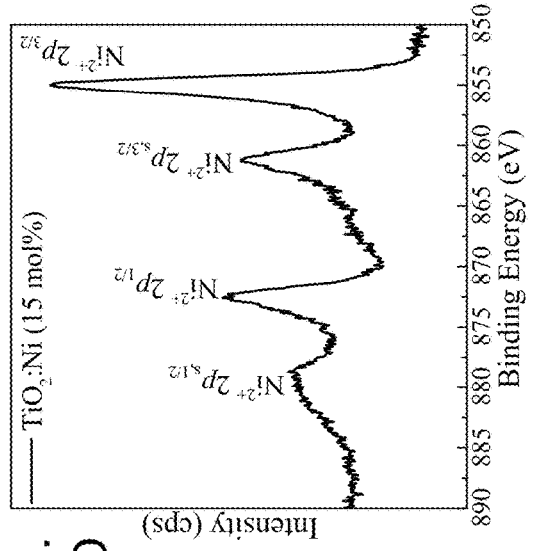
Figure 28:
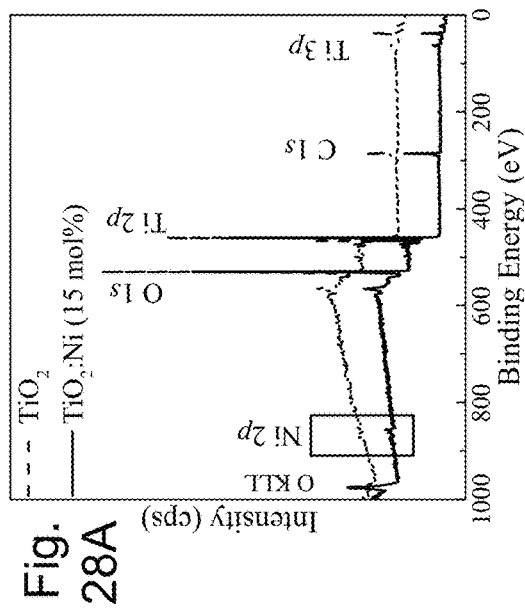
Figure 28:
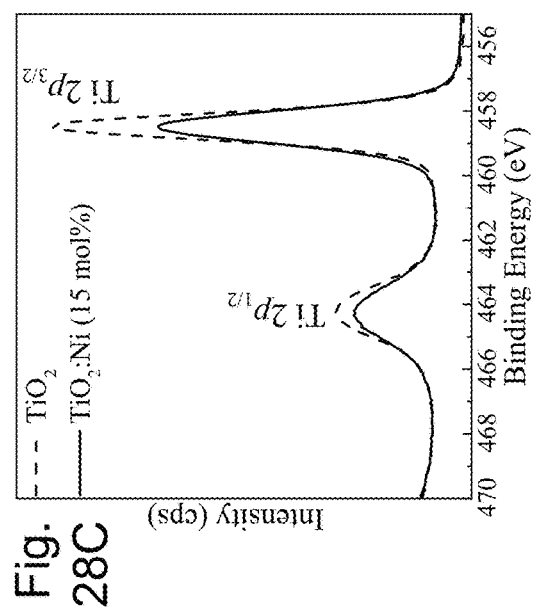
Figure 29:
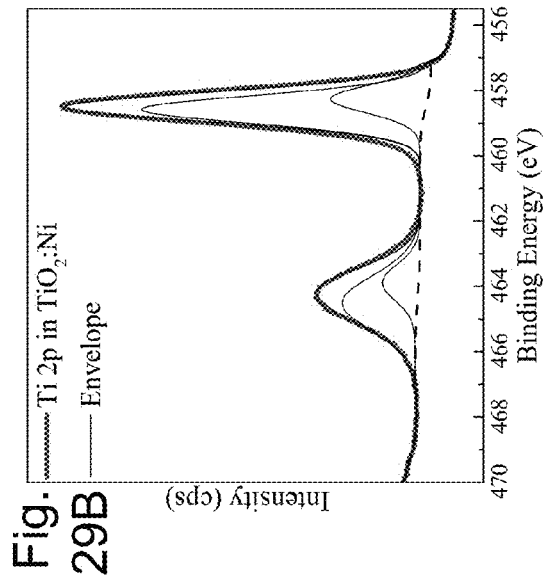
FIG. 29, comprising
Figure 29:
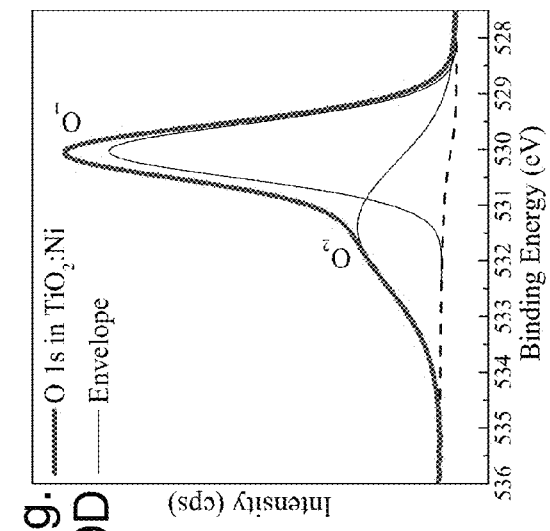
Figure 29:
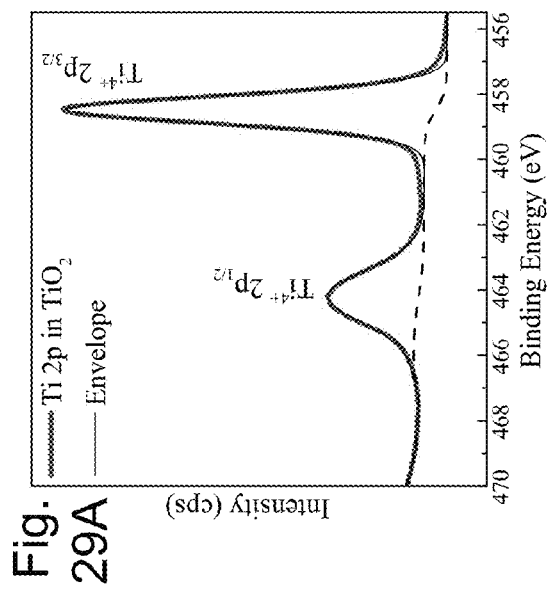
Figure 29:
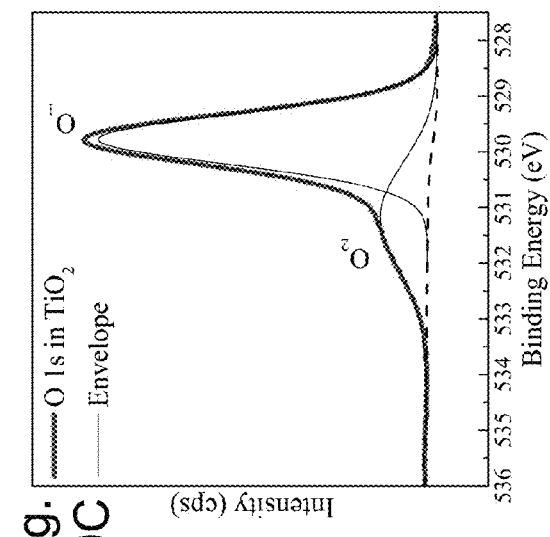

In order to investigate the Ni 3d-O 2p hybridization in the TiO$_2$:Ni film, surface sensitive XPS and XAS were performed. Due to the nature of these methods, the resulting response is a statistical representation of the film and not an individual atom, describing the overall chemical and physical properties of the film. The survey scans (FIG. 28A), Ti 2p, O 1s, and Ni 2p detailed spectra for the pure TiO$_2$ and TiO$_2$:Ni are shown in FIG. 28. The O 1s XPS spectra (FIG. 28B) is comprised of a strong lattice oxygen peak (O$_1$, Ti—O-TM; Bellam, et al., RSC Adv. 2015, 5, 10551-10559) along with the shoulder peak (O$_2$). The positive shift in O$_1$, is attributed to the presence of a higher electronegative dopant (Ni$^{2+}$) in the TiO$_2$ lattice (Roy, et al., J. Phys. Chem. C 2014, 118, 29499-29506), suggesting the formation of a —Ni—O—Ti— bond. The area under the shoulder peak (O$_2$), ascribed to the oxygen bonded to under coordinated cations, is observed to increase with Ni doping. When Ni$^{2+}$ substitutes Ti$^{4+}$ ions, the charge in the lattice is compensated by the creation of oxygen vacancies (Bharti, et al., Sci. Rep. 2016, 6, 32355; Bellam, et al., RSC Adv. 2015, 5, 10551-10559) resulting in under coordinated cations as shown in the EELS maps (FIGS. 24B to 24D). Additionally, this peak can be attributed to surface hydroxyl (—OH) groups bonded to the hydrophilic TiO$_2$:Ni surface (Yao, et al., ACS Appl. Mater. Interfaces 2010, 2, 2617-2622). Next, Ti 2p detailed spectra (FIG. 28C) is performed and the characteristic Ti$^{4+}$ spin-orbital splitting, with energies at 458.8 eV (2p$_{3/2}$) and 464.4 eV (2p$_{1/2}$), was observed for both the pure and doped films (Sanjinés, et al., J. Appl. Phys. 1994, 75, 2945-2951). The broadening of the Ti 2p$_{3/2}$ main peak in TiO$_2$:Ni films is due to the Ti$^{3+}$ shoulder, which is again attributed to the charge compensation TiO$_2$:Ni lattice (Bharti, et al., Sci. Rep. 2016, 6, 32355). Ni 2p detailed scans (FIG. 28D) indicate the presence of Ni$^{2+}$ (Ding, et al., RSC Adv. 2015, 5, 95478-95487). The spin-orbital splitting energy was measured as 17.48 eV, lower than that of NiO (18.4 eV) (Yin, et al., Solid State Commun. 2005, 135, 430-433), suggesting that the NiO clusters are not present. Furthermore, the peak position of the Ni 2p$_{3/2}$ main peak at 855.04 eV corresponds to either Ni$^{2+}$ doped in TiO$_2$ lattice or to NiTiO$_3$ (Yu, et al., Sci. Rep. 2015, 5, 9561; Qu, et al., J. Mater. Chem. 2012, 22, 16471-16476; Uddin, et al., Phys. Chem. Chem. Phys. 2017, 19, 19279-19288). The two satellite peaks (6 eV, 9.5 eV) in Ni 2p spectra are attributed to the screening effects of various core-hole and ligand hole states by the 3d and 4s bands (Grosvenor, et al., Surf. Sci. 2006, 600, 1771-1779). Deconvoluted spectra are shown in FIG. 29 and tabulated in Table 4.

TABLE 4

Binding Energies and Area under the Peaks of Ti
and O in pure TiO$_2$ and TiO$_2$:Ni (15 mol %) films

| Thin film | Ti$^{4+}$ 2p$_{3/2}$ Pos | Ti$^{4+}$ 2p$_{3/2}$ Area | Ti$^{4+}$ 2p$_{1/2}$ Pos | Ti$^{4+}$ 2p$_{1/2}$ Area | O$_1$ Pos | O$_1$ Area | O$_2$ Pos | O$_2$ Area |
|---|---|---|---|---|---|---|---|---|
| TiO$_2$ | 458.47 eV | 68.48% | 464.17 eV | 31.52% | 529.77 eV | 77.40% | 531.17 eV | 22.60% |
| TiO$_2$:Ni (15 mol %) | 458.58 eV | 49.41% | 464.49 eV | 25.40% | 530.03 eV | 63.18% | 531.56 eV | 36.82% |

Figure 30:
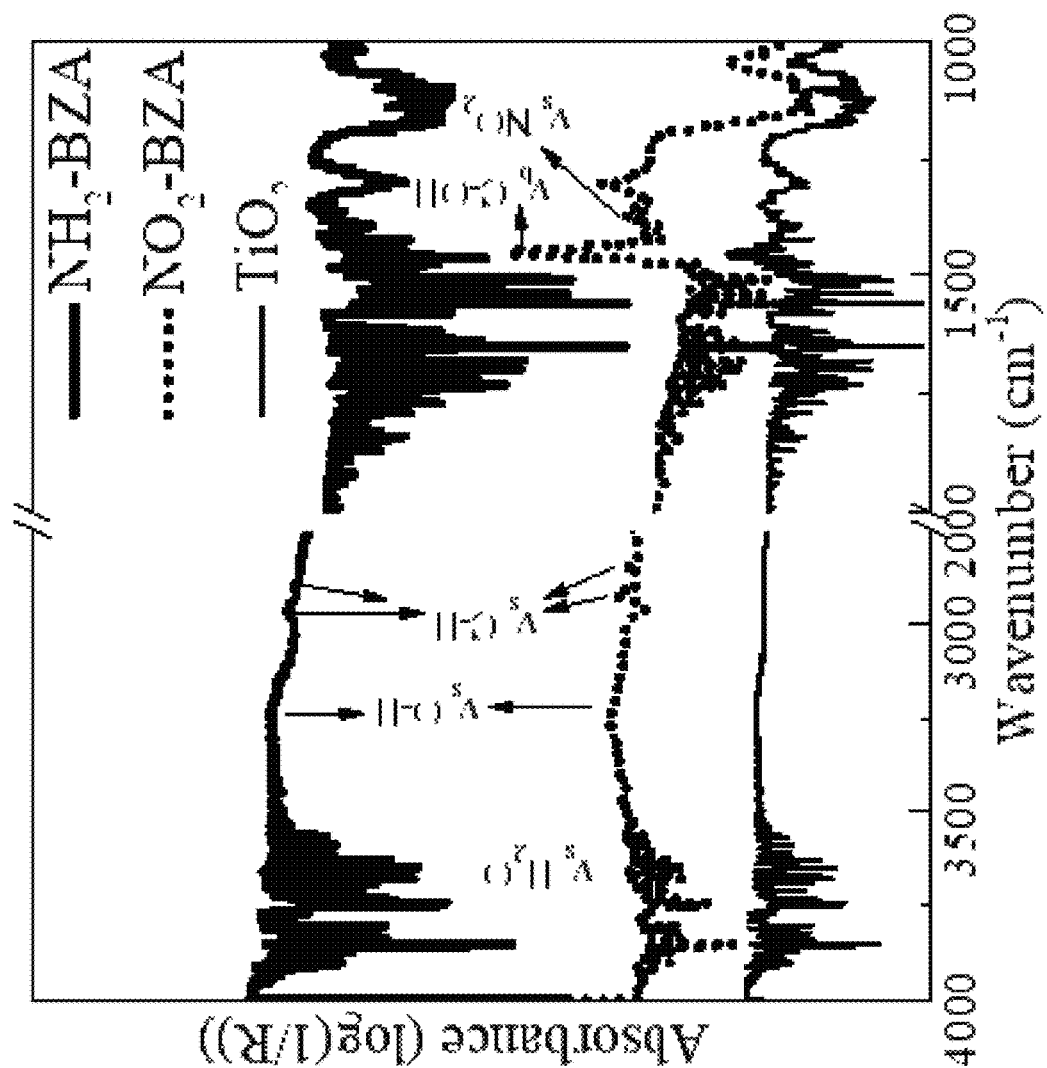
FIG. 30 depicts the FTIR spectra for the surface modified $TiO_2$ films.

In order to understand the effect of the external dipole moment on the TM hybridization in a solid host, the as-prepared TiO$_2$:Ni films were functionalized with p-substituted benzoic acid ligands via carboxylic acid chemistry (Goh, et al., Appl. Phys. 2007, 101, 114503). These carboxylic acids bridge to the surface of TiO$_2$ in a bidentate fashion resulting in a dipole moment normal to the surface, changing the electron affinity of the organic (ligand)-inorganic (film) interface (Jankovic, et al., J. Phys. Chem. C 2009, 113, 12645-12652). The C—H stretches were identified with FTIR (FIG. 30) for both the ligand-bonded samples around 2800-3000 cm$^{-1}$ indicating that the organic group was bound to the surface (Sundaraganesan, et al., Spectrochim. Acta, Part A 2007, 67, 287-297). Furthermore, the NO$_2$ symmetric stretching mode was also observed at 1370 cm$^{-1}$ for NO$_2$—BZA functionalized sample (Osawa, et al., J. Phys. Chem. 1991, 95, 9914-9919).

Figure 31:
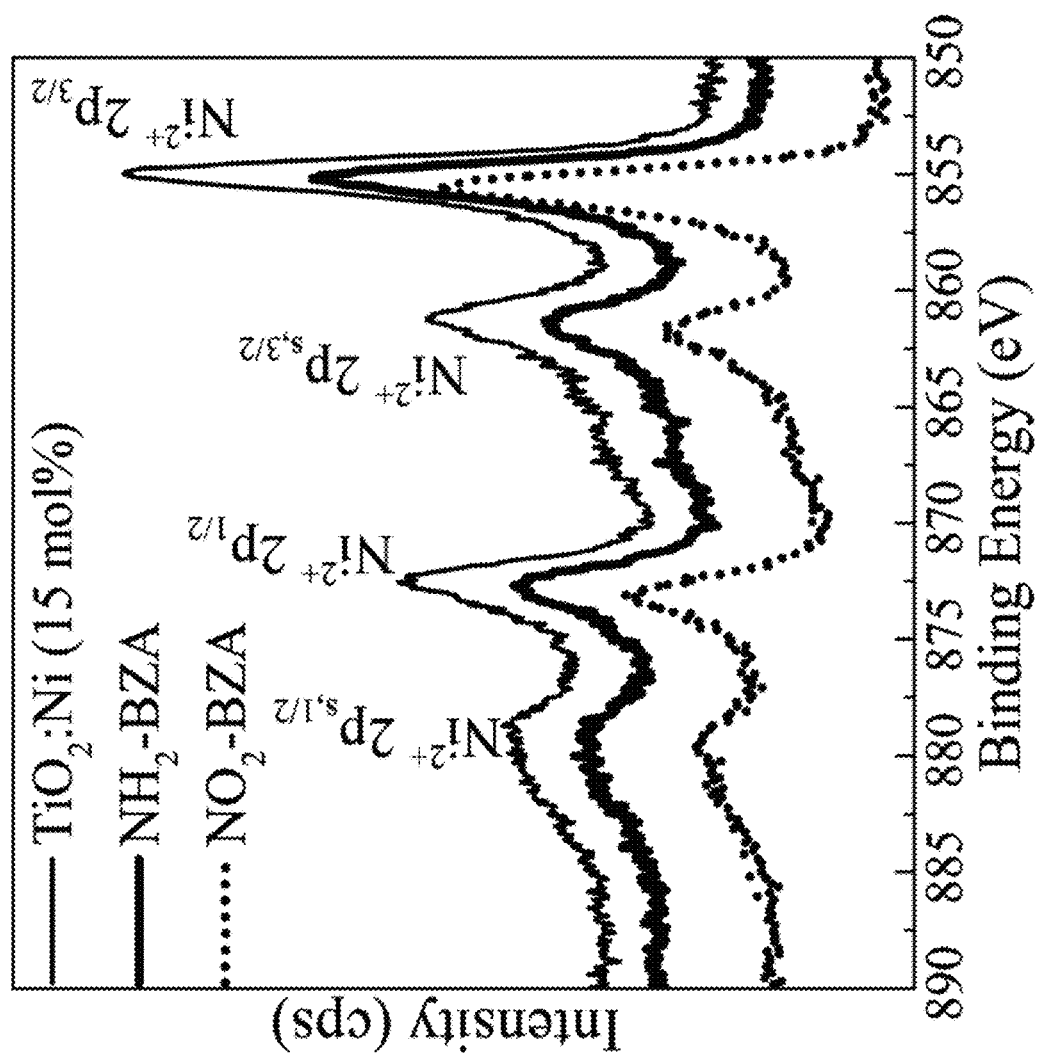
FIG. 31 depicts the XPS scans of Ni 2p in $TiO_2:Ni$ (15 mol %) film after surface modification with benzoic acid (BZA) ligand (offset).
Figure 32:
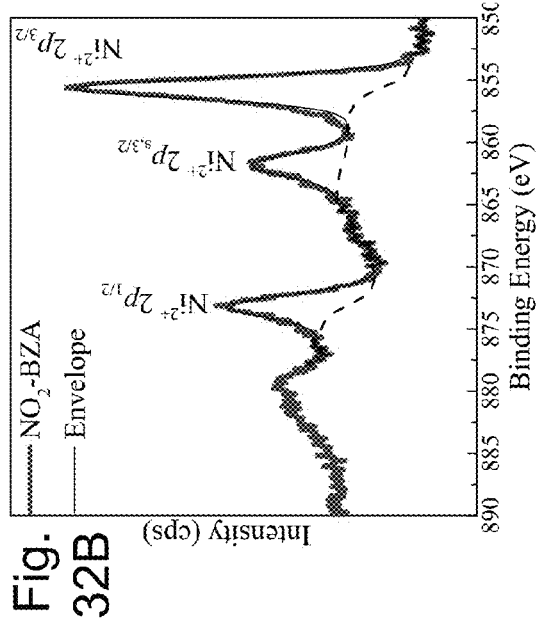
FIG. 32, comprising
Figure 32:
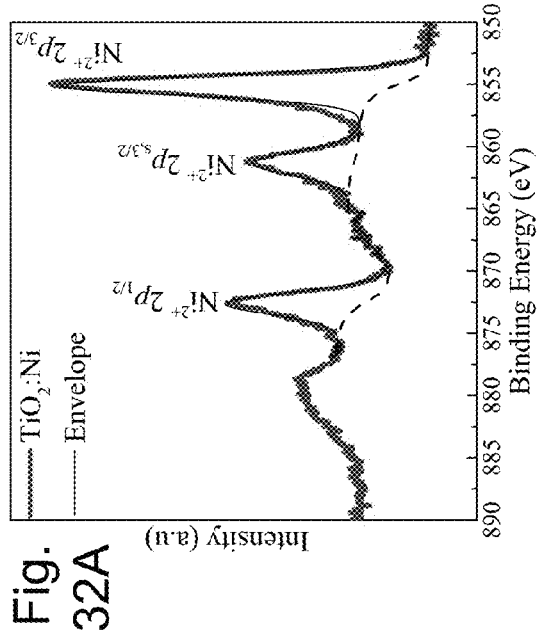
Figure 32:
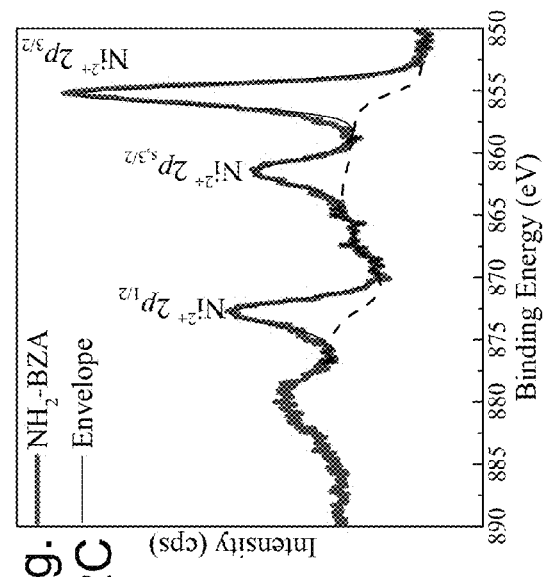

After surface modification, the Ti 2p spectra was expected to remain unchanged as the spectra is dominated by the bulk of the crystal, whereas the adsorbate dipole moment acts near the surface (Rajh, et al., J. Phys. Chem. B 2002, 106, 10543-10552). The 2p$_{3/2}$ and 2p$_{1/2}$ main peaks (FIG. 31) of Ni in TiO$_2$:Ni shifted less than half an eV, suggesting no change in the oxidation state after ligand bonding. The asymmetric 6 eV satellite peak is due to the screening of the two-hole state, core hole and 3d hole, by the wide 4s band (Grosvenor, et al., Surf. Sci. 2006, 600, 1771-1779). Furthermore, the interatomic wave function mixing of the Ni 3d states and the ligand p states influence the screening of these multiplet effects. In the present case of surface modified TiO$_2$:Ni films, the aromatic surface ligands are expected to delocalize the hole wave functions, i.e, conduction band 3d orbitals of the inorganic layer (Teunis, et al., Nanoscale 2017, 9, 14127-14138). Despite the slight changes in the 6 eV satellite peak positions of the ligand-bonded TiO$_2$:Ni films, it is hard to decipher the effect of electronegativity of the ligand on the core states of Ni 2p, due to various factors such as instrument resolution, interatomic wave function mixing (Ni 3d-O 2p) (Jana, et al., Chem. Mater. 2016, 28, 1107-1120), and atomic multiplet coupling. Ni 2p deconvoluted spectra are shown in FIG. 32 and tabulated in Table 5.

TABLE 5

Binding Energies of Ni$^{2+}$ XPS Spectra in TiO$_2$:Ni (15 mol %) films

| Thin Film | 2p$_{3/2}$ | 2p$_{s,3/2}$ | 2p$_{1/2}$ |
|---|---|---|---|
| TiO$_2$:Ni | 855.05 eV | 861.33 eV | 872.53 eV |
| NH$_2$-BZA | 855.25 eV | 861.55 eV | 872.73 eV |
| NO$_2$-BZA | 855.62 eV | 861.82 eV | 873.06 eV |

Figure 33:
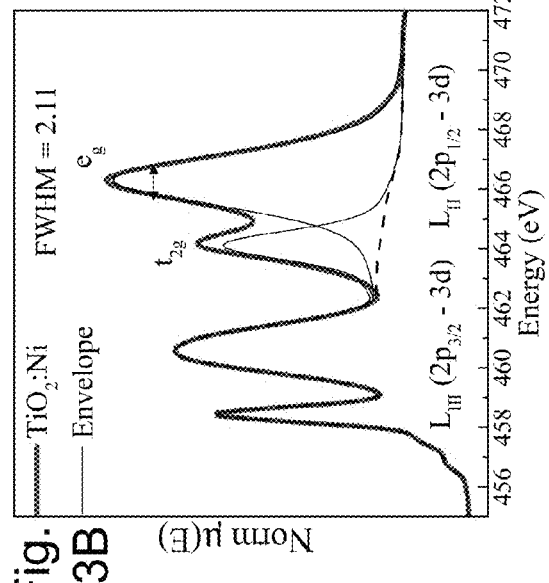
FIG. 33, comprising
Figure 33:
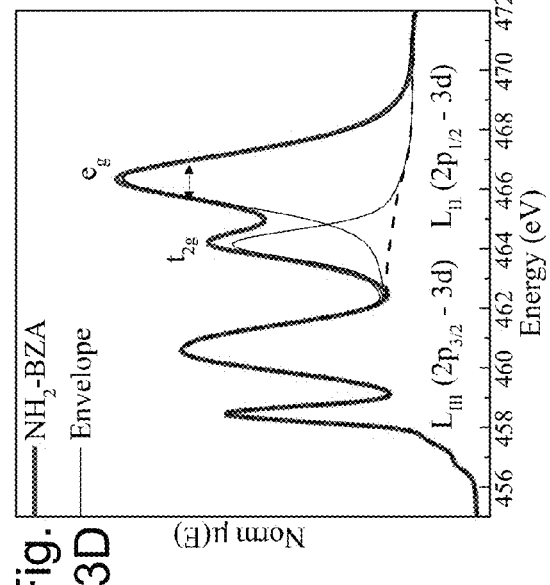
Figure 33:
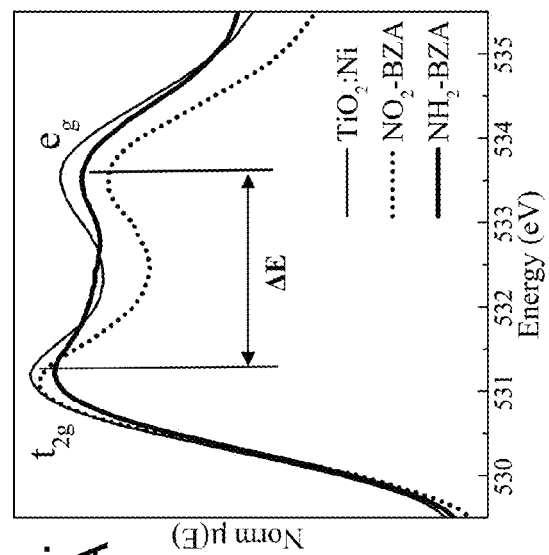
Figure 33:
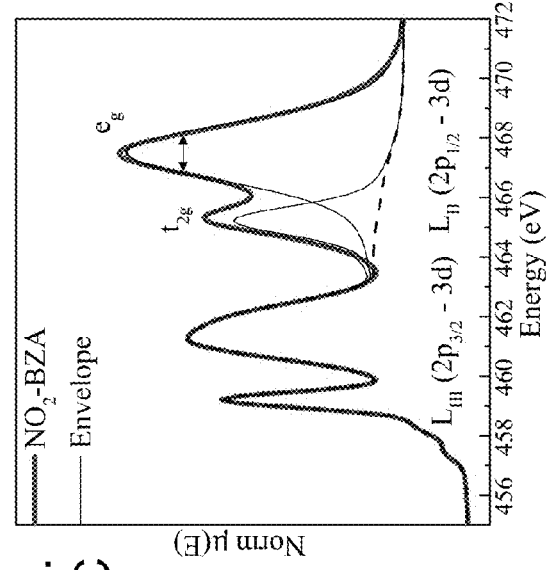

The XPS spectra of Ti 2p and O is in TiO$_2$:Ni films indicate that the formation of the new oxide phase NiTiO$_3$ has not affected the structure of TiO$_2$, suggesting that the surface of TiO$_2$:Ni film has octahedrally coordinated Ni$^{2+}$ and Ti$^{4+}$ ions. However, there is no strong evidence from XPS that suggests the perturbation of site symmetry or core level energy of these ions upon ligand bonding. Therefore, in order to understand the subtle changes in the electronic and geometric structure of the inorganic film at the hybrid interface, XANES was employed. The O K edge spectra (FIG. 10A) demonstrates the electronic transitions from O 1s to the derived states of O 2p. The t$_{2g}$ and e$_g$ splitting of the Ti 3d states hybridized with O 2p states is evident in the low energy region of TiO$_2$:Ni film, whereas the higher energy spectral features indicated the formation of Ni—O bond. The broadening of these spectral features also indicates the absence of long-range order of the local lattice (de Groot, et al., Phys. Rev. B 1989, 40, 5715), as observed in XRD. FIG. 10B shows the TEY spectrum of Ti L$_{III}$ (2p$_{3/2}$-3d, 460.8 eV) and L$_{II}$ (2p$_{1/2}$-3d, 468.4 eV) edges of pure and TiO$_2$:Ni films. The doublet of the e$_g$ band in TiO$_2$ L$_{III}$ edge is attributed to the non-degenerate d$_{z^2}$ and d$_{x^2-y^2}$, which is a signature of anatase crystal structure (Henderson, et al., Phys. Chem. Miner. 2002, 29, 32-42). This splitting dampens upon Ni doping due to the oxygen vacancies altering the Ti—O bonding environment, causing non-cubic structural distortion in TiO$_2$:Ni film (Chen, et al., Phys. Chem. Chem. Phys. 2015, 17, 22064-22071; Radtke, et al., Phys. Rev. B 2006, 74, 155117). Moreover, the onset of the absorption edge for TiO$_2$:Ni films is shifted to lower binding energies due to the presence of Ti$^{3+}$ ions as observed in Ti 2p XPS of TiO$_2$:Ni (15 mol %) films (Stoyanov, et al., Am. Mineral. 2007, 92, 577-586). After surface modification, the O K edge (FIG. 10C) and Ti L$_{III/II}$ edge (FIG. 10D) spectra for TiO$_2$:Ni films indicated a change in the crystal field splitting energy (10 Dq). The XANES spectra of Ti and O in the surface modified TiO$_2$ films did not show any difference with surface functionalization due to the weak penetration of these ligand fields. The energy splitting between the t$_{2g}$ and e$_g$ hybridization peaks in the O K edge of TiO$_2$:Ni films is proportional to the adsorbate dipole moment of the ligand (FIG. 33A) (Tsuchida, Bull. Chem. Soc. Jpn. 1938, 13, 388-400). In addition to the spectral differences in the lower energy region, the higher energy spectral features of O K edge, which correspond to the O 2p hybridization with the Ti/Ni valence levels also indicate significant differences with the ligand. The onset of the second peak in the O 1s-O 2p (4sp) region suffered a shift of about 0.1 eV from the reference TiO$_2$:Ni (15 mol %), suggesting a change in the hybridization of the O 2p orbitals with the ligand. Moreover, the broadening of these peaks for the NO$_2$—BZA bonded films, indicate the covalent nature of the metal-oxygen bond accompanied with slight geometric distortion at the hybrid interface. In the Ti L edge spectra, while the Ti L$_{III/II}$ edge peak positions are indicative of the crystal field splitting, de Groot and co-workers showed that the FWHM of the e$_g$ peak in the Ti L$_{II}$ edge is also proportional to the 10 Dq (de Groot, et al., Phys. Rev. B 1990, 41, 928-937). The deconvoluted Ti L$_{II}$ edge spectra (FIG. 33B, FIG. 33C, and FIG. 33D) show a systematic increase in the FWHM of the $e_g$ peak with an increasing ligand dipole moment. The ΔE in O K edge peak positions and FWHM of the $e_g$ peak in Ti $L_{II}$ edge are tabulated in Table 6.

TABLE 6

ΔE of O K edge and FWHM of $e_g$ peak in Ti $L_{II}$ edge for surface modified TiO$_2$:Ni (15 mol %) films, indicating the crystal field splitting shifts as a function of the surface dipole moment.

| Thin Film | ΔE (eV) | FWHM $e_g$ ($L_{II}$ Edge) |
|---|---|---|
| TiO$_2$:Ni | 2.36 | 2.11 |
| NH$_2$-BZA | 2.28 | 2.01 |
| NO$_2$-BZA | 2.44 | 2.35 |

Figure 34:
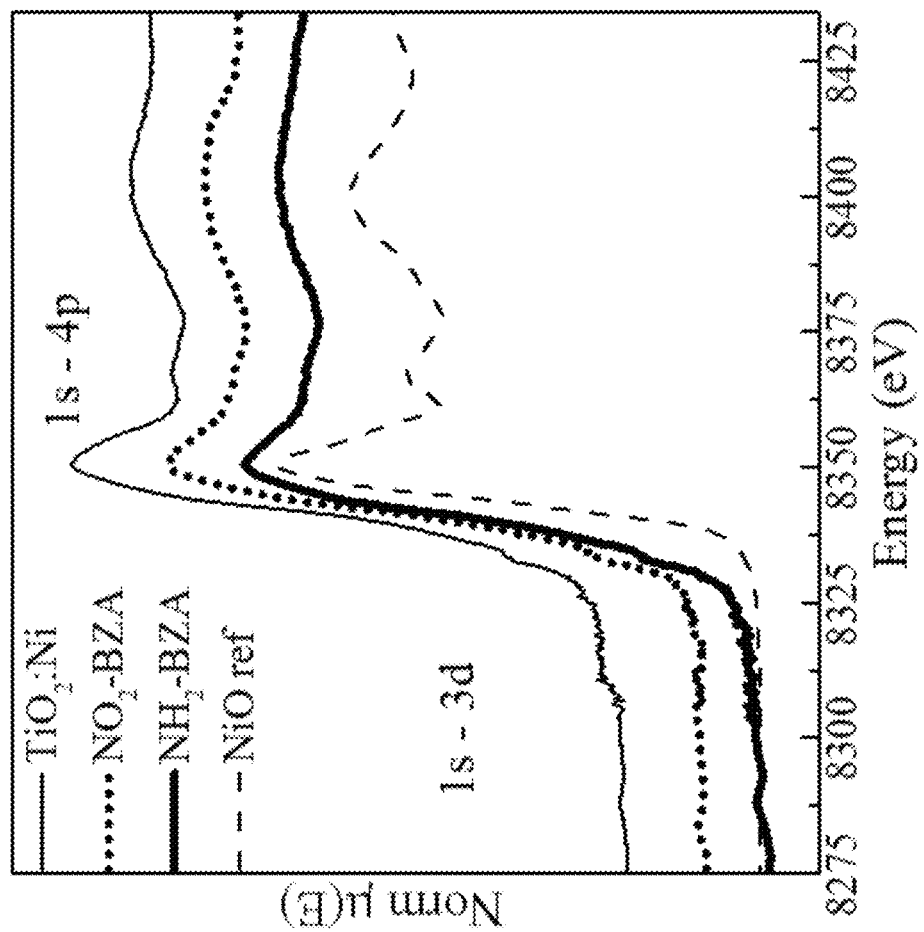
FIG. 34 depicts a Ni K Edge XANES of ligand bonded $TiO_2:Ni$ films. Ni K edge was measured in the HEXAS beam line in fluorescence mode with a Ge (111) crystal as monochromator. Be crystal was employed as the detector at a distance of 8 cm from the sample. The data was calibrated to K edge of NiO powder.

To acquire the fingerprint analysis on the 3d electronic states of Ni which are influenced by surface ligands, XANES spectra for Ni K and $L_{III/II}$ edges in the TiO$_2$:Ni film were collected. The K edge XANES spectra was compared with standard NiO reference powder (FIG. 34) to identify the oxidation state of Ni as 2+ in TiO$_2$:Ni film. The Ni $L_{III/II}$ edge spectra (FIG. 35A) for ligand bonded TiO$_2$:Ni films are split into $L_{III}$ and $L_{II}$ edges due to 2p spin-orbit coupling. The two peaks in $L_{II}$ edge correspond to the 3d states ($t_{2g}$, $e_g$) of Ni$^{2+}$ ion bonded to O$^{2-}$ in $O_h$ symmetry (Radtke, et al., Phys. Rev. B 2006, 74, 155117; Matsuo, et al., Anal. Sci. 2001, 17, 149-153). A clear shift is observed in the $L_{II}$ edge $t_{2g}/e_g$ peak intensities as a function of the adsorbate dipole moment. This difference is attributed to the change in the Ni $e_g$-O p hybridization with the ligands (de Groot, et al., Phys. Rev. B 1990, 41, 928-937; Guo, et al., Phys. Chem. Chem. Phys. 2016, 18, 3250-3259). The well-resolved multiplet structure on the $L_{III}$ and $L_{II}$ edges of NH$_2$—BZA bonded films compared to that of NO$_2$—BZA films suggest the ionic nature of the Ni-bond (Wang, et al., J. Am. Chem. Soc. 2000, 122, 10544-10552), which is attributed to the weaker metal-oxygen orbital overlap.

Figure 35:
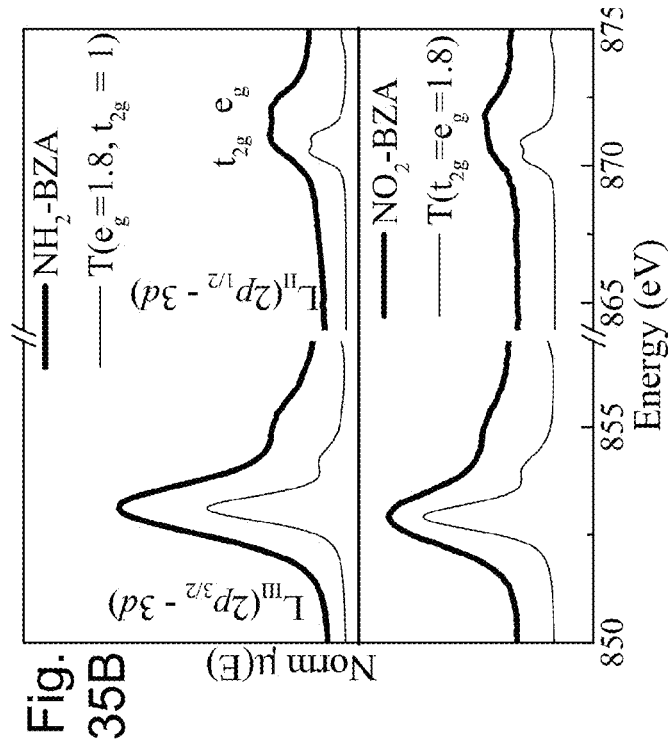
FIG. 35, comprising
Figure 35:
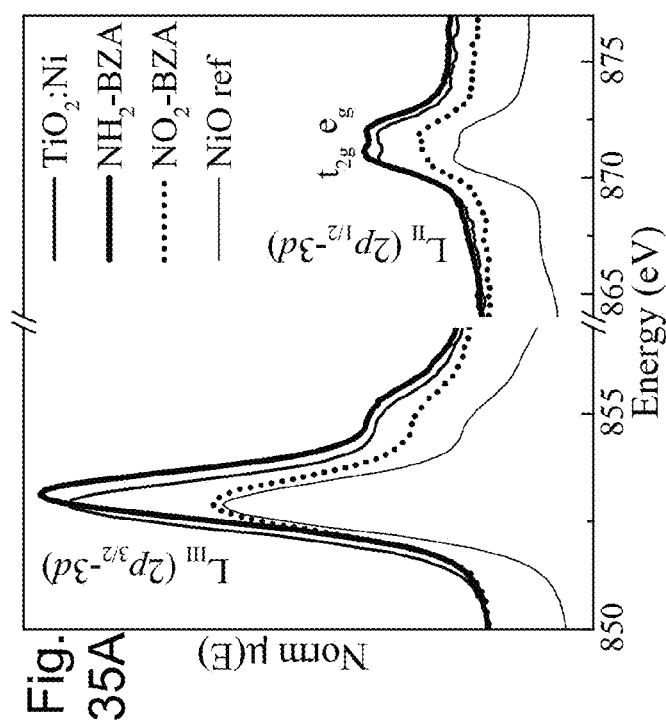
Figure 35:
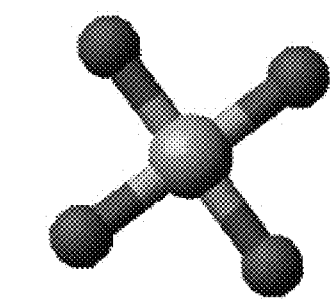
Figure 35:
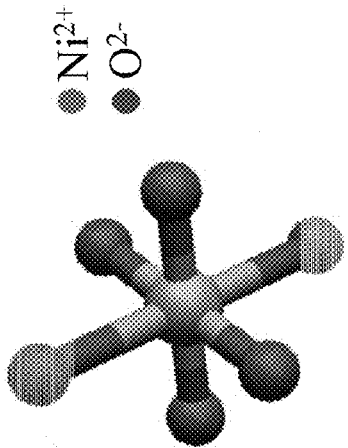
Figure 35:
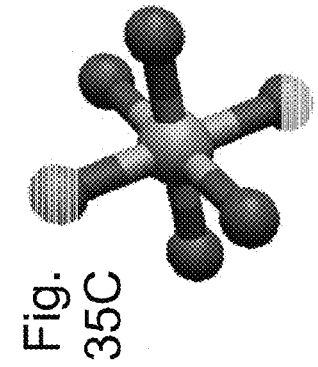

The $L_{III/II}$ edge XANES spectra of Ni$^{2+}$ in TiO$_2$:Ni was simulated using a ligand field dependent simulation software, CTM4XAS (Stavitski, et al., Micron 2010, 41, 687-694; de Groot, et al., Phys. Rev. B 1990, 42, 5459). These structures have been modeled in past with distorted symmetries ($D_{3d}/D_{2d}$) demonstrating no difference with the $O_h$ symmetry. The key parameters involved in these calculations are ligand field parameter (10 Dq), charge transfer energy (Δ), Hubbard core-hole potentials ($U_{pp}$, $U_{pd}$), slater integrals ($F_{pp}$, $F_{pd}$), and the hopping parameters (($T(t_{2g})$, $T(e_g)$)). The values for these parameters were obtained from previous calculations and are summarized in Table 7. The value of 10 Dq used in these calculations was obtained from the UV-Vis absorption spectra. Furthermore, it was observed that changing the value of 10 Dq does not simulate the experimentally observed variation in Ni $L_{II}$ edge ($t_{2g}/e_g$) branching ratio. Therefore, to understand the effect of electronegative/electropositive ligand on the hybridization of the Ni$^{2+}$ 3d states, all the parameters except the hopping parameters were based on literature. The Ni $L_{III/II}$ edge spectra of NH$_2$—BZA bonded TiO$_2$:Ni film (FIG. 35B) was modeled using standard hopping parameters ($T(e_g)$=1.8, $T(t_{2g})$=1) in $O_h$ environment (de Groot, Coord. Chem. Rev. 2005, 249, 31-63). Simulations show that shift in the onset of the absorption edge in NH$_2$—BZA bonded TiO$_2$:Ni films to higher energies is due to the spin exchange interactions. The Coulomb (U) and charge transfer energies (Δ) increase for electron donating ligands (NH$_2$—BZA) bonded TiO$_2$:Ni. This is attributed to an electron addition to the high-spin Ni$^{2+}$ 3d$^8$ state requiring additional spin exchange stabilization energy, pushing the leading absorption edge to higher energies (Qiao, et al., Curr. Appl. Phys. 2013, 13, 544-548). On the other hand, for NO$_2$—BZA bonded films, the simulated spectra matched the experimental results by considering strong ligand character in the ground state 3d$^8$L orbitals. This is done by setting the values of the hopping parameters of $t_{2g}$ and $e_g$ equal to 1.8, indicating strong mixing between the $t_{2g}$, $e_g$ orbitals (Stavitski, et al., Micron 2010, 41, 687-694; de Groot, et al., Phys. Rev. B 1990, 42, 5459; de Groot, Coord. Chem. Rev. 2005, 249, 31-63). Furthermore, these non-standard values of hopping parameters suggest geometric distortion at the interface, i.e. the transformation of an octahedron (FIG. 35C, left) into a low symmetry structure such as square planar, as shown in FIG. 35C, middle. From an experimental standpoint, the mixing of the $t_{2g}$ and $e_g$ energy levels in NO$_2$—BZA bonded films can be attributed to the strong covalent nature of the Ni—O bond. Additionally, the increased intensity of the $e_g$ peak in NO$_2$—BZA bonded films corresponds to the reduced electron density in the Ni 3d states. Both of these effects were observed in the O K edge spectra of the NO$_2$—BZA bonded films (FIG. 10C). However, as the model suggests, the transformation of an octahedron to square planar structure involves distinct structural changes accompanied by oxygen vacancies (Wu, et al., J. Phys. Chem. C 2012, 116, 7219-7226), which was not observed with the other characterization techniques. Therefore, the observed branching ratio in NO$_2$—BZA bonded TiO$_2$:Ni film can be interpreted as a slight breaking of the $O_h$ symmetry due to the elongation along the axial ($e_g$ orbital) direction of the Ni atom as shown in FIG. 35C, right.

TABLE 7

Values of Variables in the CTM4XAS Calculation

| Parameters | Symbol | Value |
|---|---|---|
| Slater Integrals | Fpd, Fdd, Gpd | 0.8, 0.8, 0.8 |
| Symmetry | $O_h$ | $O_h$ |
| Crystal Field Splitting | 10 Dq | 1.1 eV |
| Spin Orbital Coupling | SO coupling reduction | 1 |
| Charge Transfer | Δ | 3 eV |
| Hubbard Potentials | Udd, Upd | 6, 8 eV |
| Hopping Parameters | $T(e_g)$, $T(t_{2g})$ | 1.8, 1; 1.8, 1.8 |

Figure 36:
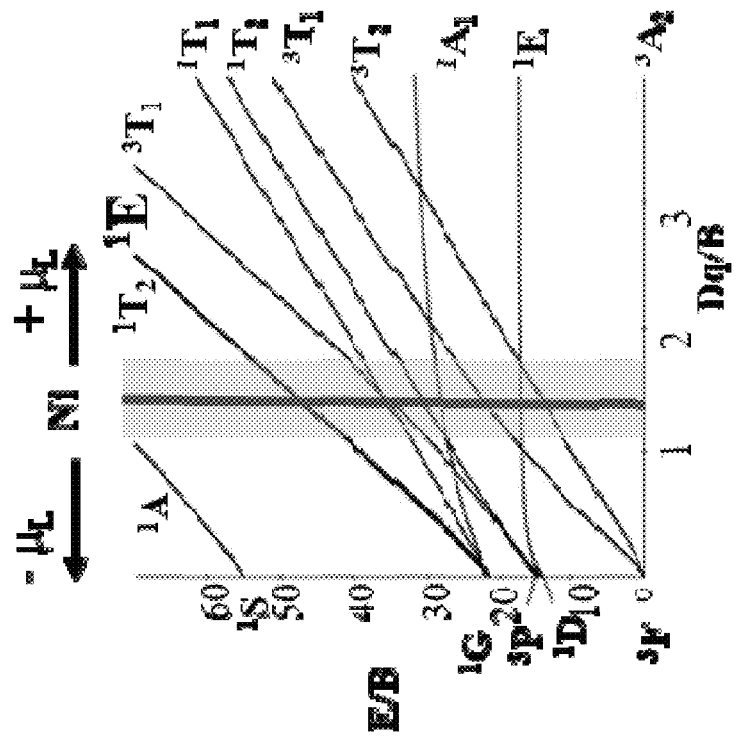
FIG. 36, comprising
Figure 36:
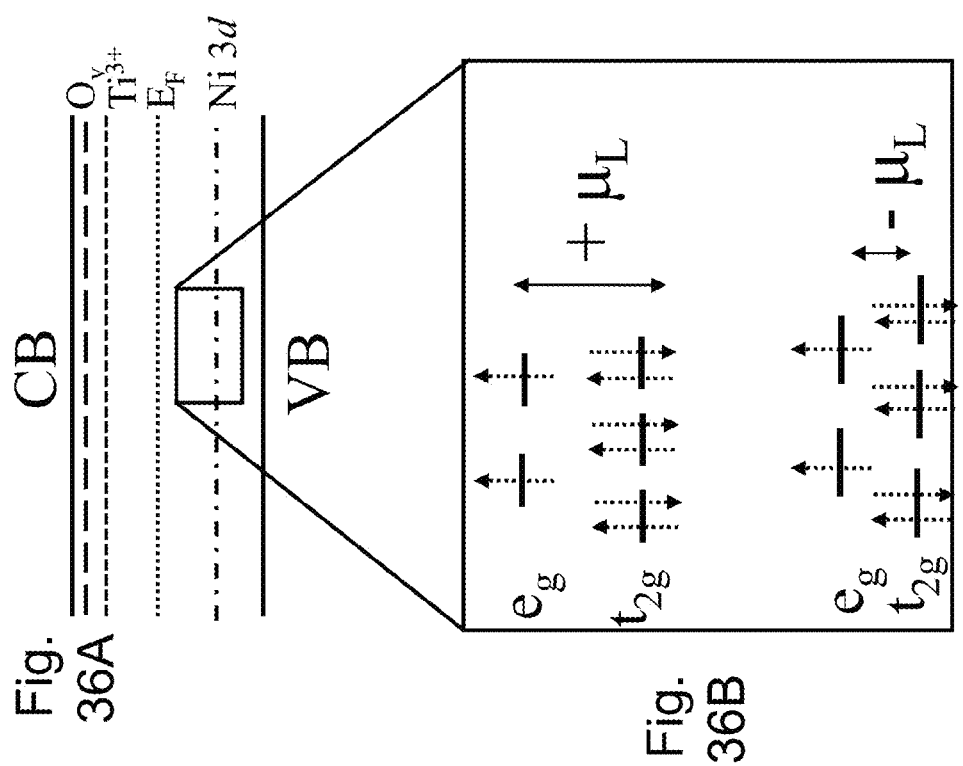

The interplay between the surface dipole, electronic states, p-d hybridization, and the crystal field splitting energy of Ni$^{2+}$ 3d orbitals is illustrated in FIG. 36. The electronic structure of TiO$_2$:Ni (FIG. 36A) shows the formation of interband gap Ni 3d states, which resulted in lowering of the Fermi energy (Matsumoto, et al., J. Ceram. Soc. Jpn. 2010, 118, 993-996). The energy of these interband gap Ni 3d states is manipulated by the ligand due to hybridization (FIG. 36B) with the neighboring O atoms resulting in a shift in orbitals energy proportional to the crystal field splitting. This ability to tune the local crystal field allows for control of the optical states via the modified hybridization of TM $e_g$ orbitals as shown in FIG. 36C. Unfortunately, the shift was not detectable in the UV-Vis measurements due to the weak absorption of the thin, non-conformal films. However, the surface sensitive XAS measurements identified the change in the electron density in the valence 3d states of Ni$^{2+}$ with the ligand. Effectively, the surface dipole manipulates the energy of Ni 3d more than bulk Ti 3d orbitals, impacting the electron density in those orbitals. In particular, the $e_g$ orbitals, which are pointed towards X, Y, and Z axes (de Groot, et al., *Phys. Rev. B* 1990, 41, 928-937) overlap with the p orbitals of the neighboring O atoms, wherein the strength of the hybridization is determined by the nature of the dipole. As seen with the XAS spectra, the change in the hybridization of the Ni—O bond in $TiO_2$:Ni film is quantified by the shift in the Ni $L_{II}$ edge branching ratio ($t_{2g}/e_g$), FWHM of the $e_g$ peak in the Ti $L_{II}$ edge, and the $\Delta E$ of the O K edge. This congruency among the valence level spectra of all the elements reinforces the fact that the electronic structure of TM dopant in a solid host is a function of the dipole moment of the surface ligand.

In summary, $TiO_2$:Ni films were spin-coated on Si (100) substrates using sol-gel chemistry. Initial structural and optical characterization results confirmed the crystal structure and crystal field splitting energy. The crystalline nature of the $TiO_2$:Ni (15 mol %) film was locally determined using HRTEM to identify the presence of $TiO_2$:Ni and $NiTiO_3$ phases. Furthermore, spatial mapping of these films using EELS confirmed those two phases. Surface functionalization of these inorganic films was performed with weak benzoic ligands via carboxylic acid chemistry to apply a weak external field in the form of a dipole moment. The surface dipoles were observed to show no effect on the pure $TiO_2$ films owing to the bulk-like characteristics of the elements present in the film. The influence of the surface dipole on core and valence electronic states of the TM dopant in $TiO_2$:$Ni^{2+}$ was systematically investigated by surface sensitive characterization techniques such as XPS and XAS. The results from these characterization methods point to the change in the ligand character of the Ni 3d orbitals. It is implicitly proven that the overlap between the Ni 3d orbitals and O 2p orbitals is a function of the dipole strength of the surface ligand. This ability to control the hybridization of TM ion in a solid host via weak external fields can be utilized to engineer the optical and magnetic responses in a device. Specifically, the adaptive optical properties of TM doped solids can be coupled with the steady rare earth emissions in inorganic phosphors to obtain dynamic luminescence and thereby, minimize the usage of multiple rare earth doped Red-Green-Blue (RGB) phosphors. Furthermore, these hybrid luminescent materials due to their tunable properties will have potential applications in flexible electronics, biosensors, and solar cells.

Example 5

Effect of Moisture on Dopant Segregation in Solid Hosts $TiO_2$ is one of the most extensively studied compounds for a myriad of applications such as photocatalysis (Peng, et al., Advanced Powder Technology 2012, 23, (1), 8-12; Schneider, et al., Chemical reviews 2014, 114, (19), 9919-9986), solar cells (Park, et al., The Journal of Physical Chemistry B 2000, 104, (38), 8989-8994; Frank, et al., Coordination Chemistry Reviews 2004, 248, (13-14), 1165-1179), and electrochemistry (Ding, et al., RSC Advances 2015, 5, (116), 95478-95487; Liu, et al., International Journal of Hydrogen Energy 2015, 40, (5), 2107-2114), owing to its non-toxicity (Hafizah, et al., International Journal of Photoenergy 2009, 2009), oxidation power (Su, et al., Applied Catalysis B: Environmental 2008, 77, (3-4), 264-271), chemical stability (Inturi, et al., The Journal of Physical Chemistry C 2013, 118, (1), 231-242), and resistance to corrosion (Bharti, et al., Scientific reports 2016, 6, 32355; Macak, et al., small 2007, 3, (2), 300-304). The relatively high band gap of $TiO_2$, about 3.2 eV (Scanlon, et al., Nature materials 2013, 12, (9), 798), unfortunately, limits its photocatalytic/photovoltaic effect to the UV region, which constitutes only 5% of the solar spectrum (Qin, et al., Chemical communications 2010, 46, (13), 2304-2306). Additionally, the fast recombination rate of photo-generated electrons and holes[4] also reduce the photonic efficiency of $TiO_2$. Therefore, in order to extend the optical absorption of $TiO_2$ from the UV to the visible region (Pelaez, et al., Catalysis Today 2009, 144, (1), 19-25; Asahi, et al., Science 2001, 293, (5528), 269-271; Ren, et al., Applied Catalysis B: Environmental 2007, 69, (3-4), 138-144), while simultaneously improving the photocatalytic performance, various methods such as chemical doping (Liu, et al., International Journal of Hydrogen Energy 2015, 40, (5), 2107-2114; Li, et al., Physical Chemistry Chemical Physics 2013, 15, (46), 20037-20045), dye sensitization (Pan, et al., Journal of the American Chemical Society 2011, 133, (26), 10000-10002; Ni, et al., Renewable and Sustainable Energy Reviews 2007, 11, (3), 401-425), and narrow gap semiconductor coupling (Liu, et al., international journal of hydrogen energy 2011, 36, (1), 167-174; Chen, et al., Chemical reviews 2007, 107, (7), 2891-2959) have been employed to modify the electronic structure. Among all of these, doping with metals, in particular transition metal (TM) elements, has received great attention due to the effective narrowing of the band gap. The band gap is narrowed in these homogeneous TM doped $TiO_2$ materials by the formation of interband gap states that can also act as trapping sites for preventing the carrier combination of photo-generated charge carriers (Wang, et al., Nanoscale 2012, 4, (21), 6682-6691).

While there have been many studies that have focused on optimizing the doping concentration to yield select photophysical responses (Rodrigues, et al., Eclética Química 2011, 36, (1), 18-36), the positioning of the dopant (substitution vs. interstitial, surface vs. bulk) in the host lattice still remains a synthetic challenge. The spatial distribution of the dopants, which is often not emphasized in literature (Xie, et al., Journal of Power Sources 2013, 224, 168-173; Kumar, et al., Thin Solid Films 2016, 619, 144-147), is an important parameter that determines the physical, chemical, optoelectronic, and magnetic properties of the TM doped $TiO_2$. There have been few studies exploring this argument; for example, the visible light photocatalytic activity of N doped $TiO_2$ (Peng, et al., Journal of Solid State Chemistry 2008, 181, (1), 130-136) and charge carrier concentration in CdSe nanocrystals (Sahu, et al., Nano letters 2012, 12, (5), 2587-2594) are two instances where the properties of the material are sensitive to the dopant position in the host lattice. Additionally, in all of the above mentioned literature reports, the homogeneous distribution of dopants in the host $TiO_2$ lattice is validated based on bulk characterization methods such as XRD, UV-Vis, and EDX that are insensitive to the local dopant environment in the host lattice (Navas, et al., Physical Chemistry Chemical Physics 2014, 16, (8), 3835-3845; Karlsson, et al., Toxicology letters 2009, 188, (2), 112-118; Tripathi, et al., Adv Mater Lett 2015, 6, 20). Furthermore, the resultant optoelectronic properties in those doped solids are elucidated based on the electronic band structure for the case of where $TiO_2$ is homogeneously doped. However, these discussions do not address the issues of dopant segregation in the host lattice and its impact on the derived properties. At high doping concentrations, beyond the solubility limit of the dopant in the host lattice, the formation of metallic/metal oxide clusters is expected (Mesilov, et al., The Journal of Physical Chemistry C 2017, 121, (43), 24235-24244). Additionally, the location of these dopant/ dopant oxide clusters, including their surface adsorbates (hydroxyls), determine the catalytic properties of the system.

In the present work, $Ni^{2+}$ doped $TiO_2$ nanoparticles (NPs), with doping concentration upto 15 mol %, were synthesized via sol-gel chemistry. The high dopant concentration provides more catalytically active sites for solar-driven applications. Secondary processing conditions of the sol, such as drying and annealing, were observed to influence the segregation of NiO clusters in $TiO_2$, altering the resulting optoelectronic properties. The bulk crystal structures of $TiO_2$:Ni (15 mol %) NPs were identified from XRD and the evolving local environment around the dopant was probed via HRTEM images coupled with elemental chemical mapping. The aging of the dried $TiO_2$:Ni (15 mol %) powders was observed to be a moisture sensitive phenomenon, which was studied using time resolved UV-Vis and FTIR spectroscopy measurements. TGA-DSC studies were performed on the aged and non-aged $TiO_2$:Ni (15 mol %) dried powders to elucidate the dopant segregation mechanism in the aged powders. Furthermore, in order to control the NiO cluster formation in the host $TiO_2$ matrix, rapid annealing was performed on $TiO_2$:Ni (15 mol %) dried powders. The doped system was frozen into metastable excited states by quenching, and as a result, the dopants are locked in the host lattice sites. Similar trend of dopant segregation was observed with other first row TM ($Co^{2+}$) doped $TiO_2$ powders upon slow annealing. This work extends our previous X-ray local structure studies on 40 nm thick $TiO_2$:Ni films (Darapaneni, et al., The Journal of Physical Chemistry C 2018) into another diminished dimension of nanoparticles (~20 nm dia), allowing for better understanding of the fundamental processes such as dopant incorporation and segregation in host matrices, to establish the structure-processing-property relationship. This ability to incorporate higher dopant concentrations while controlling the dopant position in host lattice can be utilized to engineer the dopant effects in the host, which will assist in the development of solar cells, photocatalytic devices, etc. with improved optoelectronic properties and photoconversion efficiencies.

Materials and Methods Titanium (IV) Isopropoxide (TTIP, Acros Organics, >98%), nickel (II) chloride hexahydrate ($NiCl_2.6H_2O$, BTC, >99%), cobalt (II) chloride tetrahydrate ($CoCl_2.4H_2O$, Sigma Aldrich), hydrochloric acid (HCl, 36-38.5% purity, ACS grade), reagent alcohol (<0.075% VWR Analytical) were obtained commercially. All the materials were used without further purification.

Ni Nanoparticles (NPs): $TiO_2$:Ni (15 mol %) NPs were synthesized by employing the facile sol-gel chemistry (Yu, et al., Scientific reports 2015, 5, 9561). The sol was prepared by dissolving 207 mg of $NiCl_2.6H_2O$ in 5 mL of ethanol and then adding 1.5 mL of TTIP dropwise under vigorous stirring. Homogeneous $TiO_2$:Ni sol was obtained after 3-4 h of continuous stirring. HCl (125 µL) was used as a catalyst in this process to control the rapid hydrolysis of TTIP precursor. The doping concentration of Ni precursor to TTIP was varied from 0 to 15 mol %. The prepared sol was aged for 24 h before drying it in air for 10 h. These dried powders were further aged in air for 0-48 h to systematically study the effect of moisture on the dried $TiO_2$:Ni (15 mol %) powders. Similarly, $TiO_2$:Co (15 mol %) NPs were synthesized with $CoCl_2.4H_2O$ as precursor. Pure $TiO_2$ NPs were prepared in the same method without the addition of Ni/Co precursor. All the dried powders were annealed in air at 450° C. for 2 h to form crystalline powders.

Abberation corrected STEM images were obtained using the 100 kV Nion-UltraSTEM 100 (U100) electron microscope equipped with third generation $C_3/C_5$ aberration corrector, Gatan Enfina electron energy loss spectrometer (EELS), and a cold FEG source. The crystal structure was identified by performing Powder X-ray Diffraction (XRD) using PANalytical X-ray diffractometer operating at 45 kV and 40 mA. The θ-2θ radial scan was performed over the range 5-70° with a step size of 0.03° and dwell time of 60 s, using Cu $K_{\alpha 1}$ (λ=1.54 Å) as radiation source. Thermogravimetric analysis (TGA) was performed with a TA SDT Q600 DSC-TGA under air flow to understand the crystallization process of dried $TiO_2$:Ni powders. The temperature was programmed from 25 to 450° C. at 4° C./min, held 120 min, and then cooled to room temperature at the same rate of 4° C./min.

The absorption spectra of $TiO_2$:Ni NPs was recorded using a Perkin-Elmer Lambda 900 UV/Vis/NIR spectrometer equipped with an integrating sphere and a center-mounted sample holder. The absorption scans ranging from 300 to 1300 nm with a scan rate of 1 nm/s were obtained on the NPs dried on the glass substrates. The change in monochromators was set to occur at 900 nm. Fourier-transform infrared (FTIR) spectroscopy was performed on these $TiO_2$:Ni NPs using DRIFTS mode of measurement in a Thermo Scientific Nicolet 380 FTIR with a DTGS detector. The data was collected in Kubelka-Munk (f(R)) mode, with air as background, 30 min of $N_2$ purge, and resolution being 4 $cm^{-1}$ in the region going from 4000 to 1000 $cm^{-1}$.

The Results of the Experiments Will Now be Discussed $TiO_2$:Ni (15 mol %) NPs were prepared by drying the aged sol followed by annealing at 450° C. for 2 h in air. These NPs are spherical in shape with 20 nm average diameter. The XRD patterns of the annealed $TiO_2$:Ni (15 mol %) NPs are shown in FIG. 14A. A clear difference with respect to the formation of NiO was observed with the aging time of the dried NPs prior to annealing. $TiO_2$:Ni (15 mol %) NPs that are annealed directly after drying exhibited a doped anatase phase while the aged powders after drying resulted in the formation of segregated NiO phase. However, the detailed XRD scan of the non-aged and annealed $TiO_2$:Ni (15 mol %) NPs (inset of FIG. 14A), shows the presence of small NiO peak. It can be inferred that the formation of NiO clusters in $TiO_2$ is inevitable with high doping concentrations, i.e., 15 mol %, which exceeds the critical doping concentration of 10 mol % (Vakhitov, et al., Journal of Physics: Conference Series, 2014; IOP Publishing: 2014; p 012048; Chou, et al., Applied Energy 2014, 118, 12-21; Bilecka, et al., The Journal of Physical Chemistry C 2011, 115, (5), 1484-1495). In addition, the intensities of the XRD peaks for both the NP samples suggests that the size of these segregated NiO clusters is a function of the aging time. Therefore, to differentiate the effect of these two parameters, concentration and aging time, on NiO segregation, control experiments were performed on 5 and 10 mol % Ni doped $TiO_2$ NPs. Detailed XRD scans were taken on the $TiO_2$:Ni (5 and 10 mol %) NPs which were aged and non-aged prior to annealing. The non-aged powders show no traces of NiO clusters whereas the aged 10 mol % powder exhibit small NiO peak. With these experiments, it is evident that aged $TiO_2$:Ni powders form NiO clusters upon annealing, due to the interaction of the dopant (Ni) in $TiO_2$ organic matrix with atmospheric moisture. Furthermore, the UV-Vis absorption measurements were performed on these aged and non-aged annealed NPs to corroborate the XRD observations and identify the Ni coordination in the $TiO_2$ matrix. The spin forbidden transitions such as $^3A_{2g}$-$^1T_{1g}$ (G) and $^3A_{2g}$-$^1E$ (D) are intense in NiO NPs due to the spin-orbit coupling and antiferromagnetic order in bulk NiO.[41] Similarly, the $TiO_2$:Ni NPs with NiO segregation showed distinct peaks attributed to spin forbidden $^3A_{2g}$-$^1E$ (D) transitions while the non-NiO segregated TiO$_2$:Ni NPs exhibited broad peaks of spin-allowed transitions (Brik, et al., ECS Journal of Solid State Science and Technology 2016, 5, (1), R3067-R3077).

To better understand the local structural differences with respect to the NiO formation in the aged versus non-aged TiO$_2$:Ni (15 mol %) powders, spatially resolved bright-field and dark-field HRTEM images were taken. The lattice fringe spacings extracted for the aged and annealed TiO$_2$:Ni (15 mol %) NPs indicate two regions: TiO$_2$ and NiO. The dopant is observed to segregate as large NiO cubic clusters without forming a doped TiO$_2$ phase. The corresponding EELS spectra in those regions also indicates the absence of Ni/Ti peaks in the TiO$_2$/NiO rich region. Similarly, the non-aged and annealed TiO$_2$:Ni (15 mol %) NPs also exhibit two regions in the bright-field images: TiO$_2$ and NiO as shown in FIG. 14B. The lattice planes for anatase TiO$_2$ were observed to be the dominant group in the sample with smaller clusters of NiO. Moreover, the EELS spectra on these non-aged and annealed NPs suggest the presence of Ni in both TiO$_2$ and NiO phases. These results further confirm that the formation of large NiO clusters in aged TiO$_2$:Ni (15 mol %) NPs is due to the strong interaction of the atmospheric moisture with the dopant (Ni) in the TiO$_2$ organic matrix.

To investigate the effect of atmospheric moisture on air exposed TiO$_2$:Ni (15 mol %) dried powders, Fourier Transform Infrared Spectroscopy (FTIR) was performed. FIG. 15A shows the FTIR spectra of the aged and the non-aged TiO$_2$:Ni (15 mol %) powders after drying. The O—H stretches for the terminally bound and bridged hydroxyl groups were present in the 3300-3700 cm$^{-1}$ region (Finnie, et al., Langmuir 2001, 17, (3), 816-820). The peak at higher wavenumbers, around 3540 cm$^{-1}$, corresponds to the terminally bound OH species, which often hydrogen bond with the adsorbed water molecules. A sharp increase in this peak was observed for the aged TiO$_2$:Ni (15 mol %) powders, and is attributed to physisorbed water molecules upon atmospheric moisture exposure (Anpo, et al., Environmentally benign photocatalysts: applications of titanium oxide-based materials. ed.; Springer Science & Business Media: 2010). For the pristine dried powders, distinct peaks corresponding to the C—H alkane stretches (2930 and 2970 cm$^{-1}$), C—O stretching bands (1130 cm$^{-1}$) and CH$_2$ bending bands (1130 cm$^{-1}$ and 1380 cm$^{-1}$) were identified (Kratochwil, et al., Journal of electron spectroscopy and related phenomena 1993, 64, 609-617; Rasko, et al., Applied Catalysis A: General 2004, 269, (1-2), 13-25; Dobson, et al., Spectrochimica Acta Part A: Molecular and Biomolecular Spectroscopy 1999, 55, (7-8), 1395-1405). However, all of these peaks diminished in intensity after aging for 48 h in air. While there are many ethoxide and ethanol groups adsorbed on the surface of dried TiO$_2$, it has been shown that the ethoxy group is destabilized in the presence of water and leaves the metal oxide surface as ethanol. Therefore, the dampening of the C—H peaks after aging in air is attributed to the desorption of the ethoxy group in the presence of moisture. Additionally, the Ti—O—C peak at 1040 cm$^{-1}$, which corresponds to the unhydrolyzed alkoxide species also disappeared for aged samples, suggesting a change in the organic framework upon aging (Pillai, et al., The Journal of Physical Chemistry C 2007, 111, (4), 1605-1611; Zywitzki, et al., Journal of Materials Chemistry A 2017, 5, (22), 10957-10967). Similar trend of increase in the concentration of physisorbed water and disappearance of alkane stretches/bending was observed for the air exposed pure TiO$_2$ powders. These FTIR results clearly demonstrate that the dried TiO$_2$:Ni (15 mol %) powders are undergoing hydroxylation upon atmospheric exposure, and as a result, the surface hydroxyl concentration is increased for the aged powders.

Complementing the FTIR studies, time-resolved UV-Vis absorption measurements were performed on TiO$_2$:Ni (15 mol %) dried powders prior to annealing for systematic investigation of the changes induced in the bond structure of TiO$_2$:Ni matrix upon moisture exposure. The dried powders were exposed to atmosphere and samples were collected every 3, 6, 9, 12, 24, and 48 h. The UV-Vis absorption spectra of these powders is shown in FIG. 15B. A color change from yellow to green was observed for the dried TiO$_2$:Ni (15 mol %) powders upon aging in air from visual inspection. This is evident from the blue shift of the absorption spectrum with increasing exposure time. The yellow to green color change is indicative of a change in the crystal field splitting energy, 10 Dq. Moreover, previous studies on complex Ni oxides report that the bright yellow color is a result of distorted octahedral environment whereas the green color corresponds to octahedral symmetry around the Ni ion. This change in the value of 10 Dq and the corresponding change in the local symmetry, point to the claim that the interaction of moisture with the dopant is causing a change in the bond structure around Ni in the host TiO$_2$. The 10 Dq values calculated for the dried TiO$_2$:Ni powders exposed to moisture for different time intervals is tabulated in Table 8. In accordance with the blue shift of the absorption spectra, the increase in 10 Dq with increasing moisture exposure time, indicates the bonding of cation in TiO$_2$:Ni (15 mol %) powders to more electronegative hydroxyl groups (Huheey, The Journal of Physical Chemistry 1965, 69, (10), 3284-3291) based on the spectrochemical series (Ryutaro, Bulletin of the Chemical Society of Japan 1938, 13, (5), 388-400).

TABLE 8

Increase in the value of 10 Dq of dried TiO$_2$:Ni (15 mol %) powders with aging time

| Transition | Time (h) | | |
|---|---|---|---|
| | 0 | 6 | 48 |
| $^3A_2$-$^3T_2$ (F) | | | |
| Expt. 10 Dq | 0.92 eV | 0.97 eV | 1.00 eV |
| Calc. 10 Dq | 0.94 eV | 1.04 eV | 1.13 eV |

Figure 14:
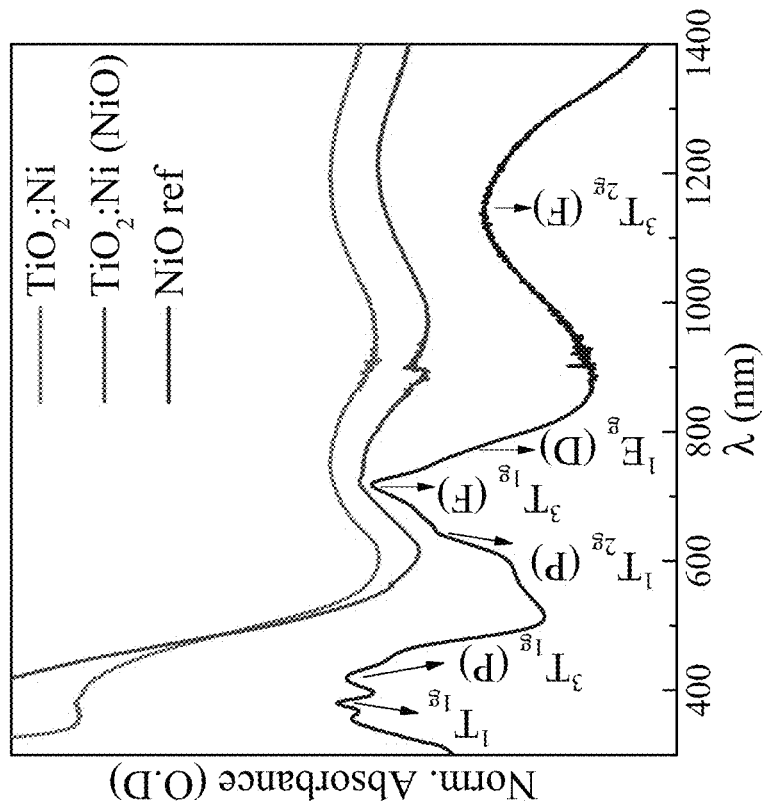
FIG. 14, comprising
Figure 14:
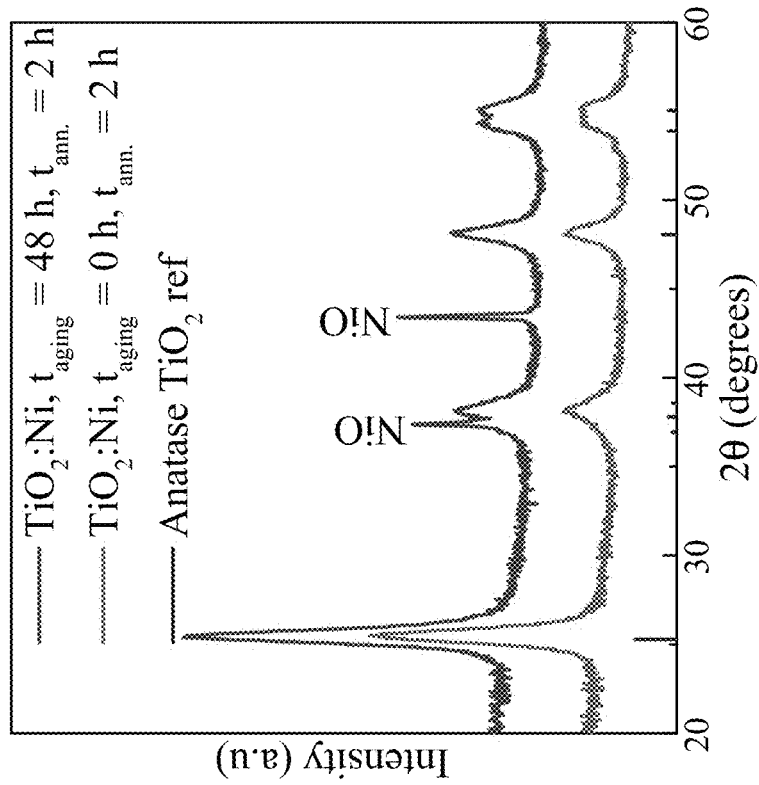
Figure 37:
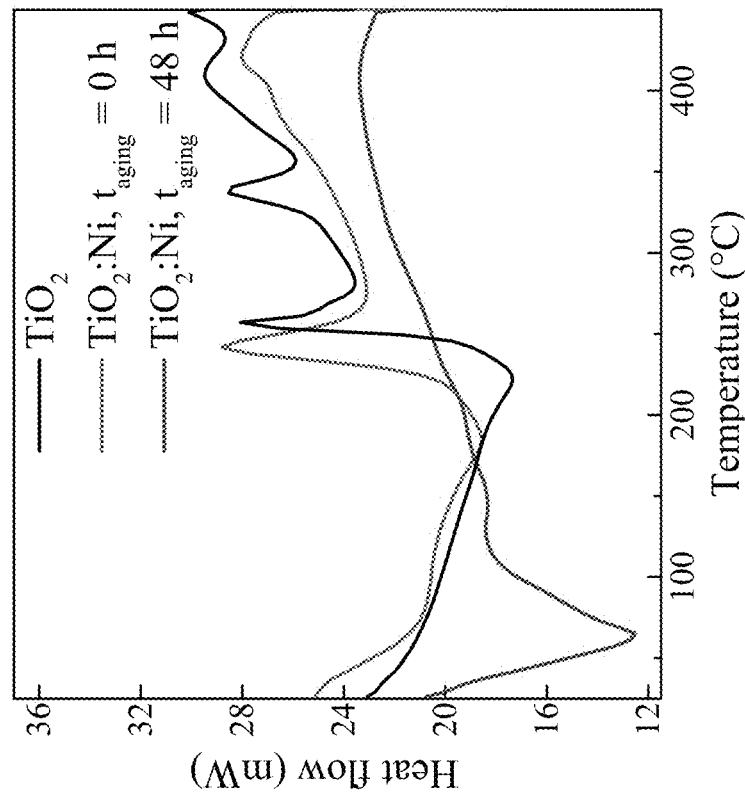
FIG. 37, comprising
Figure 37:
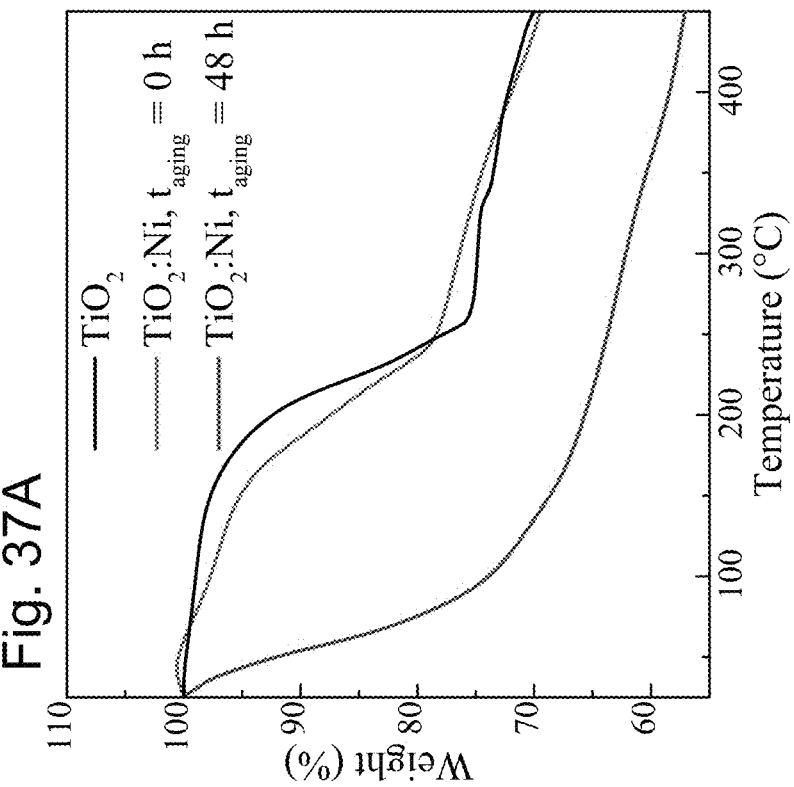

The UV-Vis and FTIR spectroscopic results suggest an increase in the concentration of surface hydroxyl groups bonded to the cation upon aging. However, these results cannot predict the reaction mechanism for NiO segregation in air exposed TiO$_2$:Ni (15 mol %) powders. Therefore, TGA-DSC studies were performed on dried TiO$_2$:Ni (15 mol %) powders to elucidate the reaction kinetics of moisture-dopant interaction. Two sets of amorphous TiO$_2$:Ni (15 mol %) powders, one exposed to air for 48 h after drying and other sealed in a vial after drying, were subjected to thermal treatment in TGA furnace at a constant heating rate of 4° C./min in the range of 25-450° C. Pure TiO$_2$ was employed as the control sample in these measurements. The heat flow for these samples was constantly observed using the DSC data. FIG. 37 shows the TGA-DSC data of dried TiO$_2$:Ni (15 mol %) and TiO$_2$ NPs. The first endothermic peak at 70° C. is ascribed to the evaporation of the ethanol solvent (Chen, et al., Applied Surface Science 2007, 253, (23), 9154-9158; Wu, et al., China Particuology 2003, 1, (6), 262-265). The corresponding weight loss in the temperature range of 25-125° C. is recorded as 29.9% and 3.4% for the aged and non-aged TiO$_2$:Ni (15 mol %) powders respectively. The higher weight loss associated with the 48 h aged TiO$_2$:Ni (15 mol %) powders suggests the volatilization of ethanol from the hydrated $TiO_2$ matrix. The increase in the weight loss in the lower temperature region (25-125° C.) with aging time was confirmed by performing similar heat treatment studies on the 3 h aged $TiO_2$:Ni (15 mol %) dried powders. This phenomenon of replacement of ethoxy with hydroxyl groups upon aging is consistent with the previous results of UV-Vis and FTIR measurements. At slightly higher temperatures of about 10° C., the evaporation of physisorbed water (Finnie, et al., Langmuir 2001, 17, (3), 816-820) was observed in the DSC plot for the aged $TiO_2$:Ni (15 mol %) powders. However, in pure $TiO_2$, the volatilization of organic solvent and water is combined in a broad endothermic region extending from 50 to 220° C. With further increase in temperature, the non-aged $TiO_2$:Ni (15 mol %) powder exhibits a sharp exothermic peak at 230° C., similar to the pure $TiO_2$, indicating the combustion of the organic compounds (Muniz, et al., Ceramics International 2011, 37, (3), 1017-1024). The crystallization of the amorphous powder into anatase $TiO_2$ is observed for all the samples at 400° C.[7] For the aged $TiO_2$:Ni (15 mol %) powders, a broad exothermic peak is observed from 220-400° C. The first region in between 220-330° C. is attributed to the removal of the unhydrolyzed isopropoxide groups (Hafizah, et al., International Journal of Photoenergy 2009, 2009) whereas the second region from 330-400° C. corresponds to the formation of nickel oxide phase (Wu, et al., Materials Letters 2007, 61, (14-15), 3174-3178; Li, et al., Materials Letters 2007, 61, (8-9), 1615-1618). This co-existence of the NiO and anatase $TiO_2$ phases in aged $TiO_2$:Ni (15 mol %) NPs was observed earlier in the XRD patterns (FIG. 14).

Figure 38:
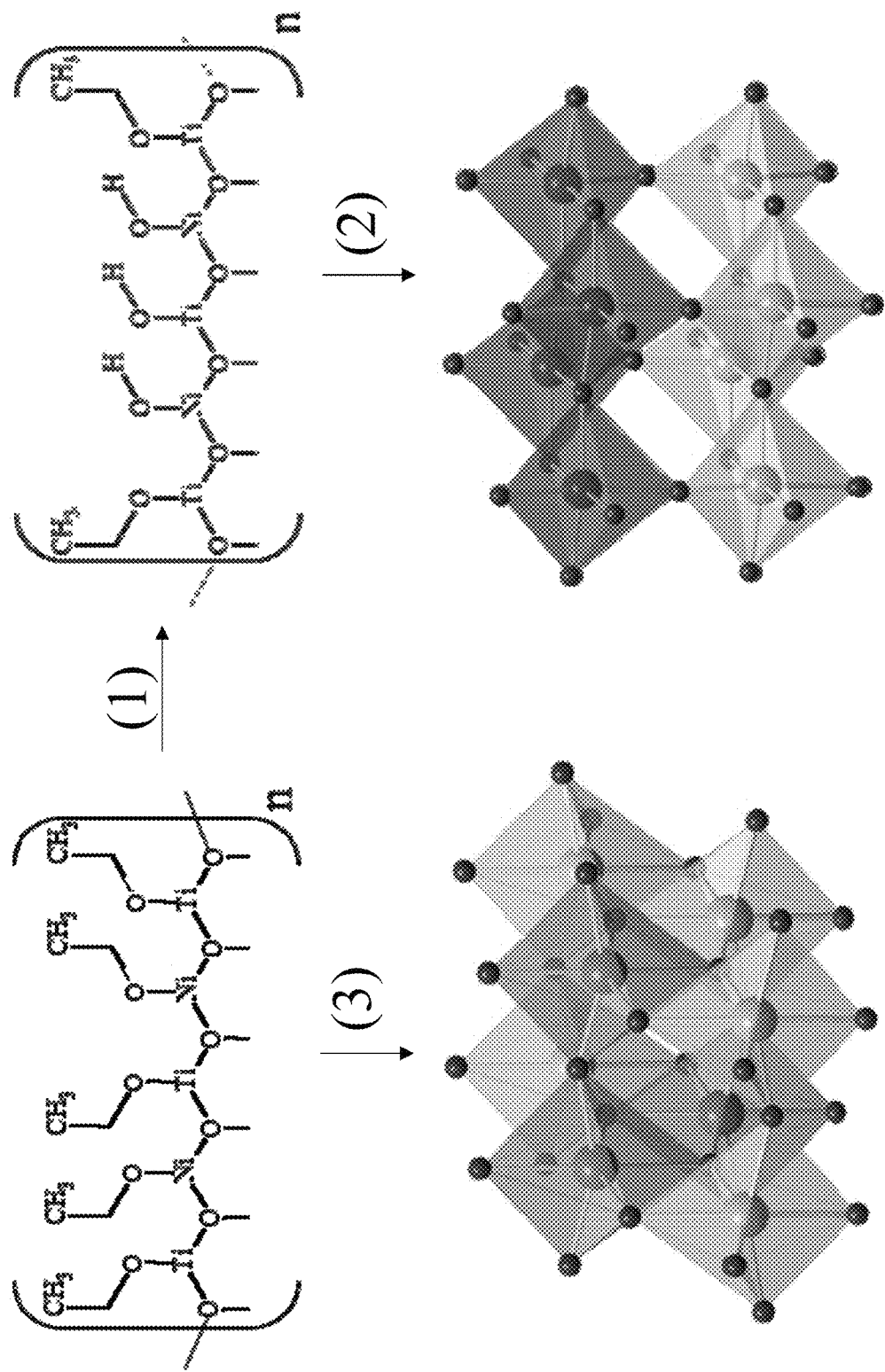
FIG. 38 is a schematic showing the hydration of amorphous $TiO_2$:Ni matrix upon aging in air. Upon annealing, the crystalline phases of NiO and $TiO_2$ co-exist due to the stabilization of $Ti(OH)_4$ clusters in the hydrated matrix.

On the basis of above observations, the dopant incorporation and segregation mechanism in solid hosts is illustrated using the schematic shown in FIG. 38. The doping of Ni in $TiO_2$ follows a nucleation-doping mechanism, as the Ti—O—Ni bonds are formed in the organic framework during the polycondensation step of the sol-gel synthesis (Lynch, et al., The Journal of Physical Chemistry C 2015, 119, (13), 7443-7452; Lee, et al., Materials Science and Engineering: B 2006, 129, (1-3), 109-115). After drying the sol in air for 10 h at 100° C., the amorphous $TiO_2$:Ni (15 mol %) powders are composed of an organic matrix, in which the unevaporated ethanol and water molecules bond dissociatively to the cations (Ti, Ni). Upon aging these powders in air (Step-1), the adsorbed ethoxy groups on the cations in the $TiO_2$:Ni matrix are replaced by hydroxyl groups due to the instability of the ethoxide species in the presence of moisture (Rasko, et al., Applied Catalysis A: General 2004, 269, (1-2), 13-25). The hydroxyl clusters of $Ti(OH)_4$ and $Ni(OH)_2$ coexist in the aged powder samples, with the $Ti(OH)_4$ being the more stable compound due to its low hydroxylation energy (Wang, et al., The Journal of Physical Chemistry A 2010, 114, (28), 7561-7570). These nanopowders, when annealed at 450° C., undergo structural changes owing to thermodynamic considerations (Buonsanti, et al., Chemistry of Materials 2013, 25, (8), 1305-1317). In nanocrystals, the self-purification effect—high formation energy of defect impurities compared to bulk materials—will tend to anneal out dopants during the growth process via diffusion (Dalpian, et al., Physical review letters 2006, 96, (22), 226802; Yang, et al., Journal of the American Chemical Society 2008, 130, (46), 15649-15661). At operating temperatures of about 400° C., specific to the host lattice, the dopant diffusion can take place followed by lattice ejection (Chen, et al., Journal of the American Chemical Society 2009, 131, (26), 9333-9339). This explains the formation of NiO from the $Ni(OH)_2$ clusters in the hydrated matrix (Step-2, 3) (Li, et al., Chemical Engineering Journal 2008, 136, (2-3), 398-408; Li, et al., Nanoscale 2011, 3, (12), 5103-5109). A similar sequence of processes, i.e., lattice incorporation, lattice diffusion, and lattice ejection has been observed for other doped nanocrystal systems as well (Xie, et al., Journal of the American Chemical Society 2009, 131, (30), 10645-10651). Moreover, the size of the segregated NiO clusters is clearly a function of the concentration of the parent $Ni(OH)_2$ clusters, and therefore, a strong NiO diffraction peak was observed for the air exposed powders in the XRD patterns (FIG. 14A). These results demonstrate that the size of the NiO cluster in the host lattice can be tailored by controlling the moisture interaction with the dopant in the host lattice.

Figure 39:
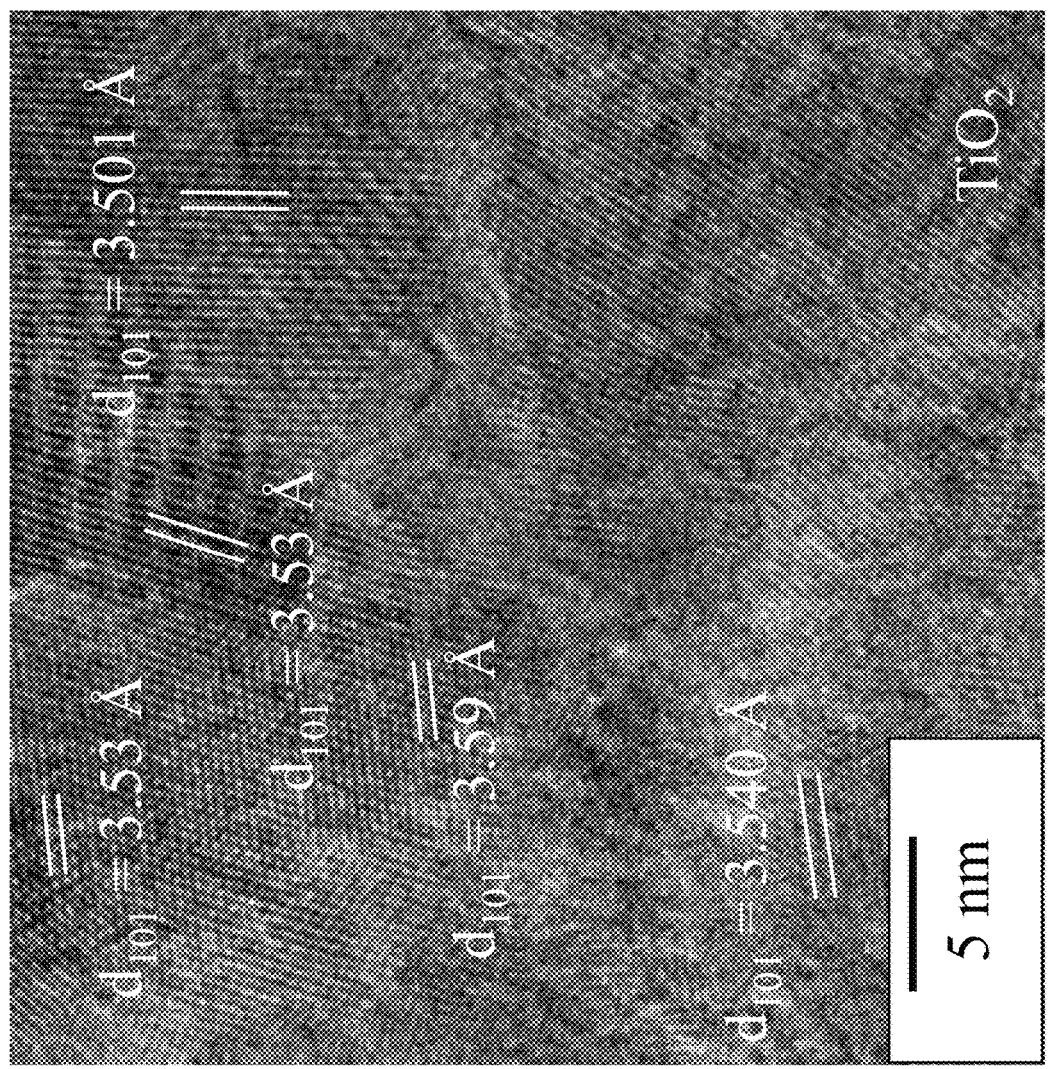
FIG. 39 is an HRTEM of the rapidly annealed $TiO_2$:Ni (15 mol %) NPs, demonstrating homogeneous doping of Ni in $TiO_2$ without forming any segregated phases.

Since the above reaction mechanism indicates that the formation of NiO clusters is an intrinsic process at high doping concentrations, the next objective of this work was to control this dopant segregation and diffusion. Recent literature reports show that the transformation of amorphous titania into crystalline anatase phase can be achieved within 30 min of thermal treatment at temperatures as low as 350° C. (Bhosle, et al., Nanotechnology 2017, 28, (40), 405603; Nikodemski, et al., Scientific reports 2016, 6, 32830). In order to take advantage of this rapid heat treatment for locking the dopants in host lattice, $TiO_2$:Ni (15 mol %) dried powders were rapidly annealed at 450° C. for 30 min. First, FTIR measurements were performed on these NPs to identify any incombustible species; the spectra showed that lowering of annealing time from 2 h to 30 min has no effect on the combustion of organic species, however, it has an effect on the dopant diffusion. Rapid annealed $TiO_2$:Ni (15 mol %) NPs exhibited anatase peaks in the XRD pattern, but with poor crystallinity. Moreover, the presence of NiO clusters was not identified in the detailed XRD scans. Therefore, in order to probe the local crystallinity and the dopant distribution, these NPs were characterized using HRTEM coupled with EELS chemical mapping (FIG. 39). The HAADF image shown in FIG. 39 indicates mostly uniform distribution of Ni dopants with some regions of high concentration. The lattice planes in the diffraction image are aligned along the (101) plane of anatase $TiO_2$ ($d_{101}$=3.5 Å) and (001) plane of $NiTiO_3$ ($d_{001}$=4.16 Å). From the thermodynamic standpoint, anatase $TiO_2$ is the most stable product with the (101) direction being the lowest energy facet (Yu, et al., Journal of the American Chemical Society 2014, 136, (25), 8839-8842), followed by $NiTiO_3$ (Kale, Metallurgical and Materials Transactions B 1998, 29, (1), 31-38). Furthermore, Ni is either distributed in the lattice of $TiO_2$ or it is forming a mixed oxide phase $NiTiO_3$. These results indicate that the rapid annealing of $TiO_2$:Ni (15 mol %) NPs limits the diffusion of the dopant in the host lattice due to the short annealing time, and thereby, locking the dopant in the host lattice or resulting in the formation of a mixed oxide phase. The doped system is therefore quenched in the metastable excited state ($NiTiO_3$) during the lattice incorporation phase.

Demonstration of Photocatalytic Activity: As a proof-of-concept, the photocatalytic activity of these $TiO_2$:Ni (15 mol %) materials was evaluated using a cationic dye, methylene blue. The difference in the crystal structure of these NPs demonstrated a difference in the photodegradation rates.

The phenomenon of limiting the dopant diffusion to form dopant oxide clusters by rapid thermal treatment was not only limited to but observed with other first row TM element, $Co^{2+}$. The XRD pattern of $TiO_2$:Co (15 mol %) is shown for the rapid and slow annealed NPs (FIG. 16A). The slow annealed NPs show the diffraction peaks corresponding to $Co_3O_4$ and anatase phases, whereas the rapidly annealed NPs crystallized in doped anatase $TiO_2$ phase. This unique finding for the highly doped $TiO_2$ nanocrystals—that the crystal structure can be tailored by varying the annealing rate—will provide an important means to improve the performance of these host materials in solar-based technologies.

In summary, $TiO_2$:Ni (15 mol %) NPs were synthesized using sol-gel chemistry. Bulk characterization techniques such as UV-Vis and XRD confirmed the optical and structural properties of the doped system. The aging of the dried $TiO_2$:Ni (15 mol %) NPs prior to annealing was observed to impact the segregation of the NiO clusters in $TiO_2$. The difference in the surface hydroxyl concentration for the aged versus non-aged powders was observed using FTIR measurements. Furthermore, time-resolved UV-Vis absorption measurements on the dried $TiO_2$:Ni (15 mol %) powders showed a systematic increase in the crystal field splitting energy with the aging time, indicating the replacement of ethoxy with hydroxyl groups on surface cations. TGA-DSC studies were performed on the aged and non-aged $TiO_2$:Ni (15 mol %) NPs to elucidate the moisture-dopant interaction mechanism. Aging the dried powders in air results in the formation of hydroxyl clusters, i.e., $Ni(OH)_2$, which crystallize into NiO clusters upon annealing. The lower calcination temperature of NiO and the higher thermodynamic stability of $Ti(OH)_4/TiO_2$ clusters favored the coexistence of NiO and $TiO_2$ phases in the $TiO_2$:Ni (15 mol %) NPs. Next, rapid annealing was performed on the amorphous $TiO_2$:Ni (15 mol %) powders to control the dopant segregation. HRTEM and EELS images confirmed the formation of doped anatase and $NiTiO_3$ phases. This ability to spatially control the dopant local environment in a solid host will provide opportunities to tailor the optoelectronic properties of the material for select applications.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A method of changing the absorbance or emission spectrum of a nanoparticle, the method comprising:
   providing a nanoparticle having a rare earth doped core, a transition metal doped shell wherein the transition metal doped shell comprises $TiO_2$, and at least one surface functionalizable group; and
   treating the nanoparticle with at least one carboxylic acid; wherein the absorbance or emission spectrum of the nanoparticle is changed upon treatment with the carboxylic acid.

2. The method of claim 1, wherein the carboxylic acid is selected from the group consisting of para-(fluorosulfonyl) benzoic acid, para-nitrobenzoic acid, para-cyanobenzoic acid, para-bromobenzoic acid, benzoic acid, para-methoxybenzoic acid, and para-aminobenzoic acid.

3. The method of claim 1, wherein the carboxylic acid is para-aminobenzoic acid.

4. The method of claim 1, wherein the step of treating the core-shell nanoparticle with at least one carboxylic acid comprises:
   treating the nanoparticle with a first carboxylic acid; and
   treating the nanoparticle with a second carboxylic acid.

5. The method of claim 1, wherein the rare earth doped core comprises $\beta$-$NaYF_4$.

6. The method of claim 1, wherein the rare earth doped core comprises at least one rare earth selected from the group consisting of Er, Yb, Tb, Tm, and Ho.

7. The method of claim 1, wherein the transition metal doped shell comprises at least one transition metal selected from the group consisting of V, Cr, Mn, Fe, Co, Ni, and Cu.

8. The method of claim 1, wherein the transition metal doped shell comprises Ni; or
   wherein the functionalizable group is a hydroxide group.

9. The method of claim 1, wherein the transition metal doped shell further comprises Bi.

10. The method of claim 1, wherein the rare earth doped core comprises $YVO_4$.

* * * * *